(12) United States Patent
Mizutani

(10) Patent No.: US 7,780,487 B2
(45) Date of Patent: Aug. 24, 2010

(54) BATTERY TERMINAL UNIT

(75) Inventor: Yoshihiro Mizutani, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 12/547,774

(22) Filed: Aug. 26, 2009

(65) Prior Publication Data
US 2010/0055994 A1    Mar. 4, 2010

(30) Foreign Application Priority Data
Aug. 29, 2008   (JP)   ............................. 2008-221892
Sep. 5, 2008    (JP)   ............................. 2008-229069

(51) Int. Cl.
*H01R 4/42*    (2006.01)
(52) U.S. Cl. ...................................................... 439/764
(58) Field of Classification Search ................. 439/764, 439/761, 762, 763, 754, 755
See application file for complete search history.

(56) References Cited

U.S. PATENT DOCUMENTS 5,302,142 A * 4/1994 Tabata ........................ 439/762

6,340,319 B1 * 1/2002 Matsunaga ................... 439/761
6,648,701 B2 * 11/2003 Mouissie ...................... 439/761

FOREIGN PATENT DOCUMENTS

| DE | 19732940    | 10/1998 |
|----|-------------|---------|
| EP | 1117152     | 7/2001  |
| JP | 11-135102   | 5/1999  |
| JP | 11135102    | 5/1999  |
| JP | 2002141056  | 5/2002  |
| JP | 2002358867  | 12/2002 |

* cited by examiner

*Primary Examiner*—Phuong K Dinh
(74) *Attorney, Agent, or Firm*—Gerald E. Hespos; Michael J. Porco

(57) ABSTRACT

A rotation restricting member (40) of a battery terminal unit (U) is provided with a main body (41) capable of restricting a mounting angle of a battery terminal (20) with respect to a battery post (12) by coming into contact with a battery (10) with the battery terminal (20) connected with the battery post (12), press-fitting portions (42) formed integral to the main body (41) and adapted to fix the rotation restricting member (40) to the battery terminal (20) by being press-fitted into an opening (32) formed in a side surface of a bolt holding portion (22), and a detachment restricting piece (56) formed integral to the main body (41) and adapted to restrict a movement of the main body (41) in a direction opposite to a pressing direction by being engaged with a terminal fitting (60) tightened to a stud bolt (24).

14 Claims, 56 Drawing Sheets

BATTERY TERMINAL UNIT

BACKGROUND OF THE INVENTION

1. Field of the Invention

The invention relates to a battery terminal unit.

2. Description of the Related Art

Japanese Unexamined Patent Publication No. H11-135102 discloses a battery terminal to be connected with a battery post on the upper surface of a battery of an automotive vehicle or the like. This battery terminal includes a post fitting portion to be fit on the battery post for connection, a wire connecting portion to be connected with a wire and a handle connecting the post fitting portion and the wire connecting portion. An anti-rotation piece projects from the handle. The post fitting portion is fit on the battery post and a bolt of the post fitting portion is tightened. This tightening may apply a torque to the battery terminal. However, the anti-rotation piece contacts a side surface of the battery to prevent the rotation of the battery terminal.

The anti-rotation piece of the battery terminal disclosed in Japanese Unexamined Patent Publication No. H11-135102 is formed integral to the battery terminal and has a length and a size in conformity with a positional relationship between a contact part of the battery and the battery post.

The position of the battery terminals may be different on different types of batteries. Additionally, the mount position of the battery terminal on the battery may be changed according to an external environment of the battery or the like. Accordingly, the contact part of the battery with the anti-rotation piece may be changed. The many different positional relationships of the contact part of the battery and the battery post have required many types of battery terminals including anti-rotation pieces with different lengths and shapes. The existence of many different designs increases costs and creates inventory control problems.

The invention was developed in view of the above situation and an object thereof is to reduce cost.

SUMMARY OF THE INVENTION

The invention relates to a battery terminal unit that has a battery terminal with a post fitting that can be connected with a battery post that stands on a battery. The battery terminal also has a bolt holder formed integral or unitary to the post fitting. The bolt holder can accommodate a head of a stud bolt and can hold the stud bolt in a substantially standing state. The battery terminal unit also has a rotation restricting member made of synthetic resin and attached to the battery terminal. The rotation restricting member includes a main body capable of restricting a mounting angle of the battery terminal with respect to the battery post by contacting the battery when the battery terminal is connected with the battery post. A press-fitting is press-fit into an opening in the bolt holder to fix the rotation restricting member to the battery terminal.

At least one detachment restricting member may be formed integral to the main body and may be configured to engage a mounting member tightened to the stud bolt to restrict a movement of the main body in a direction substantially opposite to a pressing direction of the main body.

A positional relationship between a contact part of the battery with the main body and the battery post may differ. However, the above-described construction enables the relatively costly battery terminal to be used as a common part, while the less costly rotation restricting member then can be prepared to conform to the particular condition. The rotation restricting member is fixed to the battery terminal by press fitting the press-fitting portion into the opening in the bolt holding portion of the battery terminal. The rotation restricting member and the battery terminal are unlikely to shake relative to each other so that a high rotation restricting function can be displayed. Furthermore, movement of the main body opposite to the pressing direction is restricted by the engagement of the detachment restricting member with the mounting member to be tightened to the stud bolt. Thus, the rotation restricting member attached to the battery terminal can be held firmly. In this way, a higher rotation restricting function is displayed.

The detachment restricting member preferably includes a receiving portion for receiving a projection on the mounting member, and the projection engages a wall of the receiving portion to restrict movement of the main body in the direction opposite to the pressing direction. Thus, the rotation restricting member cannot be detached from the battery terminal.

The receiving portion may be a hole that penetrates the detachment restricting member and the hole has an edge with an endless ring shape. Thus, the strength of the detachment restriction is stronger than the case where the hole edge has an incomplete ring shape. Hence a large retaining force is displayed.

The mounting angle of the mounting member with respect to the stud bolt preferably is restricted by the contact of the projection with a wall surface of the receiving portion extending in the pressing direction. Thus, the mounting angle of the mounting member with respect to the stud bolt can be restricted. Further, the projection has a function of preventing the detachment of the rotation restricting member from the battery terminal and a function of preventing the rotation of the mounting member. Thus, the construction is simplified.

The receiving portion may be a hole that penetrates the detachment restricting member and has a hole edge with an incomplete ring shape. The mounting angle of the mounting member with respect to the stud bolt is restricted by contact of the projection inserted into the receiving portion with the bolt holding portion.

With this construction, the projection is held in direct contact with the bolt holding portion. Thus, the mounting member is unlikely to shake relative to the bolt holding portion, and a high rotation preventing function is displayed. Furthermore, the projection functions to prevent detachment of the rotation restricting member from the battery terminal and functions to prevent rotation of the mounting member, thereby simplifying the construction.

The detachment restriction preferably includes at least one lock that extends from the main body substantially along a side lateral to the bolt holding portion for engaging the bolt holding portion at a side of the bolt holding portion substantially opposite to the main body.

With this construction, the lock of the detachment restriction passes the side lateral to the bolt holding portion and engages the bolt holding portion at the side opposite to the main body when the rotation restricting member is attached to the battery terminal. Thus, a larger retaining force is obtained. Further, detachment of the rotation restricting member from the battery terminal is prevented before the mounting member is mounted on the bolt holding portion.

The mounting member preferably comprises or is a terminal fitting to be connected with an external circuit. Thus, the terminal fitting that is to be connected with the external circuit can possess the detachment preventing function.

The mounting member preferably comprises or is a bracket to be fixed to an electrical component. Thus, the bracket that is to be fixed to the electrical component can possess the detachment preventing function.

The detachment restriction preferably extends substantially in the pressing direction and is arranged at a position adjacent to the bolt holding portion at an angle to a longitudinal direction of the stud bolt, and preferably a right angle. Thus, a space for placing the detachment restricting member easily is ensured at the position adjacent to the bolt holding portion in the direction orthogonal to the longitudinal direction of the stud bolt as compared with a position adjacent to the bolt holding portion in the longitudinal direction of the stud bolt where a part to be attached to the stud bolt or a wall of the battery can be present. Accordingly, a cost reduction can be realized.

The battery terminal unit may further comprise an engaging portion arranged at a position to at least partly sandwich the bolt holding portion together with the main body. The engaging portion is engaged with the bolt holding portion. A joint is arranged lateral to the bolt holding portion and is connected with both the main body and the engaging portion.

An alternate battery terminal unit in accordance with the invention has a battery terminal with a post fitting portion to be connected with a battery post of a battery and a bolt holding portion formed integral to the post fitting portion. The bolt holding portion is configured to accommodate a head of a stud bolt and to hold the stud bolt in a standing state. A rotation restricting member made of synthetic resin is attached to the battery terminal. The rotation restricting member includes: a main body capable of restricting a mounting angle of the battery terminal with respect to the battery post by contacting the battery with the battery terminal connected with the battery post, a press-fitting portion formed integral to the main body and adapted to fix the rotation restricting member to the battery terminal by being press-fit into an opening formed in a side surface of the bolt holding portion, an engaging portion arranged at a position to sandwich the bolt holding portion together with the main body and engaged with the bolt holding portion, and a joint portion arranged lateral to the bolt holding portion and connected with both the main body and the engaging portion.

A positional relationship between a contact part of the battery with the main body and the battery post may differ. However, with this construction, the relatively costly battery terminal is used as a common part and the less costly rotation restricting member is prepared to conform to the specific condition, thereby reducing cost. Further, the press-fitting portion is press-fit into the opening in the side surface of the bolt holding portion of the battery terminal to fix the rotation restricting member to the battery terminal. Thus, the rotation restricting member and the battery terminal are unlikely to shake relative to each other for displaying a high rotation restricting function. The joint connects the engaging portion to the main body to sandwich the bolt holding portion between the engaging portion and the main body and to restrict movement of the main body in the direction opposite to the pressing direction. Hence, the rotation restricting member attached to the battery terminal is held firmly and a higher rotation preventing function is displayed.

The joint may be integral or unitary to the main body. With this construction, the joint does not shake relative to the main body as compared with the case where the joint is a separate part that must be assembled to the main body and shakes relative to the main body. Thus, a higher rotation preventing function can be displayed.

The joint is engaged with a mounting member to be tightened to a stud bolt, and hence restricts movement of the main body in a direction substantially opposite to a pressing direction of the main body. As a result, movement of the main body in the direction opposite to the pressing direction is restricted doubly by the engagement of the mounting member with the joint and the action of the engaging portion. In addition, the joint is integral or unitary to the main body, and suppresses shaking movements of the rotation restricting member relative to the battery terminal. Thus, an even higher rotation preventing function is displayed.

The joint may be formed with a receiving portion for receiving a projection of the mounting member, and the engagement of the projection with a wall surface of the receiving portion restricts movement of the main body in the direction opposite to the pressing direction. With this construction, the engagement of the projection of the mounting member received into the receiving portion of the joint with the wall surface of the receiving portion prevents the detachment of the rotation restricting member from the battery terminal.

The receiving portion may be a hole that penetrates the joint and may have a hole edge with an endless ring shape. Thus, the joint is stronger than the case where the hole edge has an incomplete ring shape and a large retaining force is displayed.

The mounting angle of the mounting member with respect to the stud bolt may be restricted by the contact of the projection with a wall surface of the receiving portion extending in the pressing direction. With this construction, the projection functions to prevent detachment of the rotation restricting member from the battery terminal and functions to prevent rotation of the mounting member, thereby simplifying the construction.

The receiving portion may be a hole that penetrates the joint and may have a hole edge with an incomplete ring shape. Thus, the mounting angle of the mounting member with respect to the stud bolt may be restricted by the contact of the projection inserted into the receiving portion with the bolt holding portion. With this construction, the projection is held in direct contact with the bolt holding portion so that the mounting member is unlikely to shake relative to the bolt holding portion. As a result, a high rotation preventing function is displayed. Furthermore, the projection functions to prevent the detachment of the rotation restricting member from the battery terminal and functions to prevent rotation of the mounting member, thereby simplifying the construction.

The mounting member may be or may comprise a terminal fitting to be connected with an external circuit. With this construction, the terminal fitting can possess the detachment preventing function.

The mounting member may be or may comprise a bracket to be fixed to an electrical component. With this construction, the bracket can possess the detachment preventing function.

The joint may extend in the pressing direction of the main body toward the bolt holding portion and may be arranged at a position adjacent to the bolt holding portion in a direction orthogonal to a longitudinal direction of the stud bolt. Thus, a space for placing the joint easily can be ensured at the position adjacent to the bolt holding portion in the direction orthogonal to the longitudinal direction of the stud bolt as compared with a position adjacent to the bolt holding portion in the longitudinal direction of the stud bolt where a part to be attached to the stud bolt or a wall surface of the battery can be present.

Two joints may be arranged at opposite sides of the bolt holding portion, and the engaging portion may be connected with both joints. With this construction, the bolt holding portion is enclosed by the main body, the two joints and the engaging portion. Thus, shaking movements of the rotation restricting member relative to the battery terminal are restricted in all directions orthogonal to the longitudinal direction of the stud bolt. Further, the engaging portion is connected with the two joints. Hence, the strength of the joints is higher and a higher detachment preventing function is displayed.

The engaging portion may be separated from the joints and connected with the joints. With this construction, assembling operability with the battery terminal is better as compared with the case where the engaging portion is made integral to one joint by a hinge. This is particularly effectively in the case where the spacing between the post fitting portion and the bolt holding portion is short. Additionally, a cost reduction can be realized.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

A first embodiment of the invention is described with reference to FIGS. 1 to 20. A battery terminal unit of this embodiment is identified by the letter U and includes a battery terminal 20 to be connected with a battery 10 that may be installed in an automotive vehicle. The battery terminal unit U also has a rotation restricting member 40 to be attached to the battery terminal 20. In the following description, reference is made to FIGS. 3 to 5, 7 to 9, 11, 13, 16, 18 and 20 concerning a vertical direction. X-axis, Y-axis and Z-axis are shown in some of the drawings and graphical representations are made so that the respective axis directions are those shown in the respective drawings.

Figure 15:
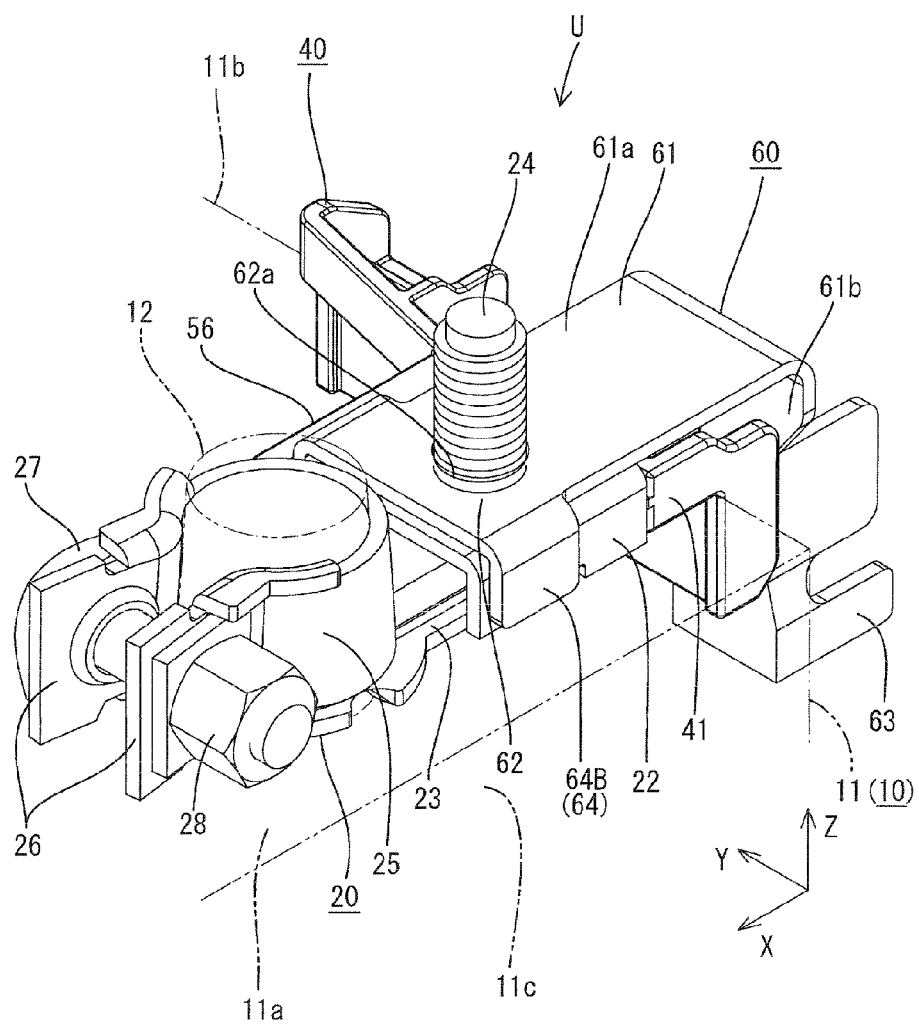
FIG. 15 is a perspective view of the battery terminal unit mounted on a battery.
Figure 16:
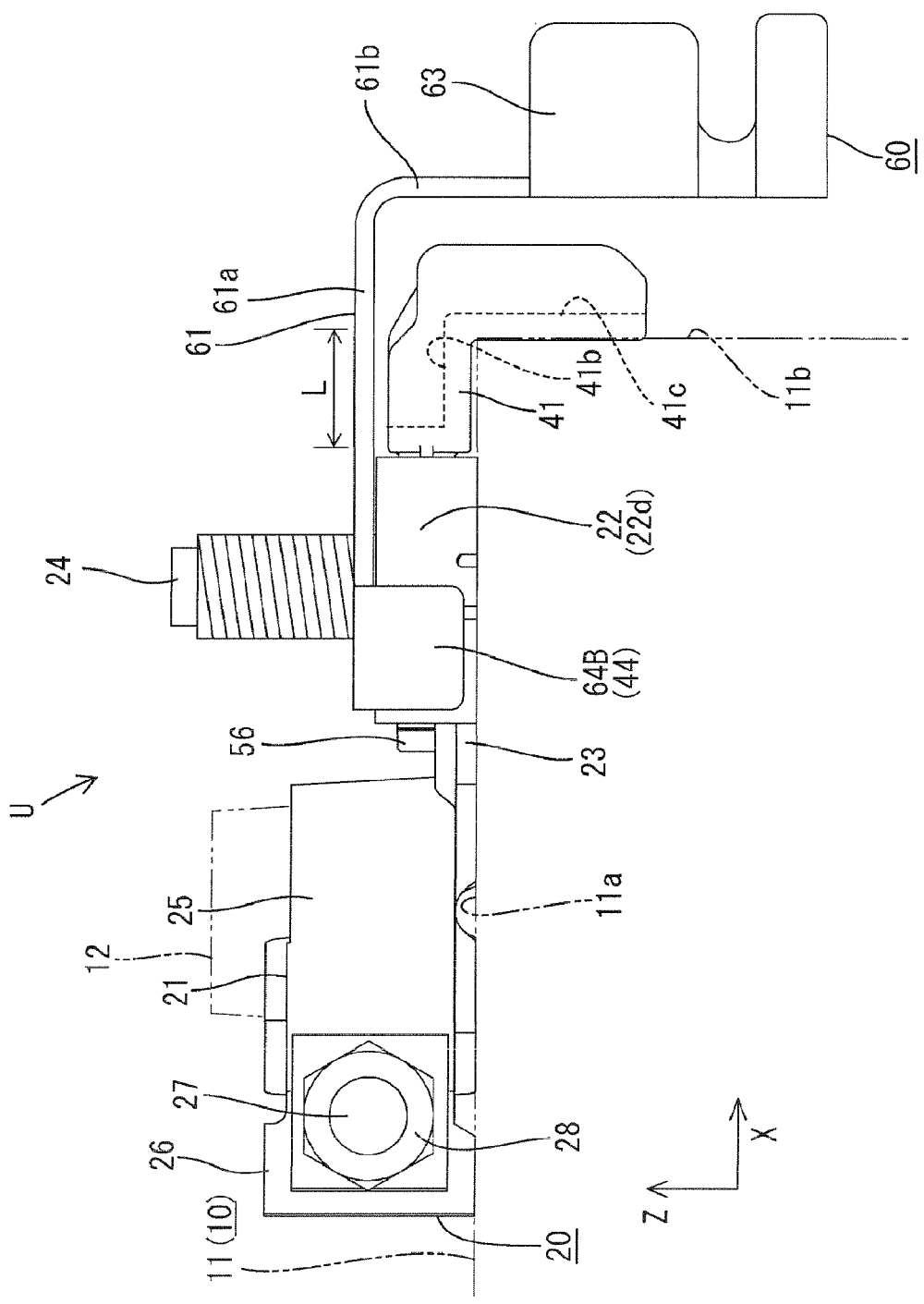
FIG. 16 is a side view of the battery terminal unit mounted on the battery.
Figure 17:
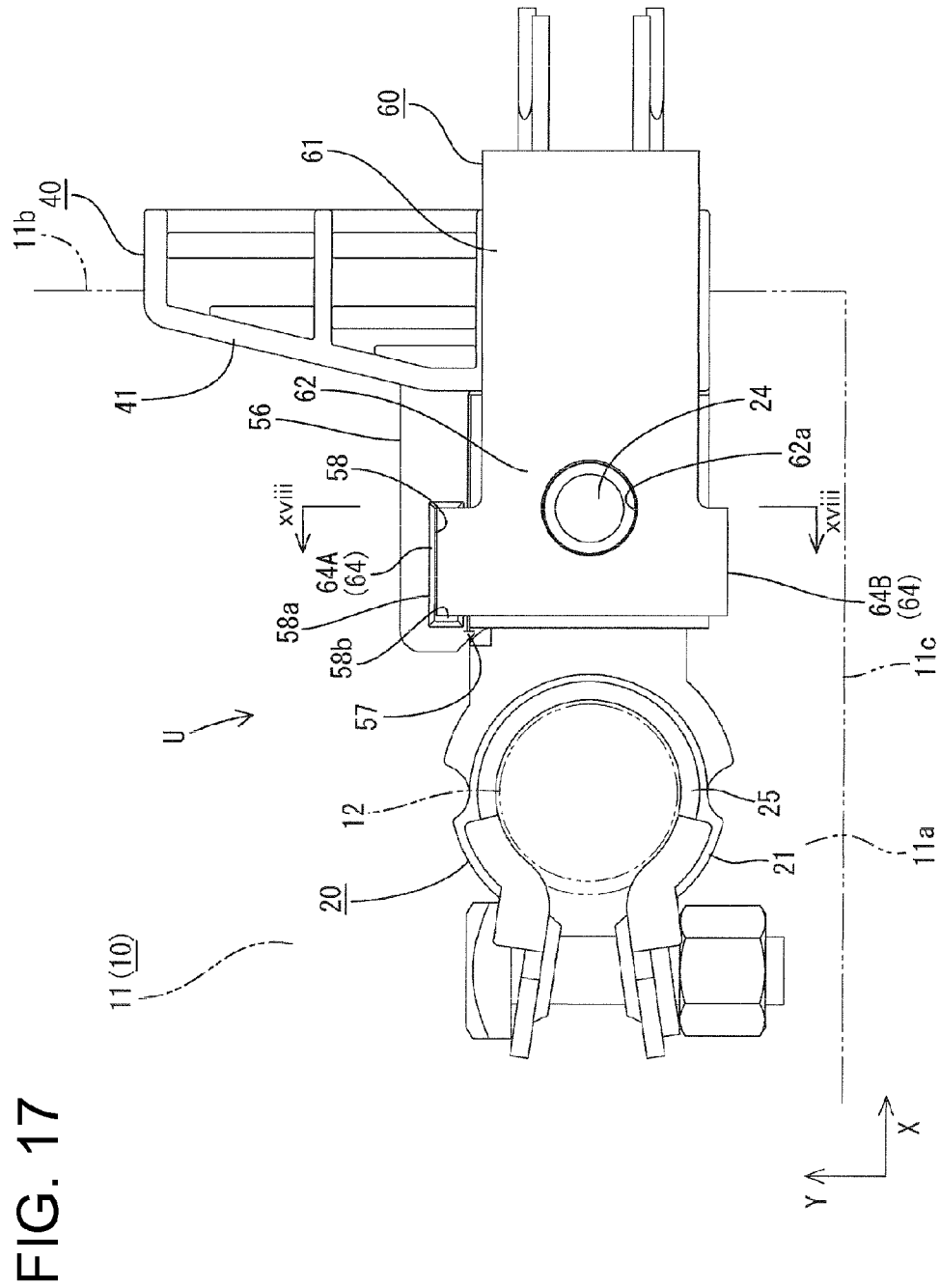
FIG. 17 is a plan view of the battery terminal unit mounted on the battery.

As shown in FIGS. 15 to 17, the battery 10 includes a substantially box-shaped battery main body 11 and a substantially cylindrical battery post 12 that stands on an upper surface 11a of the battery main body 11. The battery post 12 is made of lead or the like and is mounted near a corner of the upper surface 11a of the battery main body 11 and at specified distances from a pair of side surfaces 11b, 11c that form the corner of the battery main body 11 together with the upper surface 11a of the battery main body 11. The battery terminal 20 is connected with the battery post 12.

Figure 1:
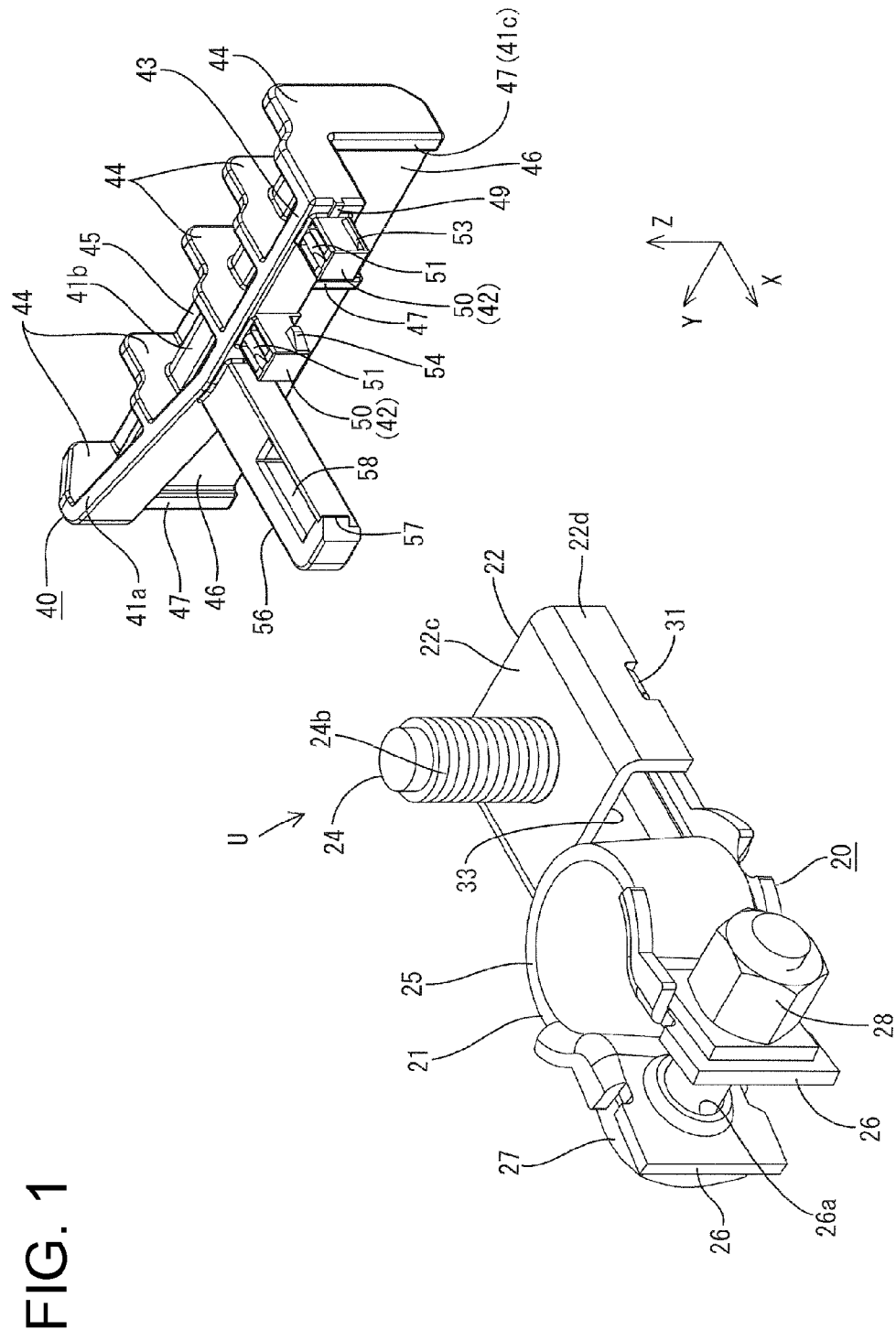
FIG. 1 is a perspective view of a battery terminal and a rotation restricting member according to a first embodiment of the invention.
Figure 2:
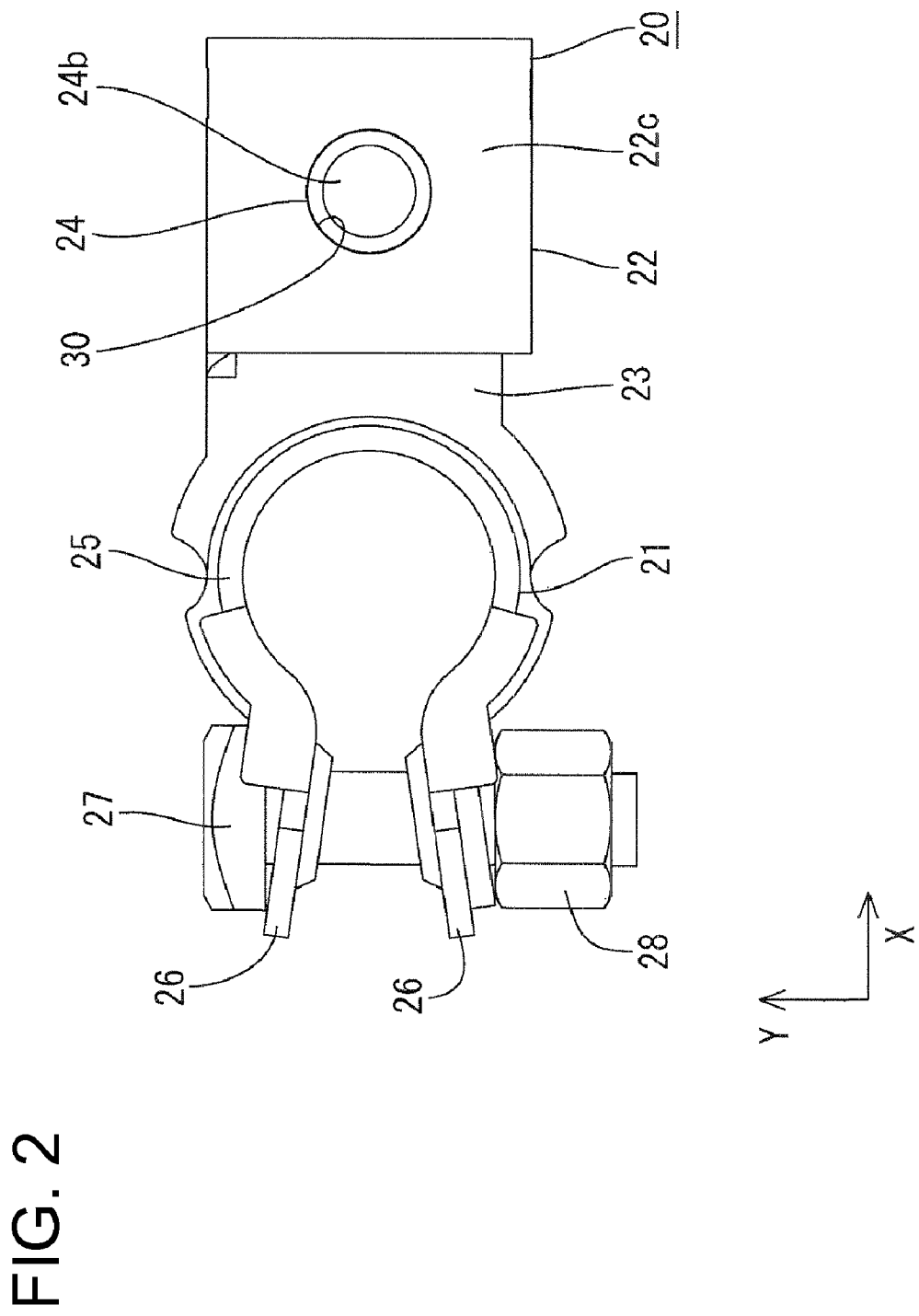
FIG. 2 is a plan view of the battery terminal.
Figure 3:
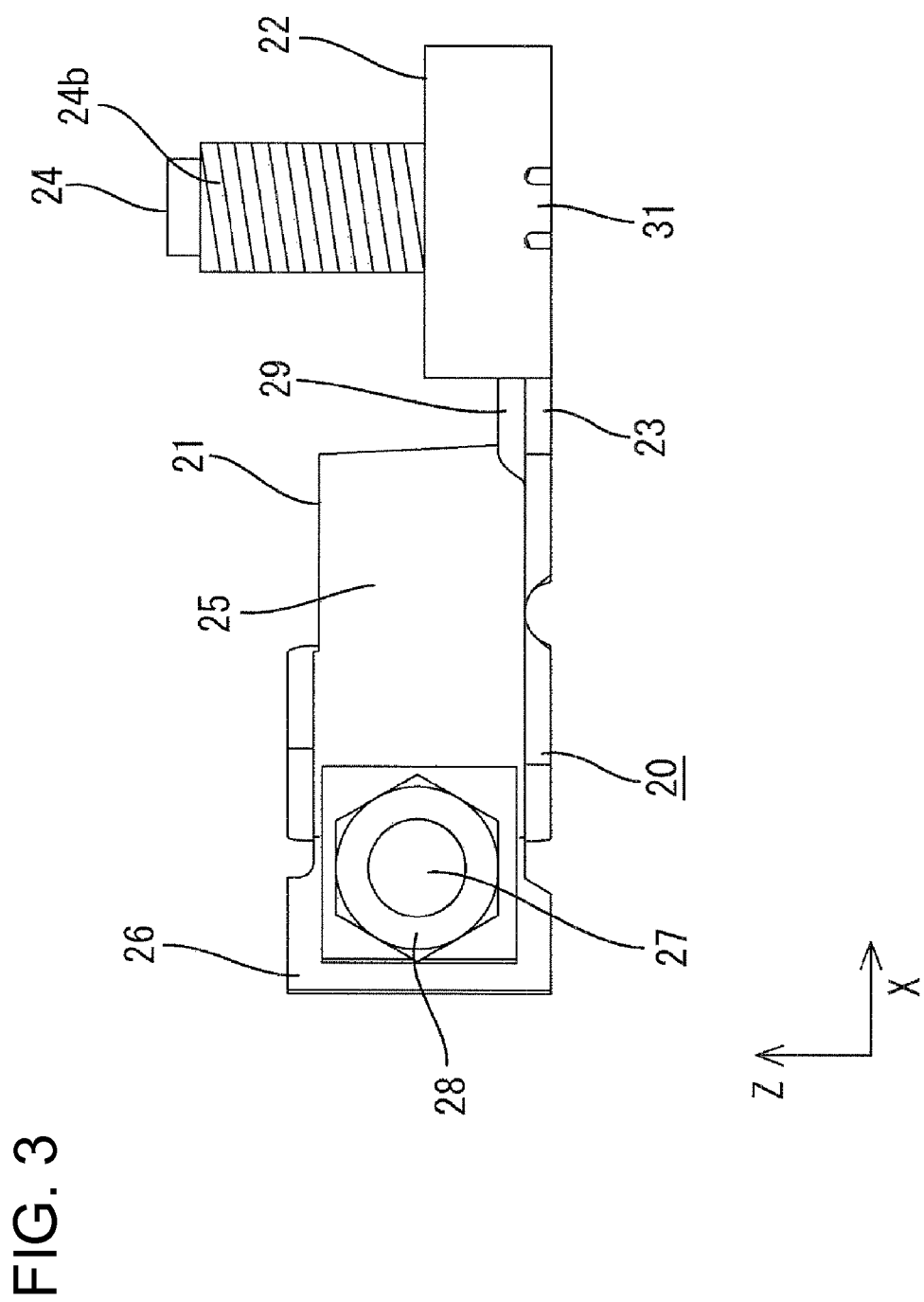
FIG. 3 is a side view of the battery terminal.
Figure 10:
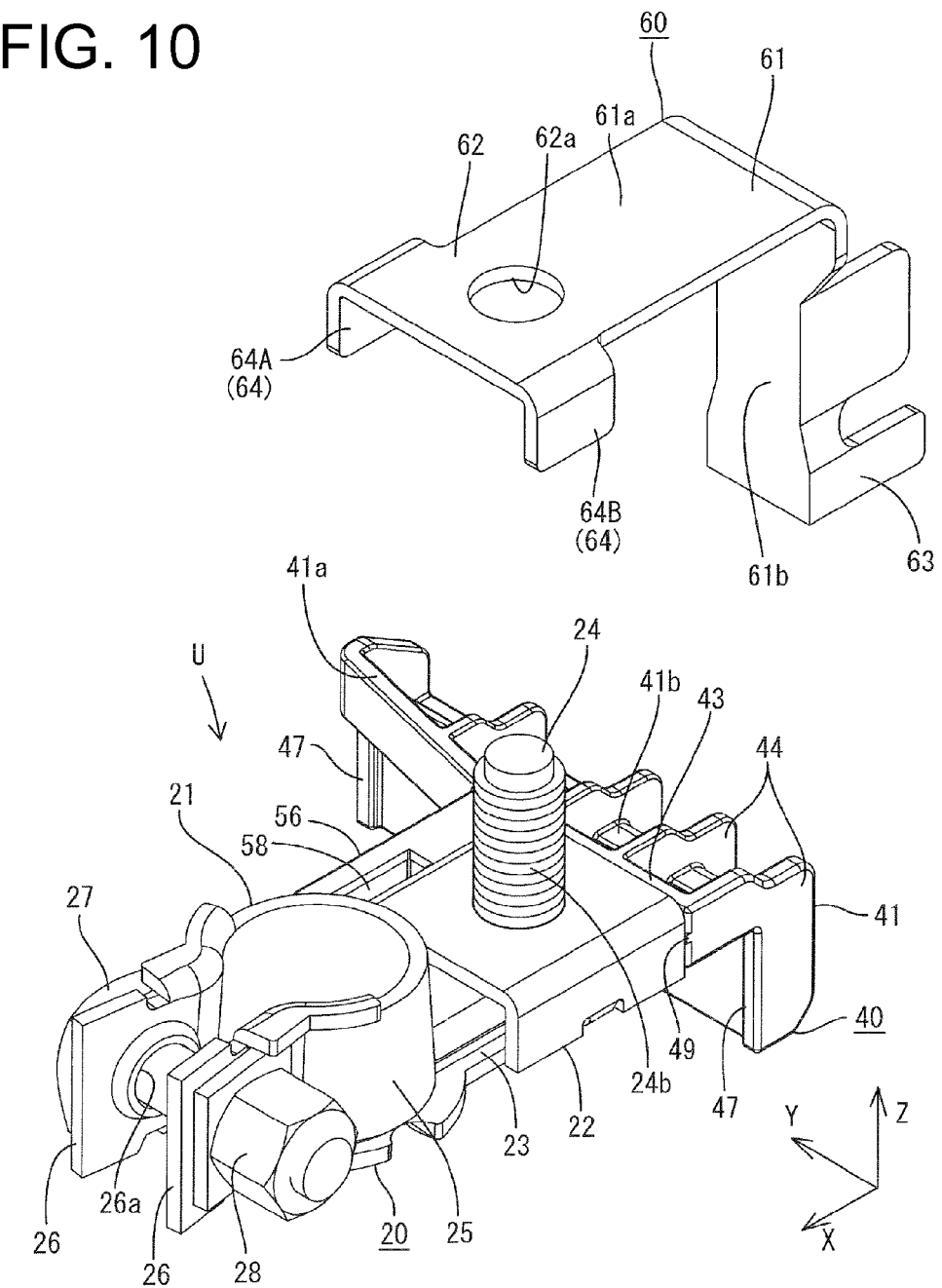
FIG. 10 is a perspective view of a battery terminal unit before a terminal fitting is mounted.

The battery terminal 20 is formed into a desired shape by bending, folding, embossing or press-working a conductive metal plate to define a post fitting portion 21, a bolt holding portion 22 and a joint 23 that connects the post fitting portion 21 and the bolt holding portion 22 as shown in FIGS. 1 to 3. The post fitting portion 21 is configured to be mounted on the battery post 12 and the holding portion 22 is configured to be connected with a terminal fitting 60 (FIG. 10) mounted on an end of an unillustrated wire. The post fitting portion 21, the joint 23 and the bolt holding portion 22 are arranged substantially linearly one after another substantially in the X-axis direction. The rotation restricting member 40 is attached to the bolt holding portion 22 from a side opposite to the post fitting portion 21 and, in the attached state, the post fitting portion 21, the joint 23, the bolt holding portion 22 and the rotation restricting member 40 are arranged in this order in the X-axis direction from the battery post 12 (FIG. 10). With the post fitting portion 21 fit on the battery post 12 along the Z-axis direction, the bolt holding portion 22 is arranged at a specified distance from the side surface 11b without projecting out from the side surface 11b extending in the Z-axis and Y-axis directions of the battery main body 11 (FIGS. 15, 16).

The post fitting portion 21 includes a substantially arcuate tightening portion 25 to be fit on the battery post 12 and two extensions 26 extending in radially out directions of the battery post 12 from the opposite ends of the tightening portion 25. The tightening portion 25 is formed by curving a piece standing up from the joint 23, and the extensions 26 are formed by bending the opposite end parts of this piece outwardly. The tightening portion 25 is radially resiliently deformable to increase and decrease the inner diameter thereof. The inner diameter in a free state is larger than the outer diameter of the battery post 12, so that the tightening portion 25 can fit loosely on the battery post 12. The extensions 26 are substantially flat plates and are inclined as to widen the spacing toward the extending ends in the free state.

Bolt insertion holes 26A penetrate the extensions and can receive a bolt 27. The bolt 27 is inserted into the bolt insertion holes 26a from the outer side of one extension 26 so that the leading end of the bolt 27 projects toward the outer side of the other extension 26. A nut 28 is tightened onto this projecting part of the bolt 27. The spacing between the extensions 26 can be increased or decreased and by adjusting a tightening state of the bolt 27 and the nut 28 and accordingly, the inner diameter of the tightening portion 25 is increased or decreased. Thus, the post fitting portion 21 can be held connected with the battery post 12 with a desired holding force by a suitable operation of the bolt 27 and the nut 28.

Figure 4:
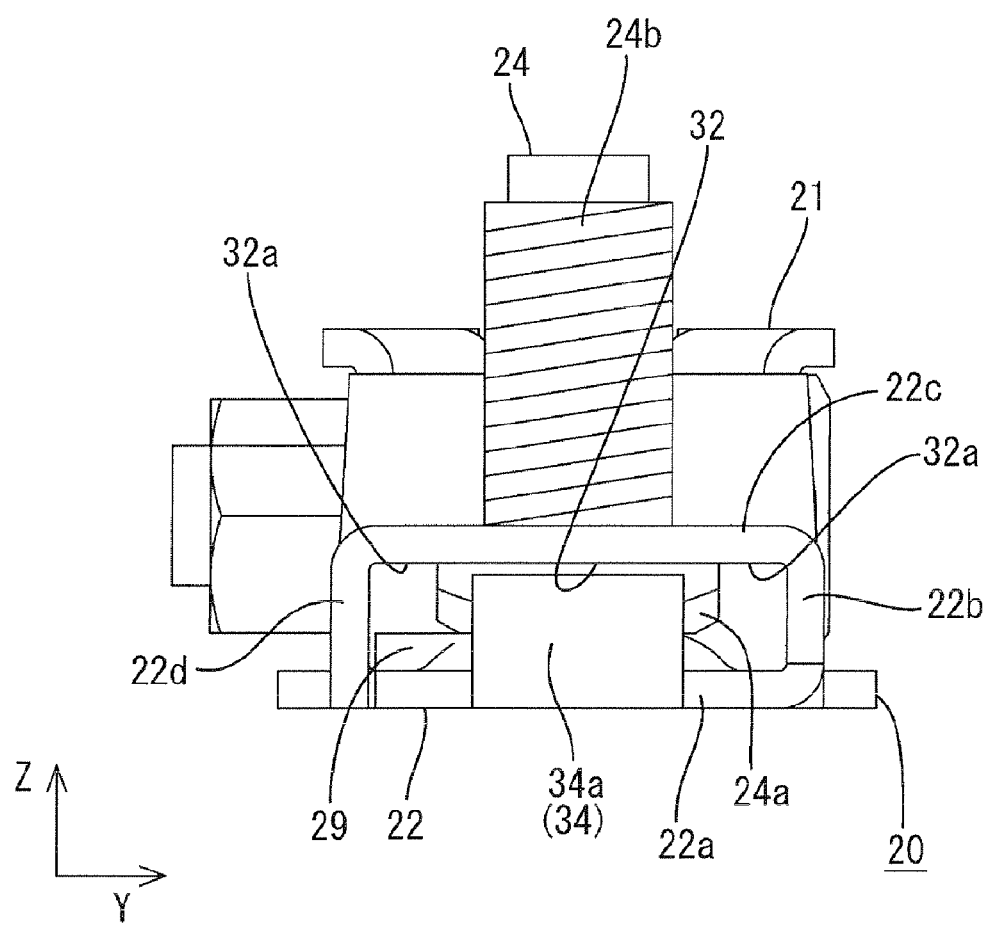
FIG. 4 is a rear view of the battery terminal.
Figure 5:
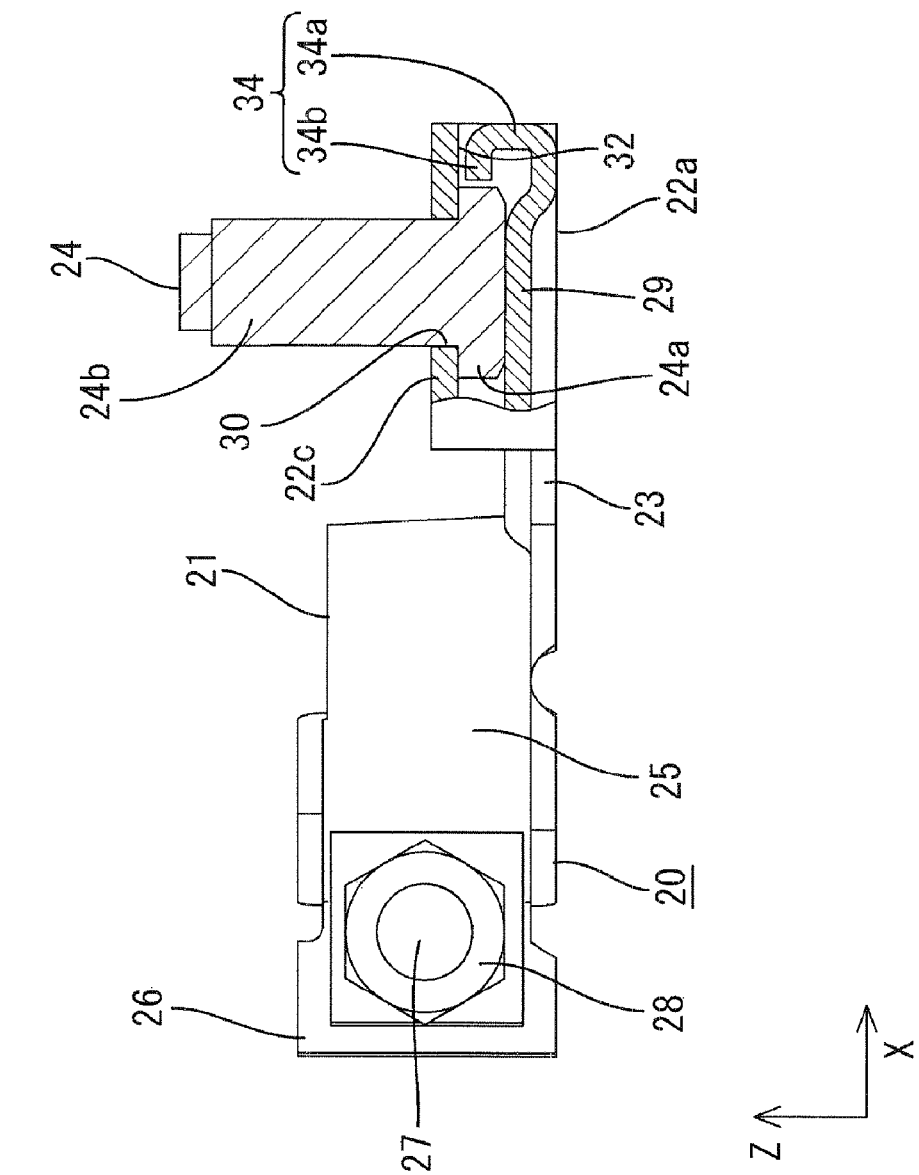
FIG. 5 is a side view partly in section of the battery terminal.

As shown in FIGS. 4 and 5, the bolt holding portion 22 is substantially a box having a shorter height than the post fitting portion 21 and can accommodate a head 24a of the stud bolt 24 inside and hold the stud bolt 24 in a standing state where a shaft 24b of the stud bolt 24 projects out upward. The head 24a of the stud bolt 24 has a non circular sectional shape and preferably is substantially rectangular when viewed from above. The shaft 24b of the stud bolt 24 is substantially a cylinder having an external thread formed on the outer circumferential surface thereof. The nut (not shown) is screwed onto the shaft 24b of the stud bolt 24 with the terminal fitting 60 connected with the end of the wire attached to the shaft 24b so that the terminal fitting 60 is tightened and fixed. It should be understood, however, that the terminal fitting 60 may be connected with the post fitting portion 21 by other means such as clamps, rivets or the like.

The terminal fitting 60 is formed into a specified shape by bending, folding, embossing or press-working a conductive metal plate with good electrical conductivity and includes a base 61 that is substantially L-shaped when viewed sideways, as shown in FIG. 10. A battery mounting portion 62 is provided at one end of the base 61 and is configured to be mounted on the bolt holding portion 22. A wire connecting portion 63 is provided at the other end of the base 61 and is configured to be crimped, bent or folded into connection with the end of the wire (not shown). The base 61 includes a main plate 61a and a side plate 61b. The main plate 61a is to be arranged substantially parallel with the X-axis and Z-axis and to extend along the upper surface 11a of the battery main body 11. The side plate 61b is to be arranged substantially parallel with the Y-axis and Z-axis and to extending along a surface of the main body 11 being arranged along a side surface 11b of the battery main body 11, which is substantially normal to the upper surface 11a. The main plate 61a is provided with the battery mounting portion 62 and the side plate portion 61b is provided with the wire connecting portion 63. A bolt insertion hole 62a penetrate the battery mounting portion 62 and is engageable with the shaft 24b of the stud bolt 24. The battery mounting portion 62 is to be mounted on the bolt holding portion 22 from above substantially in the Z-axis direction while the shaft 24b of the stud bolt 24 is inserted into the bolt insertion hole 62a. Anti-rotation pieces 64 are provided on the opposite lateral edges of the battery mounting portion 62 and are capable of restricting a mounting angle on the bolt holding portion 22 (stud bolt 24). The anti-rotation pieces 64 are cantilevered to project substantially perpendicularly down from positions near the leading end of the battery mounting portion 62, and can restrict an inadvertent rotational displacement of the terminal fitting 60 about the axial line of the stud bolt 24 (Z-axis) by engaging the inner surfaces of the anti-rotation pieces 64 with the outer side surfaces of the bolt holding portion 22 to prevent rotation of the terminal fitting 60. In the following description, the anti-rotation piece 64 located at the back side in FIG. 10 is called a first anti-rotation piece 64A while the anti-rotation piece 64 at the front side in FIG. 10 is called a second anti-rotation piece 64B.

Figure 6:
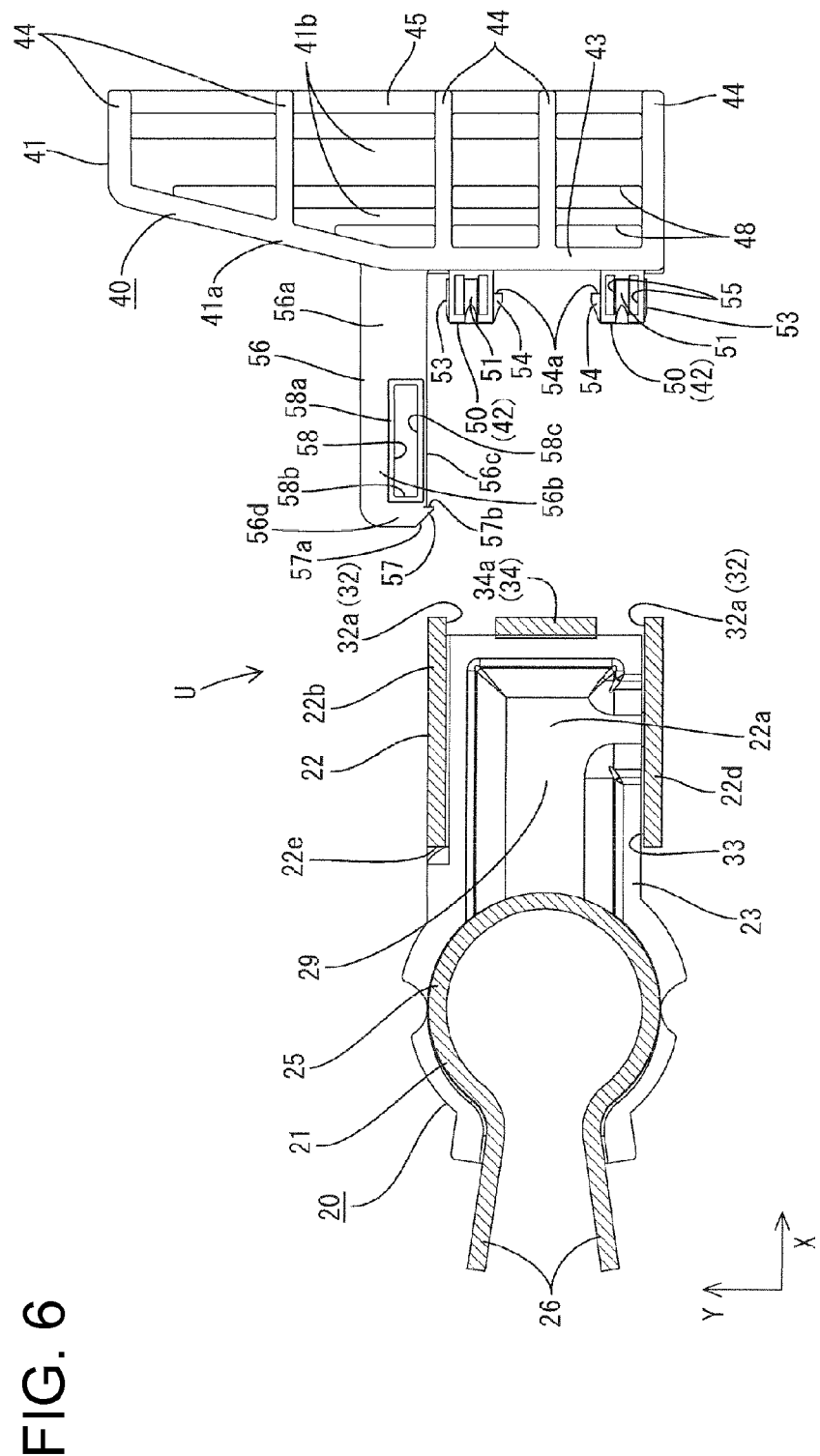
FIG. 6 is a plan view partly in section of the battery terminal and the rotation restricting member.

As shown in FIGS. 4 to 6, the bolt holding portion 22 is formed to have a substantially box shape by bending a piece continuous with the joint 23 along the Y-axis direction. Specifically, the bolt holding portion 22 includes a bottom wall 22*a* that is continuous with and substantially parallel to the joint 23. A first side wall 22*b* projects up substantially in the Z-axis direction from one end of the bottom wall 22*a* in the Y-axis direction. A ceiling wall 22*c* extends substantially in the Y-axis direction from the upper end of the first side wall 22*b* to face the bottom wall 22*a*. A second side wall 22*d* projects down substantially in the Z-axis direction from the extending end of the ceiling wall 22*c* toward the other end of the bottom wall 22*a* in the Y-axis direction to substantially face the first side wall 22*b*. The head 24*a* of the stud bolt 24 is to be at least partly accommodated in an inner accommodation space enclosed by the respective walls 22*a* to 22*d*.

The bottom wall 22*a* includes a lifting portion 29 that is inwardly of and higher than parts of the bottom wall 22*a* adjacent the side walls 22*b* and 22*d* and the part of the bottom wall 22*a* opposite the joint 23, as shown in FIGS. 5 and 6. However, the lifting portion 29 is substantially continuous with the joint 23. The lifting portion 29 lifts up the head 24*a* of the stud bolt 24. A bolt insertion hole 30 penetrates at central part of the ceiling wall 22*c* and receives the shaft 24*b* of the stud bolt 24. A holding piece 31 is formed at a central position of the projecting end of the second side wall 22*d* (FIGS. 1 and 3) and engages the outer surface of the lifting portion 29 for retaining the box shape of the bolt holding portion 22.

Openings 32, 33 are formed in the opposite side surfaces of the bolt holding portion 22. An L-shaped bolt rotation restricting piece 34 is formed near the edge of the opening 32 and substantially opposite to the post fitting portion 21 for engaging the head 24*a* of the stud bolt 24 and restricting the rotation of the stud bolt 24. As shown in FIGS. 4 and 5, the bolt rotation restricting piece 34 includes a standing portion 34*a* and a bolt engaging portion 34*b* The standing portion 34*a* stands up in the Z-axis direction from a lateral edge of the bottom wall 22*a* at the opening 32. The bolt engaging portion 34*b* projects in the X-axis direction from the leading end of the standing portion 34*a* and is arranged between the bottom wall 22*a* and the ceiling wall 22*c*. The leading end surface of the bolt engaging portion 34*b* of the bolt rotation restricting piece 34 is engageable with the side surface of the head 24*a* of the stud bolt 24. The leading end of the bolt engaging portion 34*b* is at substantially the same position as the lateral end position of the lifting portion 29 of the bottom wall 22*a* in the Y-axis direction. Further, a tiny clearance is defined between the bolt engaging portion 34*b* and the ceiling wall 22*c*.

As shown in FIG. 4, the bolt rotation restricting piece 34 has a width of about half the width of the opening 32 and is arranged at a substantially central position of the bolt holding portion 22 in the Y-axis direction to partly close the opening 32. Accordingly, the bolt rotation restricting piece 34 divides the opening 32 into substantially equal left and right divided openings 32*a*. A dead space where the stud bolt 24 is not present communicates with the back sides of the divided openings 32*a* at positions between the opposite side walls 22*b*, 22*d* of the bolt holding portion 22 and the bolt rotation restricting piece 34.

The rotation restricting member 40 is made e.g. of synthetic resin and contacts the battery 10 while being united with the battery terminal 20 to restrict the mounting angle of the battery terminal 20 on the battery 10 (FIG. 15). Specifically, the rotation restricting member 40 includes a main body 41 that can contact the battery 10. Press-fitting portions 42 project from the main body 41 and can be press-fit into the battery terminal 20, as shown in FIGS. 1 and 6. The rotation restricting member 40 is attached to the battery terminal 20 substantially in the X-axis direction. In the following description, an attaching direction (leftward direction of FIG. 6) of the rotation restricting member 40 to the battery terminal 20 is called a forward direction and an opposite direction (rightward direction of FIG. 6) is called a backward direction.

Figure 7:
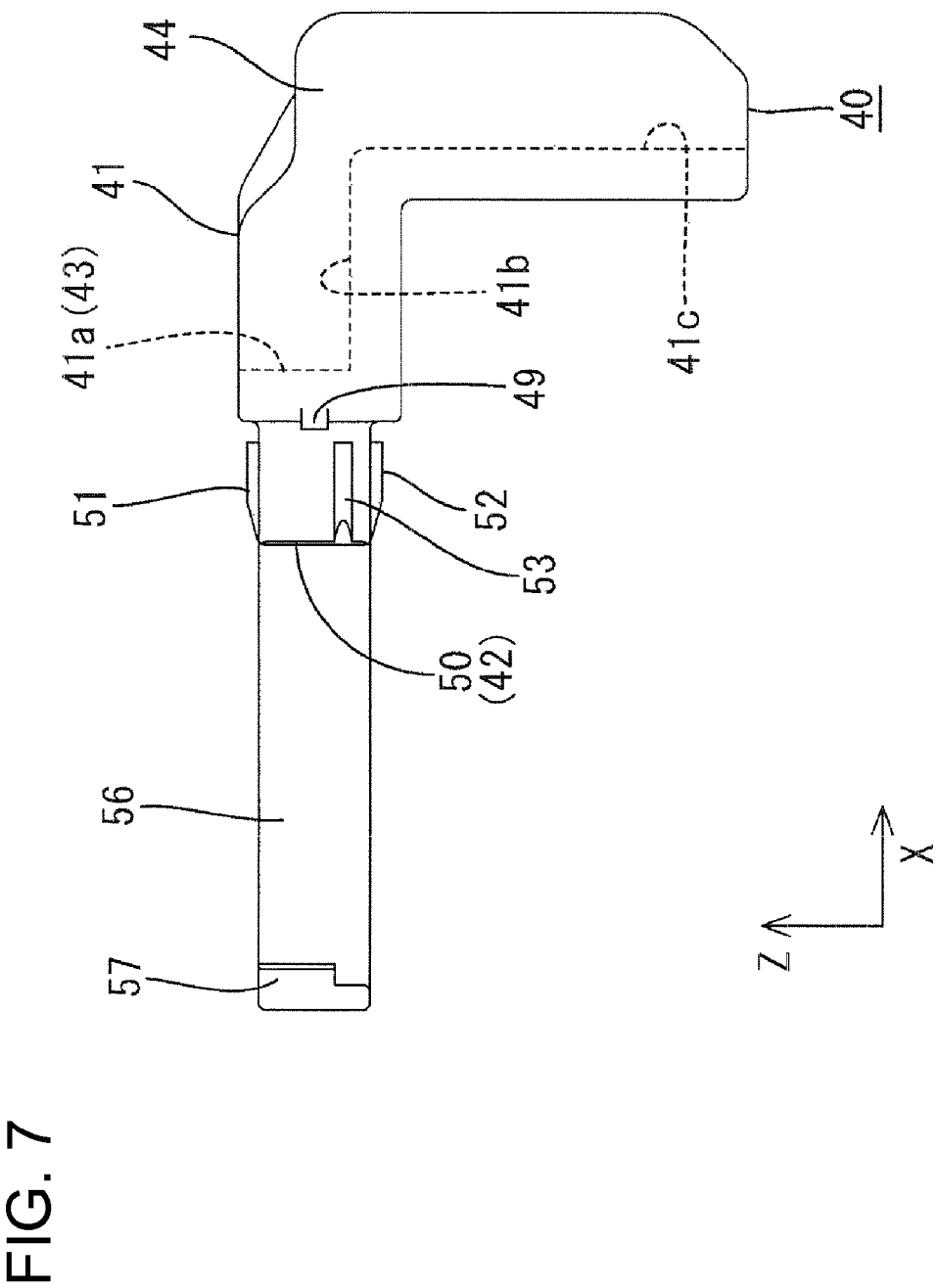
FIG. 7 is a side view of the rotation restricting member.

As shown in FIG. 7, the main body 41 has a substantially crank shape when viewed along the Y-axis direction and includes a vertical wall 41*a*, a horizontal wall 41*b* and a rotation restricting wall 41*c*. The vertical wall 41*a* extends substantially in the Z-axis direction and is formed with a terminal receiving portion 43 for receiving the battery terminal 20. The horizontal wall 41*b* extends substantially in the X-axis direction and can be placed on the upper surface 11*a* of the battery main body 11. The rotation restricting wall 41*c* extends substantially in the Z-axis direction and can be brought into contact with the side surface 11*b* of the battery main body 11 extending in the Z-axis and Y-axis directions. A dimension of the main body 41 in the Y-axis direction preferably is at least more twice that of the battery terminal 20.

As shown in FIGS. 1 and 6, the vertical wall 41*a* is substantially straight in the Z-axis direction in its entire region. However, a front part of the vertical wall 41*a* in FIGS. 1 and 6 is substantially straight in the Y-axis direction, whereas a back part thereof in FIGS. 1 and 6 is inclined with respect to the Y-axis direction. The part of the vertical wall 41*a* that is straight in the Y-axis direction forms the terminal receiving portion 43 and is placed at the opening 32 of the bolt holding portion 22 of the battery terminal 20. The inclined part of the vertical wall 41*a* is retracted from the battery terminal 20, and hence a dimension of the horizontal wall 41*b* in the X-axis direction becomes smaller toward the back side of FIGS. 1 and 6. The horizontal wall 41*b* is substantially straight in the X-axis and Y-axis directions for achieving surface contact with the upper surface 11*a* of the battery main body 11. As shown in FIG. 6, slits 48 penetrate the horizontal wall 41*b* at positions spaced apart in the X-axis direction and permit heat generated from the battery 10 to escape. The rotation restricting wall 41*c* is substantially straight in the Y-axis and Z-axis direction in its entire region for achieving surface contact with and the side surface 11*b* of the battery main body 11.

Figure 9:
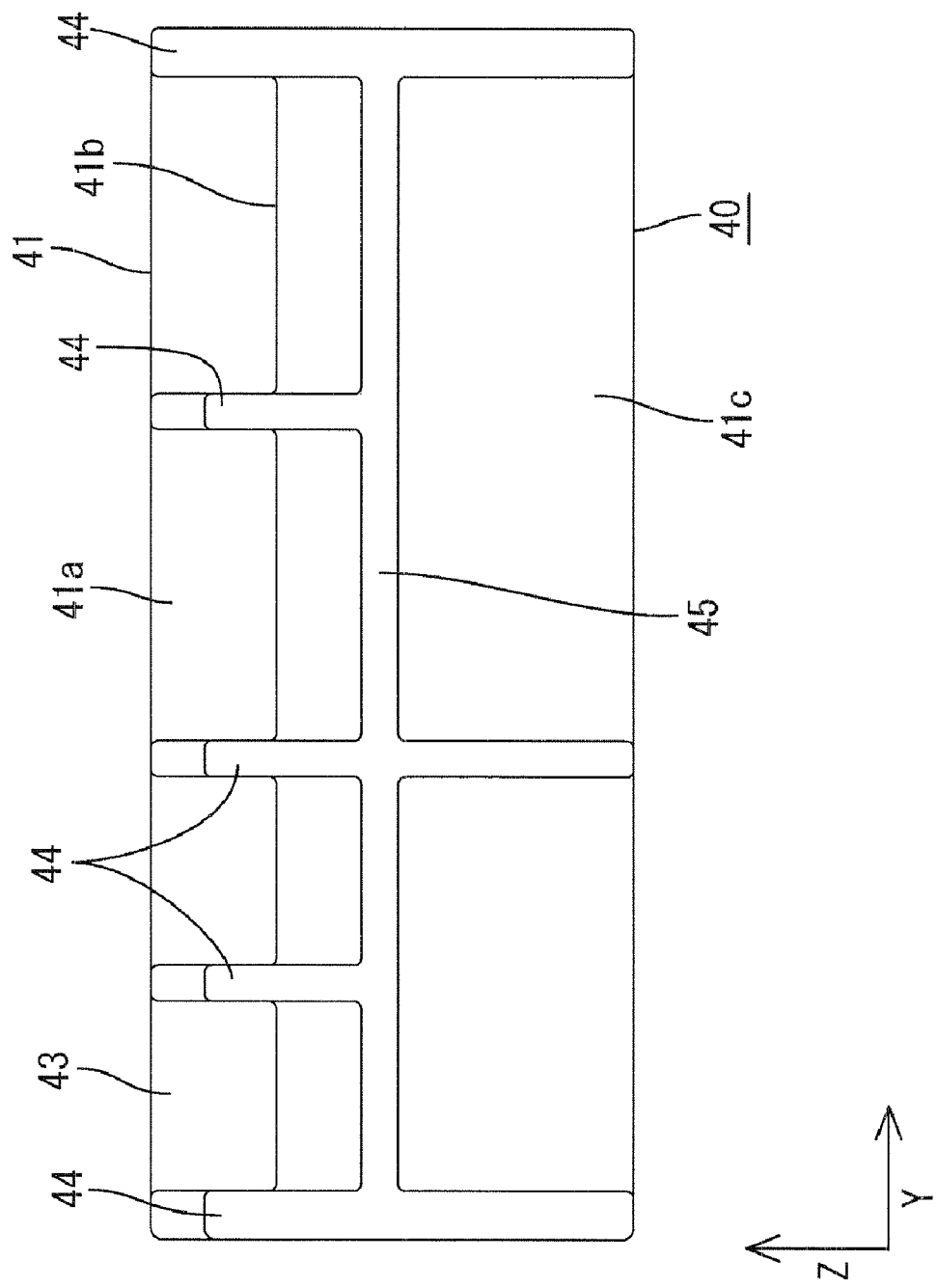
FIG. 9 is a rear view of the rotation restricting member.

As shown in FIGS. 6 and 9, reinforcing walls 44 are formed on outer surfaces of the walls 41*a* to 41*c* of the main body 41, and hence on surfaces opposite to the battery 10 and the battery terminal 20. The reinforcing walls extend in the Z-axis and X-axis directions and are formed at specified intervals in the Y-axis direction. The reinforcing walls 44 at the opposite end positions and the middle position in the Y-axis direction are formed over the entire lengths of the vertical wall 41*a*, the horizontal wall 41*b* and the rotation restricting wall 41*c* in the X-axis or Z-axis direction. However, the remaining reinforcing walls 44 are formed over the entire lengths of the vertical wall 41*a* and the horizontal wall 41*b* in X-axis or Z-axis direction, but extend only to an intermediate position of the rotation restricting wall 41*c*. The leading ends of the respective vertical reinforcing walls 44 in the X-axis direction are connected with a horizontal reinforcing wall 45 extending in the X-axis and the Y-axis directions while crossing the vertical reinforcing walls 44. A space is formed between the horizontal reinforcing wall 45 and the outer surface of the rotation restricting wall 41*c* and is open in the Z-axis direction.

Figure 8:
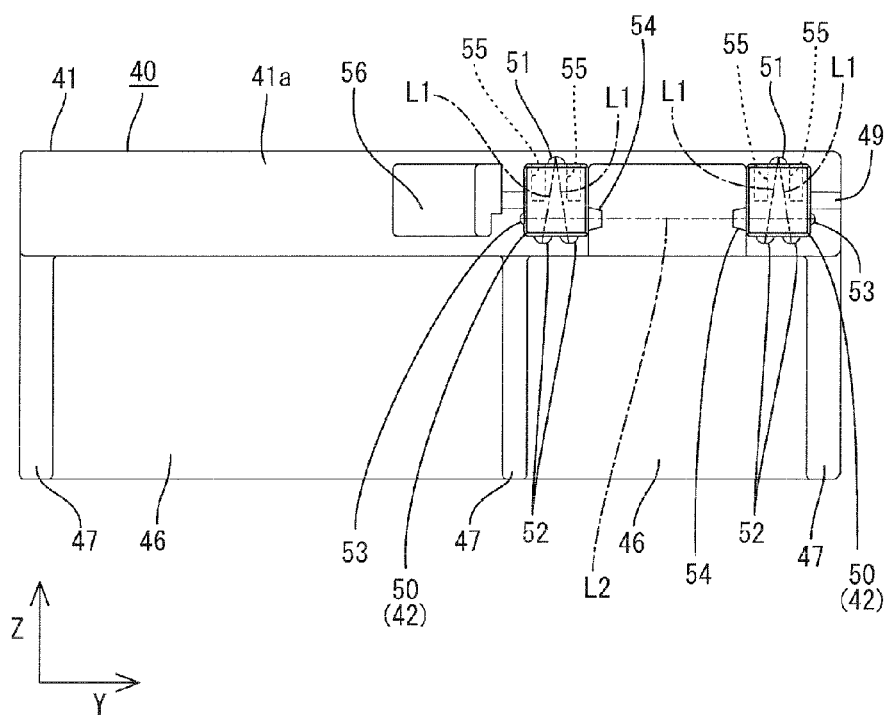
FIG. 8 is a front view of the rotation restricting member.

As shown in FIGS. 1 and 8, shallow recesses 46 are formed in regions of the inner surface of the rotation restricting wall 41c offset from the outermost vertical reinforcing walls 44 and the middle vertical reinforcing wall 44. The recesses 46 face the side surface 11b of the battery main body 11, and hence the contact area of the rotation restricting wall 41c with the side surface 11b of the battery main body 11 is reduced by the area of the recesses 46. Conversely, long vertical projections 47 are formed in the areas of the inner surface of the rotation restricting wall 41c at positions aligned with the outermost and middle vertical reinforcing walls 44, and only the projecting portions 47 are brought into contact with the side surface 11b of the battery main body 11.

As shown in FIGS. 1 and 6, two press-fitting portions 42 are provided on the inner surface of the terminal receiving portion 43 of the main body 41 to face toward the battery terminal 20. The press-fitting portions 42 are spaced apart in the Y-axis direction by a specified distance that substantially coincides with the spacing between the two divided openings 32a in the battery terminal 20. Two receiving projections 49 are provided on the inner surface of the terminal receiving portion 43 at the outer sides of the press-fitting portions 42 in the Y-axis direction and can be brought into contact with the end surface of the battery terminal 20.

Each press-fitting portion 42 includes an inserting projection 50 that projects from the inner surface of the terminal receiving portion 43 along the X-axis and in the attaching direction to the battery terminal 20. Ribs 51 to 53 are formed on the outer peripheral surface of the inserting projection 50 and project in directions intersecting the attaching direction to the battery terminal 20. The ribs 51 to 53 are squeezed by the edge of the opening 32. At least one retaining projection 54 projects in the Y-axis direction from the circumferential surface of the inserting projection 50 and is engageable with the bolt rotation restricting piece 34.

The inserting projection 50 is substantially block-shaped and has a slightly vertically long rectangular shape when viewed from the front in the X-axis direction, as shown in FIG. 8. The inserting projections 50 are insertable into the divided openings 32a in the battery terminal 20, and have height and width dimensions measured along the Z-axis and Y-axis directions that are slightly less than corresponding dimensions of the divided openings 32a. A projecting distance of the inserting projection 50 from the terminal receiving portion 43 along the X-axis is substantially equal to a dimension of the bolt rotation restricting piece 34 of the battery terminal 20 in the X-axis direction (FIG. 6).

As shown in FIGS. 1 and 8, the ribs 51 to 53 include a first rib 51 that projects up in the Z-axis direction from the upper surface of the inserting projection 50, second ribs 52 that project down in the Z-axis direction from the lower surface of the inserting projection 50 and a third rib 53 that projects out in the Y-axis direction from an outer side surface of the inserting projection 50. Each rib 51 to 53 has a semicircular shape when viewed from the front in the X-axis direction and extends along the entire length of the inserting projection 50 in the X-axis direction. The front end surface of each rib 51 to 53 in the attaching direction is beveled to form a slanted surface for smooth insertion into the opening 32.

The widths of the first and second ribs 51, 52 are substantially equal to each other and larger than the width of the third rib 53. The first rib 51 is at a substantially central position of the inserting projection 50 in the Y-axis direction, whereas second ribs 52 are at positions spaced from the center of the inserting projection 50 in the Y-axis direction by a specified distance. More particularly, the first rib 51 is at a middle position between the two second ribs 52 in the Y-axis direction and conversely the second ribs 52 are at the opposite sides of the first rib 51 in the Y-axis direction in the inserting projection 50. Furthermore, the widthwise sides of the first and second ribs 51, 52 overlap in the Y-axis direction, but the widthwise centers are displaced from each other. The second ribs 52 are at symmetrical positions with respect to the central position of the inserting projection 50 in the Y-axis direction.

Figure 13:
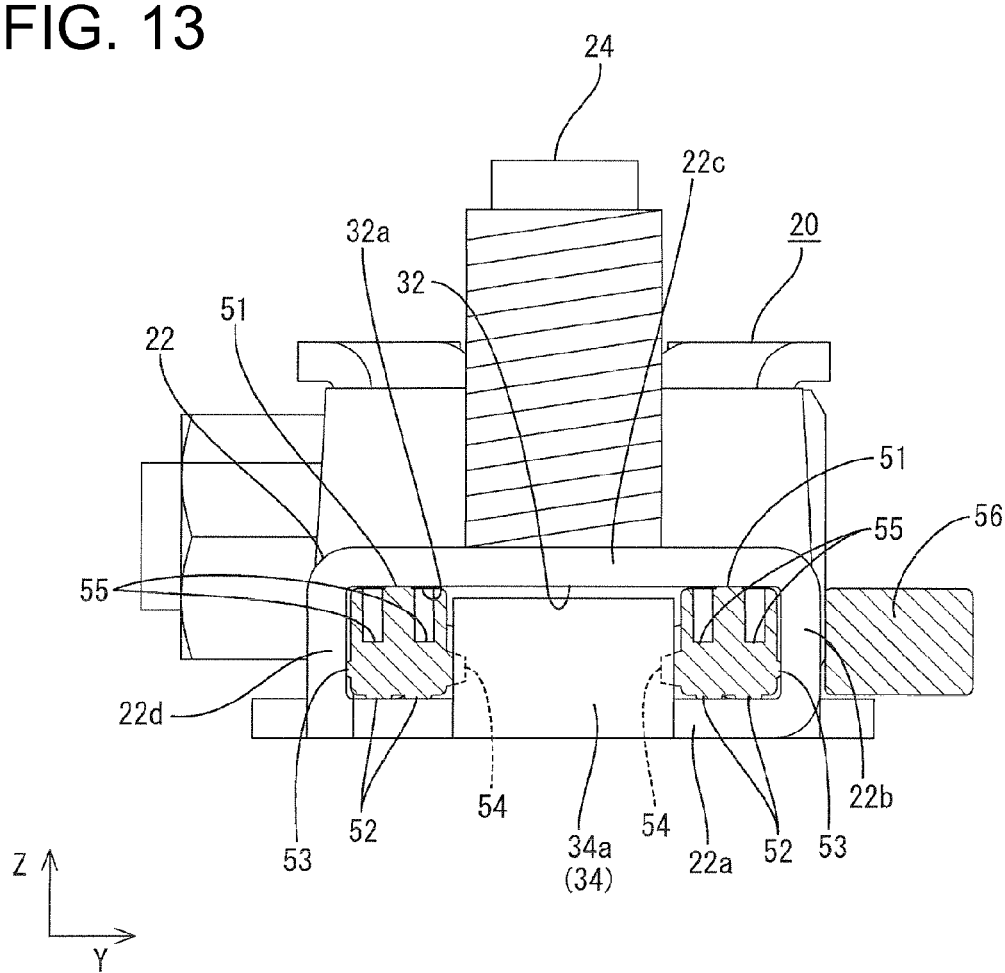
FIG. 13 is a section along xiii-xiii of FIG. 12.

Projecting distances of the first and second ribs 51, 52 from the peripheral surface of the inserting projection 50 are substantially equal. The projecting distances of the first and second ribs 51 and 52 exceeds a difference between the dimensions of the inserting projection 50 and the divided opening 32a in the Z-axis direction. Accordingly, the first and second ribs 51, 52 are squeezed by the opening edge of the opening 32 to obtain a desired holding force, when the inserting projection 50 is inserted into the divided opening 32a (FIG. 13).

The third rib 53 is below a central position of the outer side surface of the inserting projection 50 in the Z-axis direction. A projecting distance of the third rib 53 is less than projecting distances of the first and second ribs 51, 52. The retaining projections 54 project toward one another in the Y-axis direction from inner side surfaces of the inserting projection 50. The third rib 53 and the retaining projection 54 are at substantially the same positions on the inserting projection 50 in the Z-axis direction, but on opposite sides of the inserting projection 54.

The retaining projection 54 is substantially block-shaped and tapers toward the projecting end to define a substantially trapezoidal or pointed shape when viewed from the front in the X-axis direction. The base end of each retaining projection 54 is wider than base ends of the first and second ribs 51, 52. Projecting distances of the retaining projection 54 exceed projecting distances of the respective ribs 51 to 53. The retaining projection 54 is at a leading end of the inserting projection 50 in the X-axis direction. The front end surface of the retaining projection 54 in the attaching direction is beveled to ensure smooth insertion into the opening 32 (FIG. 6).

Figure 14:
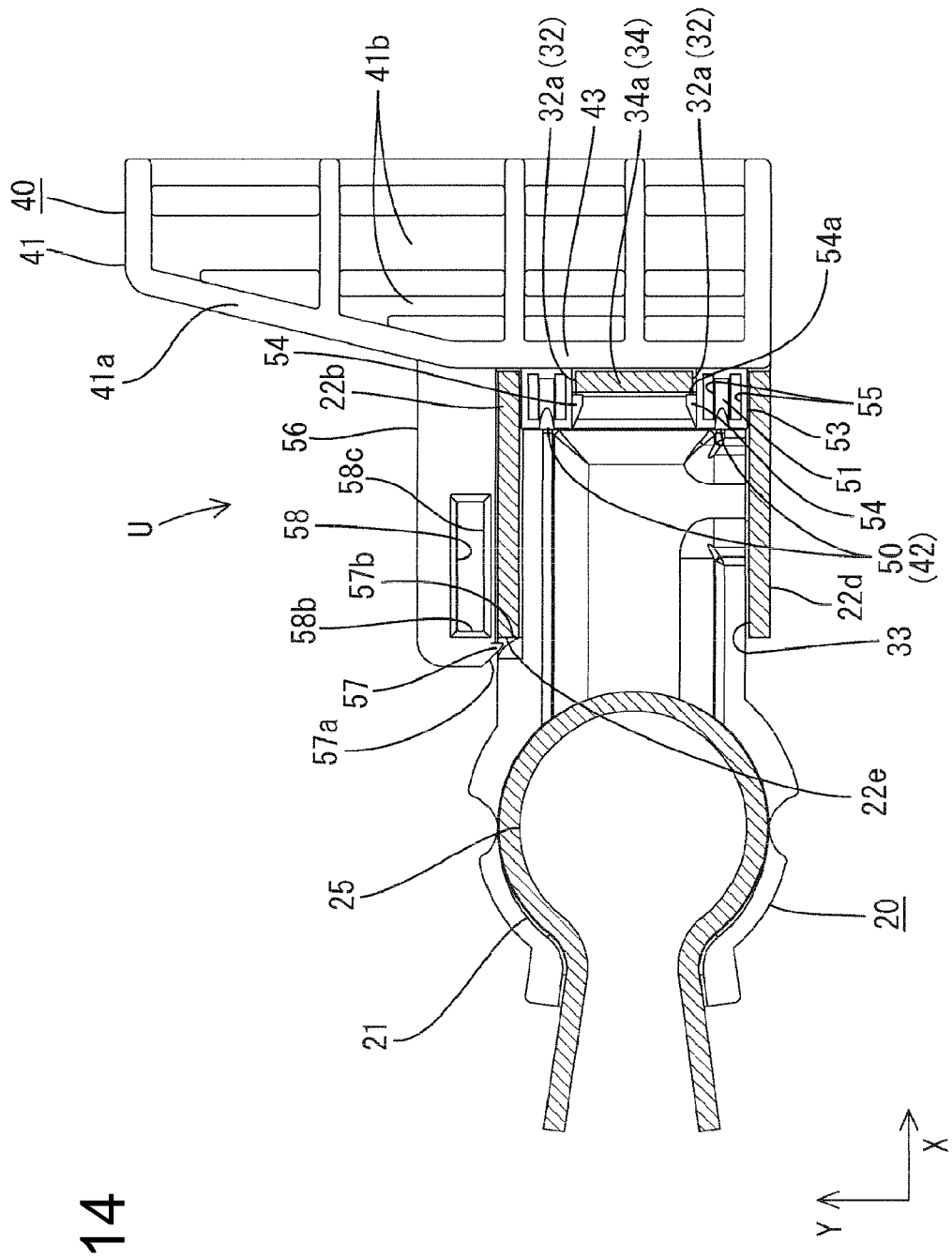
FIG. 14 is a plan view partly in section showing the state where the rotation restricting member is assembled with the battery terminal.

The sum of the projecting Y-axis distances of the third rib 53 and the retaining projection 54 from the side surfaces of the inserting projection 50 exceeds a difference between dimensions of the inserting projection 50 and the divided opening 32a in the Y-axis direction, as shown in FIG. 6. Further, the projecting distance of the retaining projection 54 alone exceeds the difference between dimensions of the inserting projection 50 and the divided opening 32a in the Y-axis direction. Accordingly, the third rib 53 and the retaining projection 54 are squeezed by the opening edge of the opening 32 when the inserting projection 50 is inserted into the divided opening 32a (FIG. 13). More particularly, the standing portion 34a of the bolt rotation restricting piece 34 at the edge of the opening 32 abrades the retaining projection 54 to a certain degree, but the retaining projection can be inserted forcibly to a side behind the standing portion 34a (FIG. 14). The rear end surface of the retaining projection 54 facing opposite to the attaching direction to the battery terminal 20 defines as a locking surface 54a for engaging the standing portion 34a of the bolt rotation restricting piece 34. The locking surface 54a is substantially straight in the Y-axis and Z-axis directions.

As described above, the ribs 51 to 53 and retaining projections 54 of the press-fitting portions 42 hold the rotation restricting member 40 undetachably and without shaking when the rotation restricting member 40 is attached to the battery terminal 20.

As shown in FIGS. 6 and 8, two bores 55 are formed in the upper surface of each inserting projection 50 at opposite sides of the first rib 51. The centers of the bores 55 are displaced slightly out from the centers of the second ribs 52 in the Y-axis direction. The bores 55 have a vertically long rectangular shape when viewed from front in the X-axis direction. Further, the bores 55 are spaced rearward from the front end of the inserting projection 50 and open only upward. The bored portions 55 reduce the likelihood of sinks in the inserting projections 50 when the rotation restricting member 40 is resin-molded.

As shown in FIG. 8, the width and depth of the bores 55 are set so that the bores 55 do not intersect with or overlap two lines L1 that connect the projecting end of the first rib 51 and projecting ends of the second ribs 52 when the inserting projection 50 is viewed from front in the X-axis direction. Further, the depth of the bores 55 is set such that the bores 55 are offset from a line L2 extending in the Y-axis direction and passing the projecting ends of the third rib 53 and the retaining projection 54 when the inserting projection 50 is viewed from front in the X-axis direction.

A detachment restricting piece 56 is formed at a position on the vertical wall 41a of the main body 41 lateral to the terminal receiving portion 43 and is cantilevered to project along the X-axis direction parallel to the press-fitting portions 42 and in the attaching direction of the rotation restricting member 40 to the battery terminal 20, as shown in FIGS. 6 to 8. The detachment restricting piece 56 has substantially the same width over the entire length. The length of the detachment restricting piece 56 in the X-axis direction exceeds the length of the bolt holding portion 22. The detachment restricting piece 56 is resiliently deformable to a small degree in the Y-axis direction, i.e. a direction orthogonal to the attaching direction of the rotation restricting member 40 to the battery terminal 20 with the base end thereof as a support.

A lock 57 is provided near the leading end of the detachment restricting piece 56 and defines a hook that projects in the Y-axis direction toward the adjacent press-fitting portion 42. A slanted guiding surface 57a is formed at the front of the lock 57 and is inclined to the X-axis. A locking surface 57b is formed at the rear of the lock 57 and extends straight in the Y-axis direction. The locking surface 57b of the lock 57 engages the bolt holding portion 22 to prevent detachment of the rotation restricting member 40 from the battery terminal 20.

Figure 12:
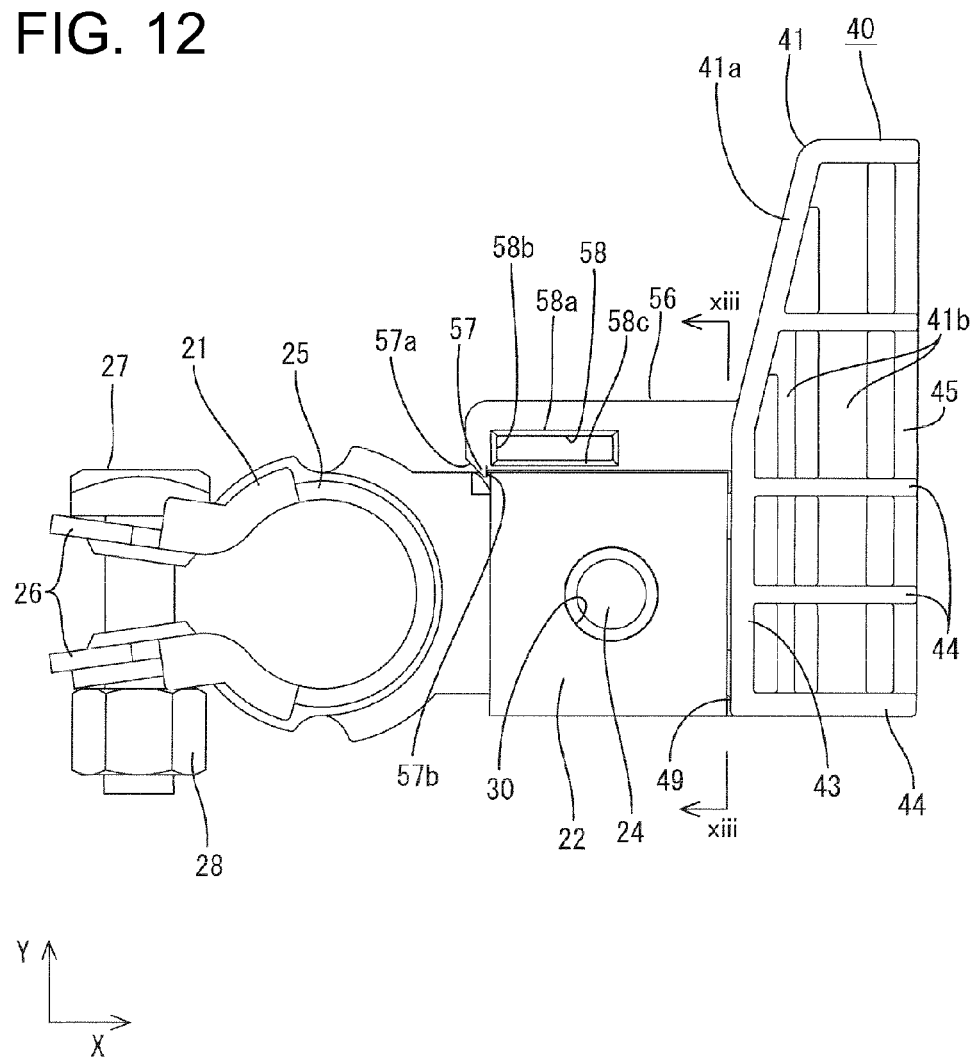
FIG. 12 is a plan view showing the state where the rotation restricting member is assembled with the battery terminal.

Upon attaching the rotation restricting member 40 to the battery terminal 20, the lock 57 of the detachment restricting piece 56 passes a lateral side of the bolt holding portion and engages the bolt holding portion 22 at a side opposite to the main body 41, as shown in FIG. 12. In this attached state, the main body 41 is arranged substantially side by side with the bolt holding portion 22 in the X-axis direction, whereas the detachment restricting piece 56 is arranged substantially side by side with the bolt holding portion 22 in the Y-axis direction, i.e. a direction substantially orthogonal to the longitudinal directions (Z-axis direction) of the stud bolt 24 and the battery post 12. In other words, the detachment restricting piece 56 overlaps the bolt holding portion 22 in the Y-axis direction, but not in the Z-axis direction. The inner surface of the detachment restricting piece 56 contacts the outer side surface of the bolt holding portion 22. The locking surface 57b of the lock 57 engages an engageable surface 22e of the first side wall 22b of the bolt holding portion 22 at the side opposite to the main body 41. Thus, the lock 57 of the detachment restricting piece 56 is engaged with the edge of the opening 33 closer to the post fitting portion 21 in the bolt holding portion 22.

Figure 18:
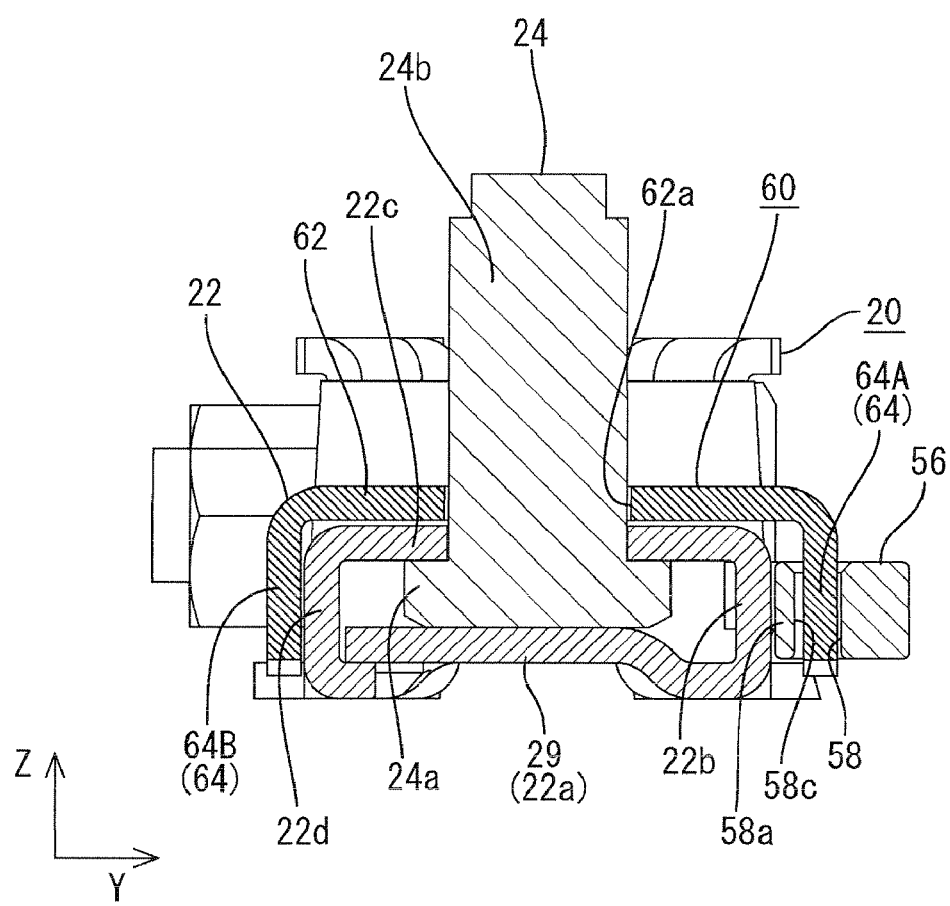
FIG. 18 is a section along xviii-xviii of FIG. 17.
Figure 19:
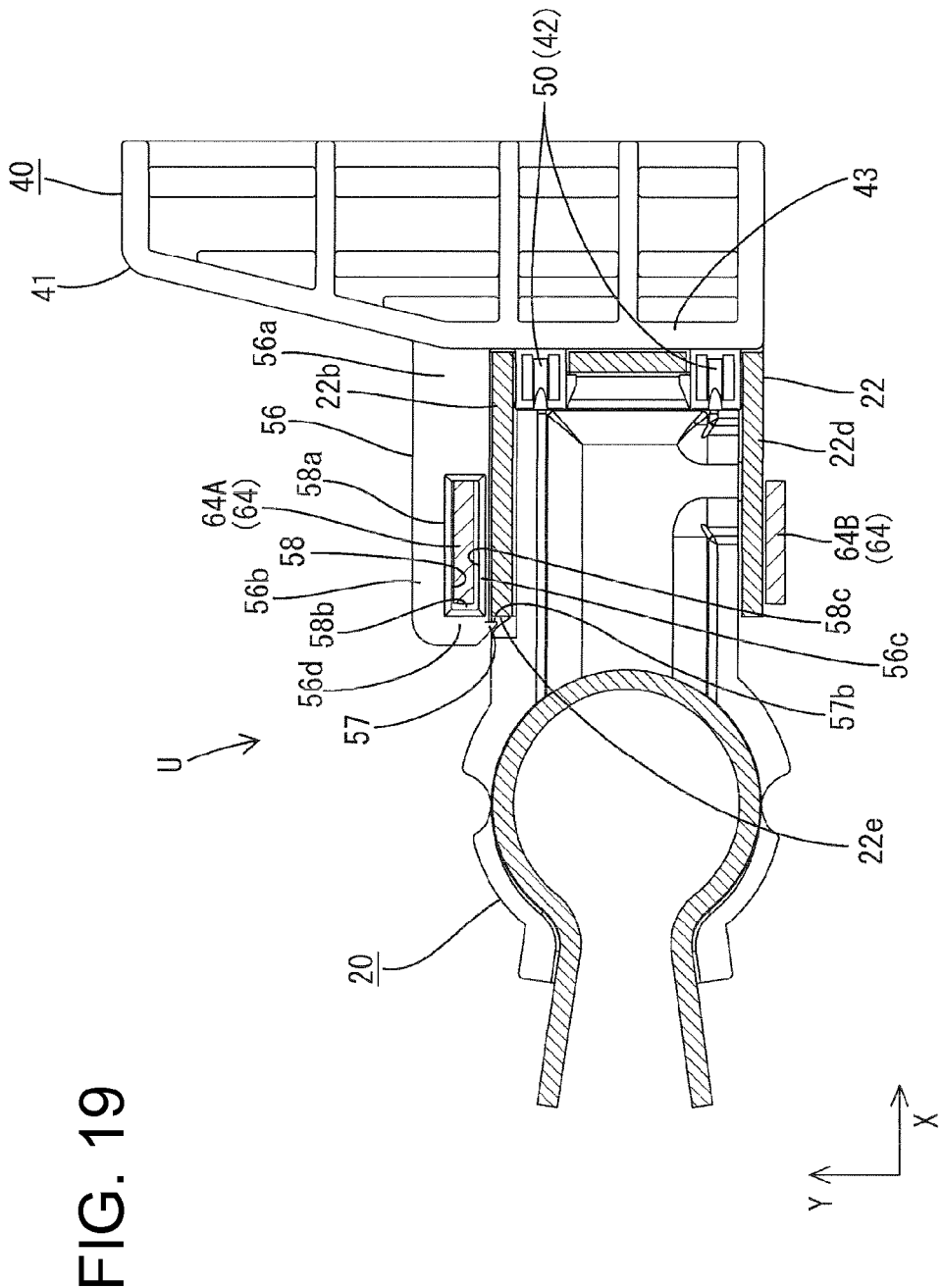
FIG. 19 is a plan view partly in section showing a state where the terminal fitting is assembled with the battery terminal.

The terminal fitting 60 to be mounted on the bolt holding portion 22 is engageable with this detachment restricting piece 56. Specifically, the detachment restricting piece 56 includes a receiving hole 58 for receiving a first anti-rotation piece 64A that projects down from the battery mounting portion 62 of the terminal fitting 60. With the battery mounting portion 62 of the terminal fitting 60 placed on the bolt holding portion 22, the first anti-rotation piece 64A is inserted in the receiving hole 58 and engages a wall surface of the receiving hole 58, as shown in FIGS. 18 and 19. Thus, the main body 41 that is unitary to the detachment restricting piece 56 is prevented from moving in a detaching direction from the bolt holding portion 22 united with the terminal fitting 60, i.e. the direction opposite to the attaching direction of the main body 41.

The receiving hole 58 penetrates the detachment restricting piece 56 in the Z-axis direction (FIG. 19). The receiving hole 58 has a narrow rectangular shape that is long in the X-axis direction and substantially in conforms to the cross sectional shape of the first anti-rotation piece 64A (FIG. 18). Accordingly, an edge 58a of this receiving hole 58 has a long continuous frame shape. A detachment restricting engaging surface 58b is defined in the receiving hole 58 at a side opposite to the main body 41 and is engaged with an end surface of the first anti-rotation piece 64A facing away from the main body 41. Thus, the main body 41 and the rotation restricting member 40 are retained (FIG. 19). The detachment restricting piece 56 includes a base 56a projecting from the main body 41, two arms 56b, 56c projecting from the base 56a at the opposite sides of the receiving portion 58, and a connecting portion 56d connecting the leading ends of the arms 56b, 56c. The connecting portion 56d engages the first anti-rotation piece 64A to prevent detachment of the rotation restricting member 40 (FIGS. 6 and 19).

An anti-rotation contact surface 58c is defined at a side of receiving hole 58 located close to the bolt holding portion 22 in the Y-axis direction and extends in the X-axis direction (FIG. 18). The inner surface of the first anti-rotation piece 64A can be brought into contact with the anti-rotation contact surface 58c. In contrast, a second anti-rotation piece 64B can be brought into contact with the outer side surface of the bolt holding portion 22. The anti-rotation pieces 64 contact the outer side surface of the bolt holding portion 22 and the anti-rotation contact surface 58c of the receiving hole 58 of the detachment restricting portion 56 arranged adjacent to the bolt holding portion 22 for reliably preventing rotation of the terminal fitting 60 with respect to the bolt holding portion 22 (stud bolt 24). In the attached state, the arm 56c is sandwiched between the bolt holding portion 22 and the first anti-rotation piece 64A. The spacing between the inner surfaces of the anti-rotation pieces 64 is substantially equal to the sum of the width of the bolt holding portion 22 and the width of the arm 56c in the Y-axis direction. In this way, the first anti-rotation piece 64A prevents rotation of the terminal fitting 60 and retains the detachment restricting portion 56.

The rotation restricting member 40 is attached to the battery terminal 20 with the stud bolt 24 accommodated in the bolt holding portion 22. More particularly, the rotation restricting member 40 is brought closer to the battery terminal 20 in the X-axis direction while the press-fitting portions 42 of the rotation restricting member 40 are aligned with the divided openings 32a of the bolt holding portion 22 in the battery terminal 20. As the inserting projections 50 of the respective press-fitting portions 42 are inserted into the corresponding divided openings 32a, the first, second and third ribs 51, 52 and 53 are squeezed by the upper, lower and outer sides of the opening edges of the divided operations 32a. At this time, the retaining projections 54 interfere with the standing portion 34a of the bolt rotation restricting piece 34 at the inner sides of the opening edges of the divided openings 32a, thereby being forcibly inserted toward the side behind the standing portion 34*a* when viewed from the rotation restricting member 40 while being abraded to a certain degree.

On the other hand, in the above attaching process, the lock 57 moves onto the first side wall 22*b* of the bolt holding portion 22. Thus, the detachment restricting piece 56 resiliently deforms slightly outwardly in a direction away from the bolt holding portion 22. The movement of the lock 57 onto the first side wall 22*b* is guided smoothly by the guiding surface 57*a* of the lock 57.

Figure 11:
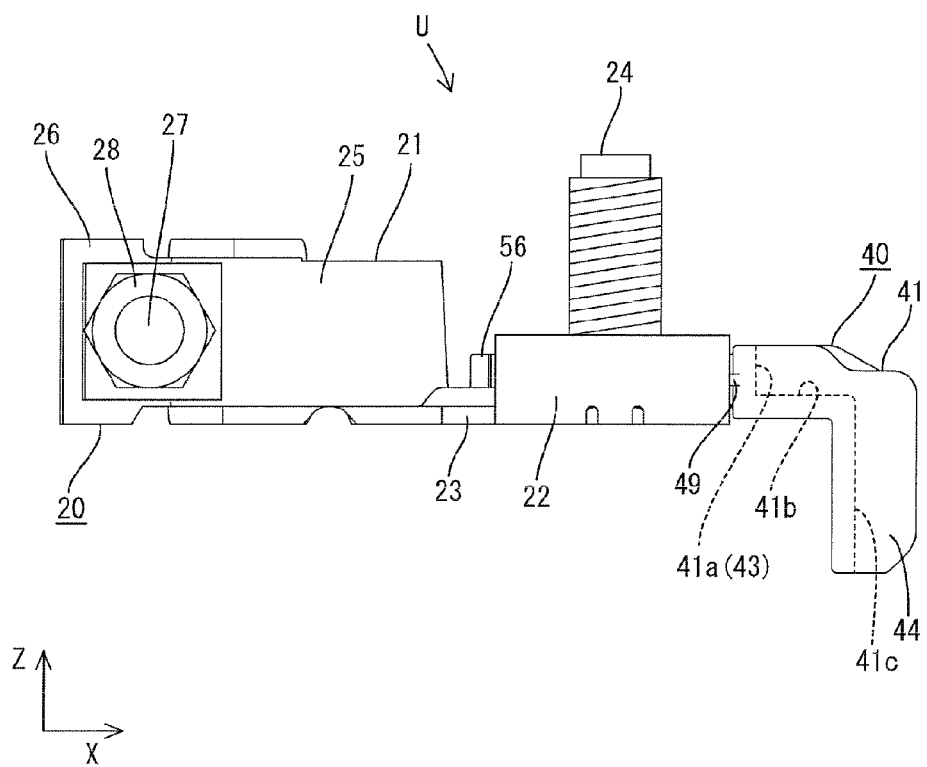
FIG. 11 is a side view showing a state where the rotation restricting member is assembled with the battery terminal.

When the respective press-fitting portions 42 are press-fit into the corresponding divided openings 32*a* to a proper depth, the receiving projections 49 of the terminal receiving portions 43 contact the side end surfaces of the bolt holding portion 22 to prevent the rotation restricting member 40 from being pushed any further (FIGS. 10 to 12). In this attached state, the rotation restricting member 40 is undetachably held onto the battery terminal 20 by a frictional resistance force obtained by squeezing the ribs 51 to 53 and a locking force obtained by engaging the locking surfaces 54*a* of the retaining projections 54 with the standing portion 34*a* of the bolt rotation restricting piece 34, as shown in FIGS. 13 and 14. Specifically, the rotation restricting member 40 is held so as not to be displaced relative to the battery terminal 20 in the Z-axis direction by the first and second ribs 51, 52 and in the Y-axis direction by the third ribs 53 and is held so as not to be relatively displaceable in the detaching direction in the X-axis direction by the retaining projections 54. As a result, the rotation restricting member 40 is prevented from shaking relative to the battery terminal 20 in any one of the X-, Y- and Z-axis directions. Further, the second ribs 52 are arranged at a specified distance from each other in each inserting projection 50 so that the inserting projections 50 are not likely to incline about their axial lines (X-axis) in the divided openings 32*a*. Furthermore, the press-fitting portions 20 are arranged substantially side by side in the Y-axis direction in the main body 41. Thus, the main body 41 is extremely unlikely to incline about the Z-axis or about the X-axis relative to the battery terminal 20.

The detachment restricting piece 56, the ribs 51 to 53 and the retaining projections 54 hold the rotation restricting member 40 on the battery terminal 20 in the attached state. The lock 57 of the detachment restricting piece 56 moves over the first side wall 22*b* of the bolt holding portion 22 when the rotation restricting member 40 is pushed to a proper depth into the battery terminal 20 and the detachment restricting piece 56 is restored resiliently so that the locking surface 57*b* of the lock 57 engages the engageable surface 22*e* of the first side wall 22*b* as shown in FIGS. 12 and 14. In this way, the detachment restricting piece 56 engages the bolt holding portion 22 to prevent the rotation restricting member 40 from detaching from the battery terminal 20 even if a force acts to pull the rotation restricting member 40 from the battery terminal 20 in the direction opposite to the attaching direction. As described above, the rotation restricting member 40 can be held firmly on the battery terminal 20 by the press-fitting portions 42 and the detachment restricting piece 56, with the result that the battery terminal 20 and the rotation restricting member 40 are united so as not to shake.

The terminal fitting 60 connected with the wire is mounted on the bolt holding portion 22 of the battery terminal 20 united with the rotation restricting member 40 as described above. The shaft 24*b* of the stud bolt 24 is passed through the bolt insertion hole 62*a* of the terminal fitting 60, and the main plate portion 61*a* of the base portion 61 is brought into contact with the upper surface of the bolt holding portion 22. In this process, the first anti-rotation piece 64A is inserted into the receiving hole 58 of the detachment restricting piece 56 and the second anti-rotation piece 64B is arranged outside the bolt holding portion 22.

With the terminal fitting 60 mounted on the bolt holding portion 22, the main plate 61*a* of the terminal fitting 60 is held in contact with the upper surface of the bolt holding portion 22. Additionally, the second anti-rotation piece 64B of the two anti-rotation pieces 64 is in contact with the outer side surface of the second side wall 22*d* of the bolt holding portion 22 and the first anti-rotation piece 64A is inserted in the receiving portion 58 of the detachment restricting piece 56 to be arranged in contact with the inner circumferential wall surfaces of the receiving portion 58, as shown in FIGS. 15 to 19. In this state, the end surface of the first anti-rotation piece 64A at the side opposite to the main body 41 in the X-axis direction and the detachment restricting engaging surface 58*b* of the receiving portion 58 face each other even if a force should act to pull the main body 41 in the direction opposite to the pressing direction. Thus, a displacement of the main body 41 in the detaching direction relative to the terminal fitting 60 and the bolt holding portion 22 is restricted by engagement the detachment restricting engaging surface 58*b* with the first anti-rotation piece 64A and/or the press-fitting action by the press-fitting portions 42 and locking action by the locking portion 57 (FIG. 19). As a result, the rotation restricting member 40 can be held onto the battery terminal 20 via the terminal fitting 60 preferably with a larger holding force. Further, the first anti-rotation piece 64A preferably is held substantially in contact with the anti-rotation contact surface 58*c* of the receiving portion 58 of the detachment restricting piece 56 and/or the second anti-rotation piece 64B preferably is held substantially in contact with the outer side surface of the second side wall 22*d* of the bolt holding portion 22, whereby the rotation of the terminal fitting 60 relative to the stud bolt 24 can be prevented (FIG. 18).

Subsequently, the battery terminal unit U obtained as described above is mounted on or to the battery 10. First of all, the post fitting portion 21 of the battery terminal 20 is at least partly fitted on the battery post 12 of the battery 10. At this time, as shown in FIGS. 15 to 17, the rotation restricting wall 41*c* forming the main body 41 of the rotation restricting member 40 is brought substantially into contact with the side surface 11*b* of the battery main body 11. When the battery terminal 20 is placed substantially on the upper surface 11*a* of the battery main body 11, the operable mounting member is operated to fix the battery terminal 20 on the battery post 12, preferably the bolt 27 and the nut 28 of the post fitting portion 21 are appropriately tightened using a tool. Then, the tightening portion 25 of the post fitting portion 21 is resiliently deformed to reduce the inner diameter thereof and the inner circumferential surface thereof is pressed into contact with the outer circumferential surface of the battery post 12, with the result that the battery terminal 20 is held mounted on the battery post 12.

At this time, the battery terminal 20 may be rotationally displaced about the axial line (Z-axis) of the battery post 12 by a torque generated as the bolt 27 is tightened. However, since the projecting portions 47 of the rotation restricting wall 41*c* extending in the Y-axis and Z-axis directions in the rotation restricting member 40 united with the battery terminal 20 are in contact with the side wall 11*b* of the battery main body 11 substantially parallel thereto as shown in FIGS. 15 and 16, the above rotational movement of the battery terminal 20 is prevented. Thus, the mounting angle of the battery terminal 20 on the battery post 12 can be maintained in a state shown in FIG. 17.

The type of the battery 10 mounted with the above battery terminal unit U is changed, for example, according to the type and grade of a vehicle, in which the battery 10 is to be installed, in some cases and, accordingly, the position of the battery post 12 on the battery main body 11 may be changed. Then, a relative positional relationship of the side surface 11b (contact part of the battery 10) of the battery main body 11 to be brought into contact with the rotation restricting wall 41c of the rotation restricting member 40 and the battery post 12 is changed. In contrast, since the post fitting portion 21 and the rotation restricting wall 41c preferably have a constant positional relationship in the battery terminal unit U, the above change of the battery 10 cannot be coped with. Accordingly, in this embodiment, a rotation restricting member 40 with a main body 41 shaped substantially in conformity with the above change of the battery 10 is separately manufactured and used by being mounted on the battery terminal 20. In other words, the battery terminal 20 that is made of conductive material such as metal and relatively high in production cost is used as a common part, whereas many types of special parts conforming to various conditions are produced and used as the rotation restricting member 40 that is made preferably of synthetic resin and relatively low in production cost. Accordingly, a higher degree of flexibility can be achieved while particularly maintaining the associated costs low.

Figure 20:
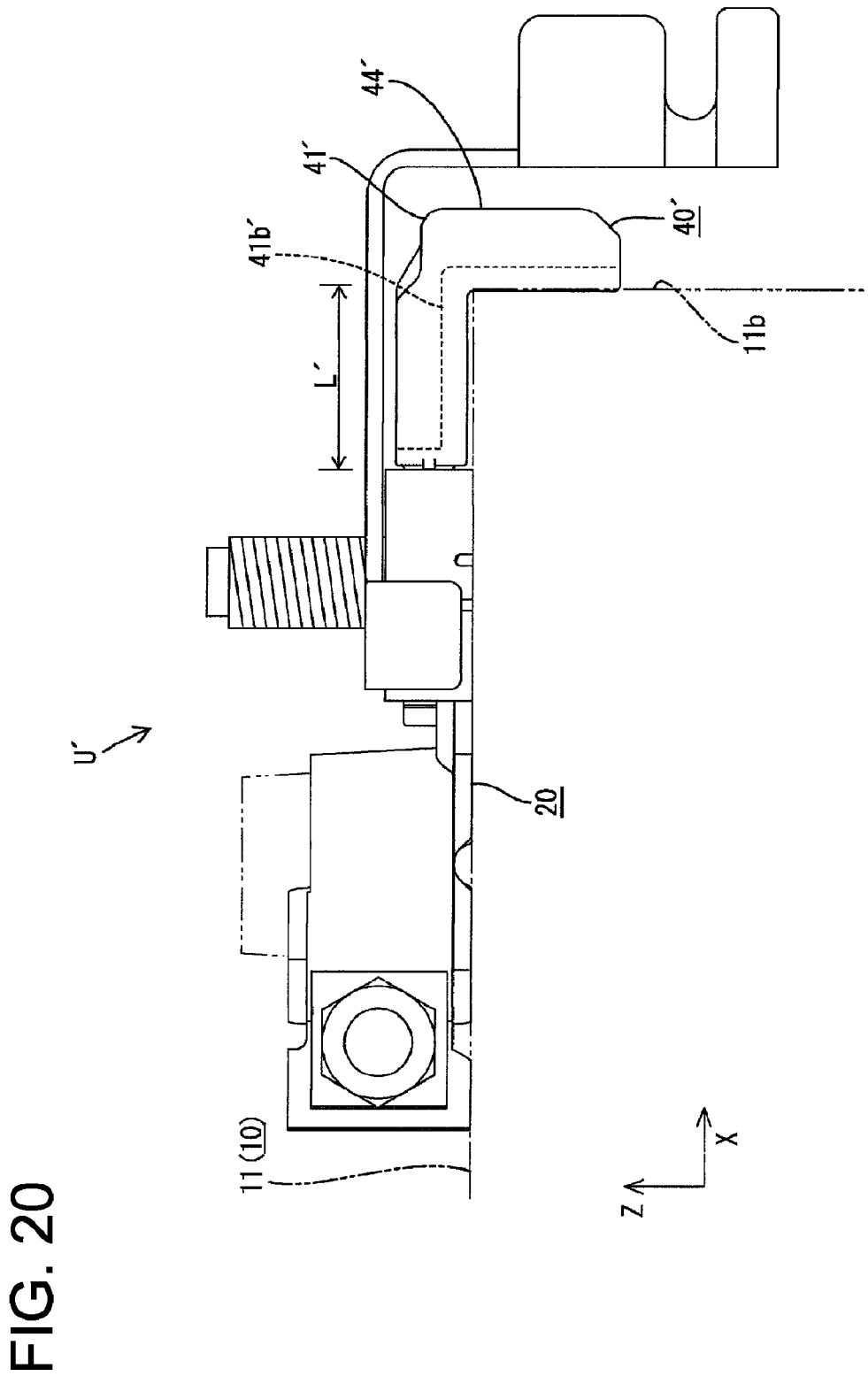
FIG. 20 is a side view of a battery terminal unit including a rotation restricting member whose shape is changed in conformity with a battery.

Specifically, if a distance between the battery post 12 and the side surface 11b of the battery main body 11 of the battery 10 in the X-axis direction is longer than that shown in FIG. 16, a rotation restricting member 40' in which a length L' in the X-axis direction of a horizontal wall 41b' forming a main body 41' is longer than the length L of the rotation restricting member 40 shown in FIG. 16 by the above distance as shown in FIG. 20 is produced. Although vertical reinforcing walls 44' are also extended together with the horizontal wall 41b' in this embodiment, no other change is made. A battery terminal unit U' is produced by attaching this rotation restricting member 40' to the battery terminal 20 and mounted on the battery 10. Then, with the post fitting portion 21 fitted on the battery post 12, a rotation restricting wall 41c' is in contact with the side surface 11b of the battery 10, with the result that a function of restricting the rotation of the battery terminal 20 can be satisfactorily displayed.

If the distance between the battery post 12 and the side surface 11b of the battery main body 11 of the battery 10 in the X-axis direction is shorter than that shown in FIG. 16, a rotation restricting member 40 in which a length L in the X-axis direction of a horizontal wall 41b forming a main body 41 is shorter than the length L of the rotation restricting member 40 shown in FIG. 16 by the above distance may be produced contrary to the above case. In addition to cases where the type of the battery is changed as described above, there is a possible case where the mounting angle of the battery terminal 20 on the battery post 12 is or can be, for example, changed and, accordingly, a part of the battery main body 11 to be brought into contact with the rotation restricting wall 41c of the rotation restricting member 40 particularly is changed to the side surface 11c extending in the Z-axis and X-axis direction. Even such a case can be easily coped with by producing a rotation restricting member 40 shaped in conformity.

As described above, the battery terminal unit U of this embodiment is provided with the battery terminal 20 including the post fitting portion 21 to be connected with the battery post 12 standing on the battery 10 and the bolt holding portion 22 formed integral to the post fitting portion 21 and adapted to at least partly accommodate the head part 24a of the stud bolt 24 and hold the stud bolt 24 in a standing state, and the rotation restricting member 40 made of synthetic resin and attached to the battery terminal 20, wherein the rotation restricting member 40 includes the main body 41 capable of restricting the mounting angle of the battery terminal 20 on the battery post 12 by engaging or coming substantially into contact with the battery 10 with the battery terminal 20 connected with the battery post 12, the press-fitting portions 42 formed integral or unitary to the main body 41 and adapted to fix the rotation restricting member 40 to the battery terminal 20 by being engaged with or press-fitted into the opening 32 formed in (preferably the side surface of) the bolt holding portion 22, and the detachment restricting piece 56 formed integral or unitary to the main body 41 and adapted to restrict the movement of the main body 41 in the direction substantially opposite to the pressing direction by being engaged with the terminal fitting 60 as a mounting member to be tightened to the stud bolt 24.

With this construction, even in the case where a condition such as the positional relationship between the contact part of the battery 10 with the main body 41 and the battery post 12 differs, the battery terminal 20 that is relatively high in production cost can be used as a common part to cope with a cost reduction as a whole if the rotation restricting member 40 that is relatively lower in production cost as compared with the battery terminal 20 is prepared to substantially conform to the above condition. Further, since the rotation restricting member 40 preferably is to be fixed to the battery terminal 20 by the press-fitting portions 42 press-fitted into the opening 32 formed in the side surface of the bolt holding portion 22 of the battery terminal 20, the rotation restricting member 40 and the battery terminal 20 are unlikely to shake relative to each other, with the result that a high rotation restricting function can be displayed. Furthermore, since the movement of the main body 41 in the direction substantially opposite to the pressing direction preferably is restricted by the engagement of the detachment restricting piece 56 with the terminal fitting 60 as the mounting member to be tightened to the stud bolt 24, the rotation restricting member 40 attached to the battery terminal 20 can be firmly held. In this way, a higher rotation restricting function can be displayed.

If a lid should be connected with a main body of a rotation restricting member preferably via at least one hinge and the battery terminal 20 is held between this lid and the main body, a clearance is unlikely to be formed between the battery terminal 20 and the rotation restricting member, the rotation restricting member and the battery terminal 20 shake relative to each other and the accuracy of the angle at which the rotation can be restricted tends to decrease. As compared with this, the angle of the battery terminal 20 can be restricted with relatively high accuracy since the rotation restricting member 40 is firmly fixed to the battery terminal 20 so as not to make any shaking movement by press-fitting in this embodiment.

The detachment restricting piece 56 preferably is formed with the at least one receiving portion 58 for receiving the first anti-rotation piece 64A of the terminal fitting 60 and the movement of the main body 41 in the direction substantially opposite to the pressing direction is restricted by the engagement of the first anti-rotation piece 64A with the detachment restricting engaging surface 58b that is a wall surface of the receiving portion 58. With this construction, the detachment of the rotation restricting member 40 from the battery post 20 preferably can be prevented by the engagement of the first anti-rotation piece 64A of the terminal fitting 60 received into the receiving portion 58 of the detachment restricting piece 56 with the detachment restricting engaging surface 58b that is the wall surface of the receiving portion 58.

The receiving portion 58 preferably is in the form of a hole penetrating the detachment restricting piece 56 and the hole edge 58a thereof preferably has an endless ring shape. Since the hole edge 58a of the receiving portion 58 has the endless ring shape in this construction, the strength of the detachment restricting piece 56 can be increased as compared with the case where the hole edge has an incomplete ring shape upon forming the receiving portion 58 as the hole penetrating the detachment restricting piece 56. In this way, a high retaining force can be displayed.

The first anti-rotation piece 64A preferably comes into contact with the anti-rotation contact surface 58c that is the wall surface of the receiving portion 58 extending substantially in the pressing direction of the main body 41, whereby the mounting angle of the terminal fitting 60 with respect to the stud bolt 24 is restricted. With this construction, the mounting angle of the terminal fitting 60 with respect to the stud bolt 24 can be restricted. Further, since the first anti-rotation piece 64A preferably possesses both the function of preventing the detachment of the rotation restricting member 40 from the battery terminal 20 and the function of preventing the rotation of the terminal fitting 60, it is preferable in simplifying the construction.

The detachment restricting piece 56 preferably includes the locking portion 57 that passes the lateral side of the bolt holding portion 22 to be engaged with the bolt holding portion 20 at the position of the side opposite to the main body 41. With this construction, when the rotation restricting member 40 is attached to the battery terminal 20, the locking portion 57 of the detachment restricting piece 56 preferably passes the lateral side of the bolt holding portion 22 to be engaged with the bolt holding portion 20 at the position of the side opposite to the main body 41. In this way, a higher retaining force can be obtained. Further, the detachment of the rotation restricting member 40 from the battery terminal 20 can be prevented even before the terminal fitting 60 is attached to the bolt holding portion 22.

The above mounting member is the terminal fitting 60 to be connected with an external circuit. Then, the terminal fitting 60 to be connected with the external circuit can also possess a detachment preventing function.

The detachment restricting piece 56 preferably extends substantially in the pressing direction of the main body 41 and/or preferably substantially is arranged at the position adjacent to the bolt holding portion 22 in the direction orthogonal to the longitudinal direction of the stud bolt 24. With this construction, a space for placing the detachment restricting piece 56 can be easily ensured at the position adjacent to the bolt holding portion 22 in the direction at an angle different from 0° or 180°, preferably substantially orthogonal to the longitudinal direction of the stud bolt 24 as compared with a position adjacent to the bolt holding portion 22 in the longitudinal direction of the stud bolt 24 where a part to be attached to the stud bolt 24 or the wall surface of the battery 10 can be present.

Accordingly, to realize a cost reduction, a rotation restricting member 40 of a battery terminal unit U is provided with a main body 41 capable of restricting a mounting angle of a battery terminal 20 with respect to a battery post 12 by coming into contact with a battery 10 with the battery terminal 20 connected with the battery post 12, one or more press-fitting portions 42 formed integral or unitary to the main body 41 and adapted to fix the rotation restricting member 40 to the battery terminal 20 by being press-fitted into an opening 32 formed in a side surface of a bolt holding portion 22, and at least one detachment restricting piece 56 formed integral or unitary to the main body 41 and adapted to restrict a movement of the main body 41 in a direction opposite to a pressing direction by being engaged with a terminal fitting 60 fixed to a terminal mounting portion, particularly tightened to a stud bolt 24.

Figure 21:
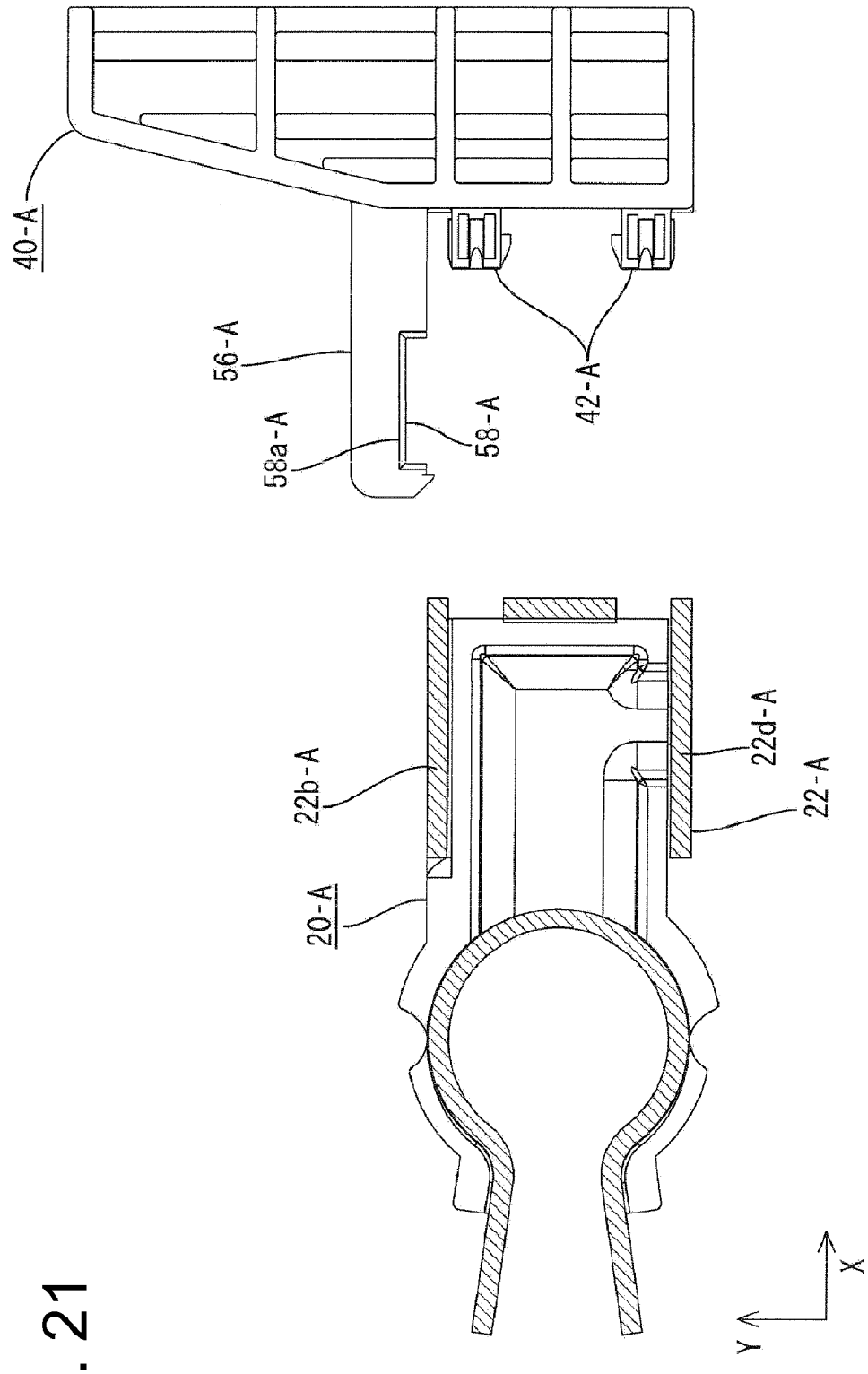
FIG. 21 is a plan view partly in section of a battery terminal and a rotation restricting member according to a second embodiment of the invention.

A second preferred embodiment of the present invention is described with reference to FIGS. 21 to 23. In this second embodiment, the shape of a receiving portion 58-A of a detachment restricting piece 56-A is changed. A construction of the second embodiment similar to the above first embodiment is identified by the same reference numerals with a suffix "-A" and the structure, functions and effects thereof are not repeatedly described.

Figure 22:
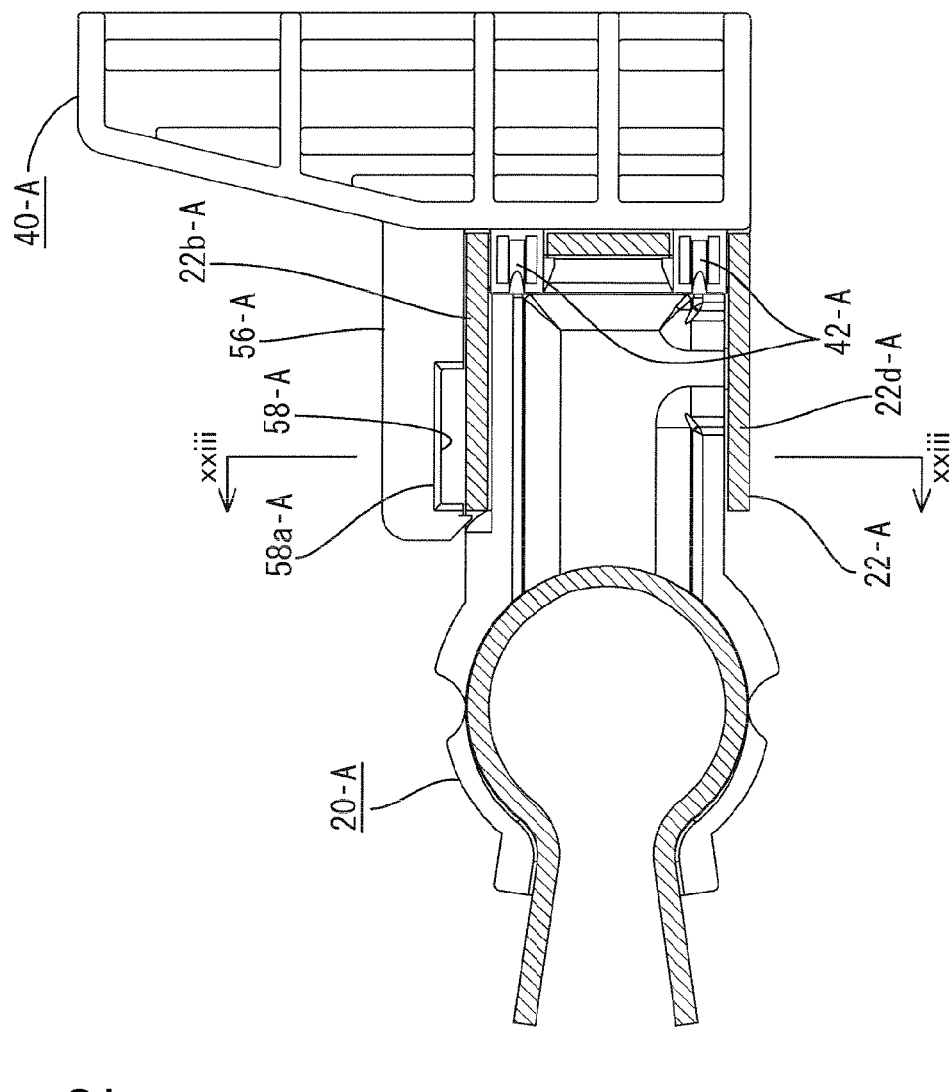
FIG. 22 is a plan view partly in section showing a state where the rotation restricting member is assembled with the battery terminal.

The receiving portion 58-A preferably is, as shown in FIG. 22, formed to penetrate the detachment restricting piece 56-A in its thickness direction (Z-axis direction) and/or to be open toward press-fitting portions 42-A (toward a bolt holding portion 22-A, inwardly) in the Y-axis direction. In other words, a surface of the detachment restricting piece 56-A facing the press-fitting portions 42-A (surface facing the press-fitting portions 42-A and the bolt holding portion 22A) is partly recessed. Accordingly, a hole edge 58a-A of the receiving portion 58-A is substantially in the form of a laterally long channel when viewed from above and has an incomplete ring shape. In other words, the detachment restricting piece 56-A according to this embodiment has such a shape obtained as if omitting the inner arm portion 56c from the detachment restricting piece 56 described in the above first embodiment (see FIG. 6).

Figure 23:
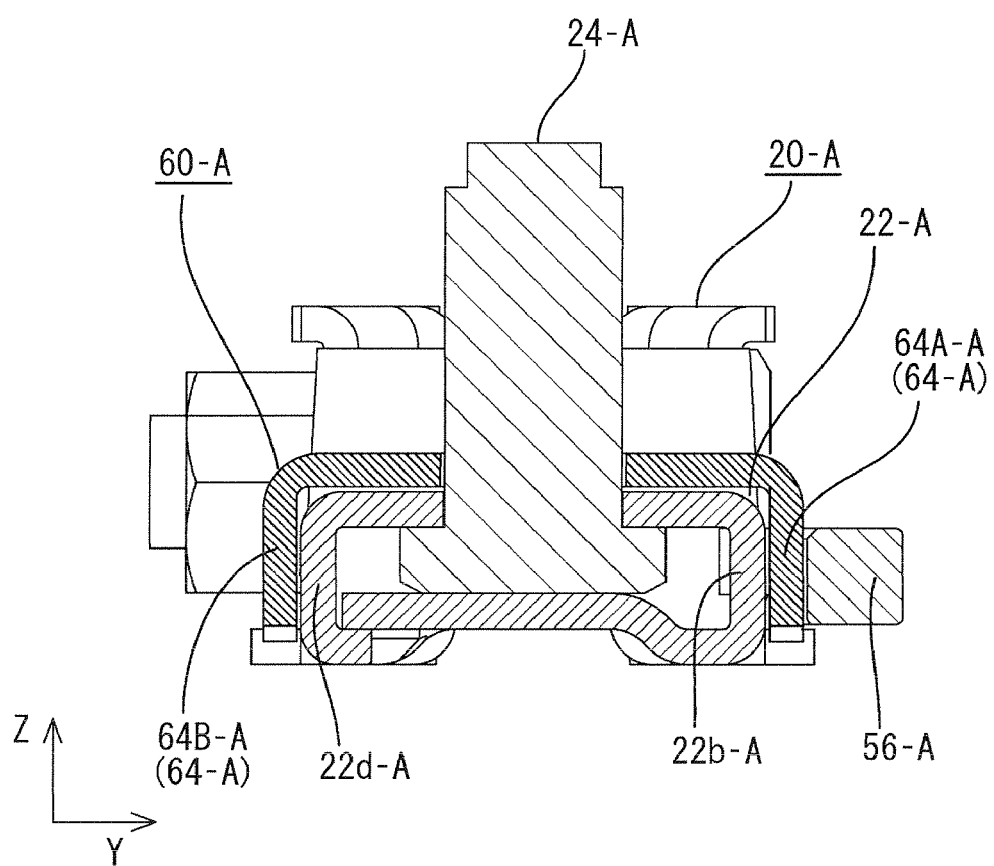
FIG. 23 is a section along xxiii-xxiii of FIG. 22 showing a state where a terminal fitting is mounted on the battery terminal.

With a rotation restricting member 40-A attached to a battery terminal 20-A, an opening part in the Y-axis direction in the hole edge 58a-A of the receiving portion 58-A preferably is substantially closed over the entire length by a first side wall 22b-A forming a bolt holding portion 22-A as shown in FIG. 23. With a terminal fitting 60-A attached to a stud bolt 24-A, a first anti-rotation piece 64A-A of the terminal fitting 60-A is inserted in the receiving portion 58-A as shown in FIG. 23. The inner surface of this first anti-rotation piece 64A-A preferably can come into direct contact with the outer side surface of the first side wall 22b-A of the bolt holding portion 22-A without the detachment restricting piece 56-A at least partly interposed therebetween. Alternatively or additionally, a second anti-rotation piece 64B-A preferably can come into contact with the outer side surface of a second side wall 22d-A of the bolt holding portion 22-A. Since preferably the both anti-rotation pieces 64-A directly hold the bolt holding portion 22-A therebetween without via the detachment restricting piece 56-A, clearances that can be formed between the bolt holding portion 22-A and the both anti-rotation pieces 64-A do not include a dimensional tolerance of the detachment restricting piece 56-A and these clearances can be made very small. Thus, the terminal fitting 60-A is more unlikely to shake relative to the bolt holding portion 22-A, with the result that a high rotation preventing function can be obtained. Further, the spacing between the inner surfaces of the both anti-rotation pieces 64-A is substantially equal to the width of the bolt holding portion 22-A.

As described above, according to this embodiment, the receiving portion 58-A is in the form of a hole penetrating the detachment restricting piece 56-A and the hole edge thereof has the incomplete ring shape, whereas the first anti-rotation piece 64A-A at least partly inserted into the receiving portion 58-A preferably comes into contact with the bolt holding portion 22-A to restrict the mounting angle of the terminal fitting 60-A with respect to the stud bolt 24-A. With this construction, the mounting angle of the terminal fitting 60-A with respect to the stud bolt 24-A can be restricted. Further, since the first anti-rotation piece 64A-A preferably comes into direct contact with the bolt holding portion 22-A, the terminal fitting 60-A is unlikely to shake relative to the bolt holding portion 22-A, with the result that a high rotation preventing function can be displayed. Further, since the first anti-rotation piece 64A-A preferably possesses both the function of preventing the detachment of the rotation restricting member 40-A from the battery terminal 20-A and the function of preventing the rotation of the terminal fitting 60-A, it is preferable in simplifying the construction.

A third preferred embodiment of the present invention is described with reference to FIGS. 24 to 27. In this third embodiment, a pair of detachment restricting pieces 56-B are provided. A construction of the third embodiment similar to the above first embodiment is identified by the same reference numerals with a suffix "-B" and the structure, functions and effects thereof are not repeatedly described.

Figure 24:
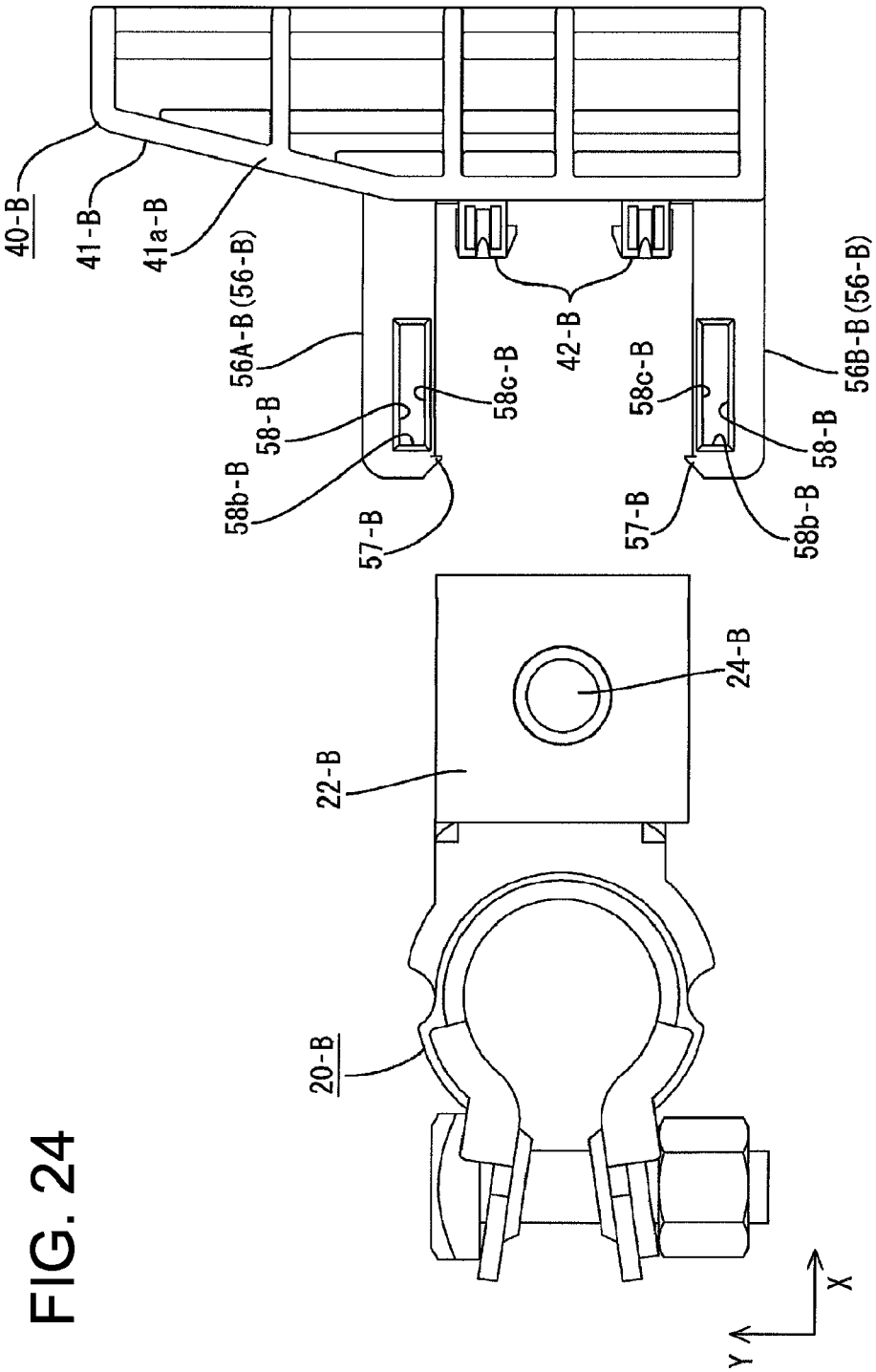
FIG. 24 is a plan view of a battery terminal and a rotation restricting member according to a third embodiment of the invention.
Figure 25:
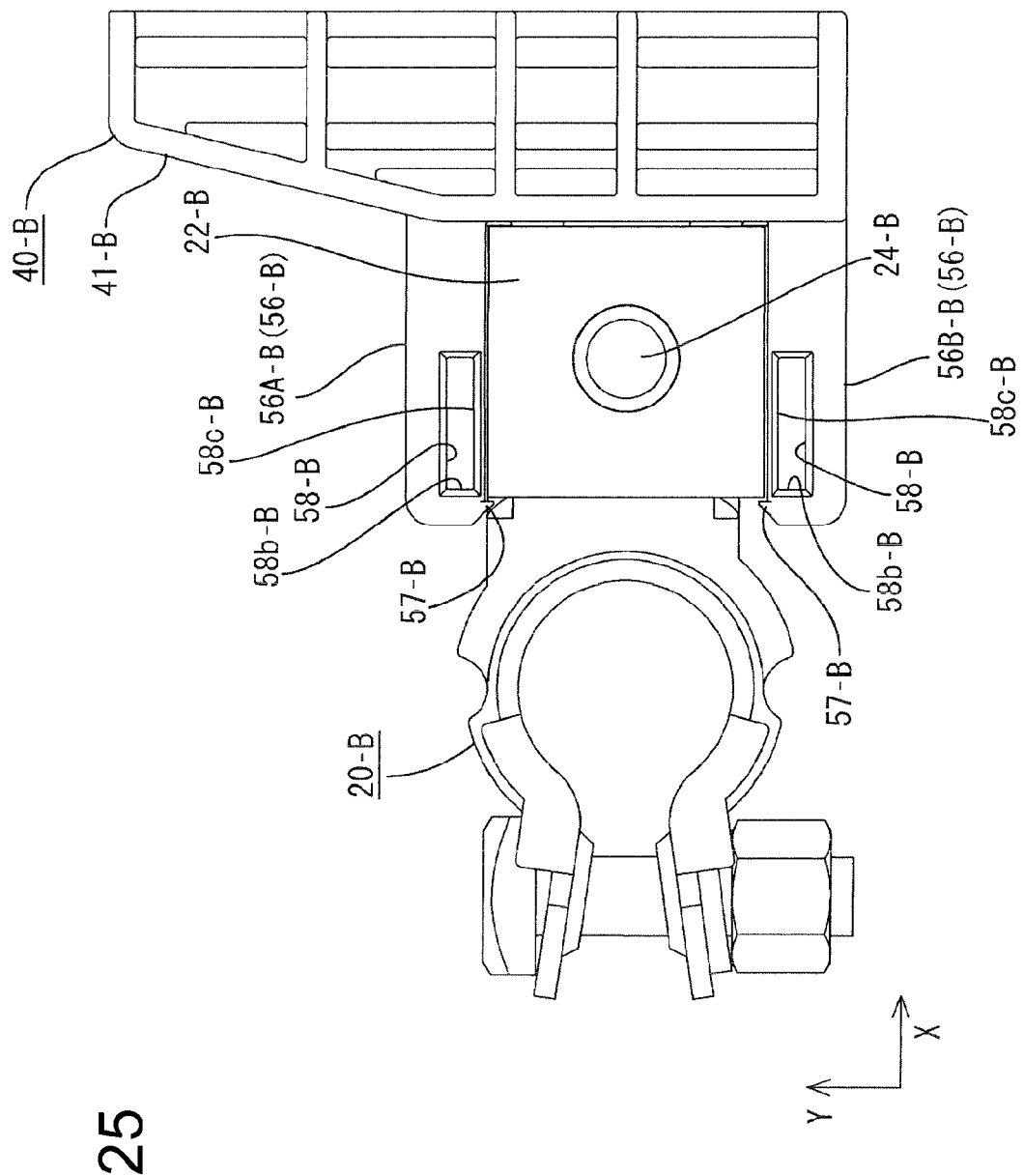
FIG. 25 is a plan view showing a state where the rotation restricting member is assembled with the battery terminal.

As shown in FIGS. 24 and 25, one or more, preferably a pair of detachment restricting pieces 56-B project from a main body 41-B of a rotation restricting member 40-B substantially in the X-axis direction, i.e. in an attaching direction of the rotation restricting member 40-B to a battery terminal 20-B (pressing direction of the main body 41-B). In the following description, one of the detachment restricting pieces 56-B shown at the upper side in FIG. 24 is called a first detachment restricting piece 56A-B and the other shown at the lower side in FIG. 24 is called a second detachment restricting piece 56B-B.

The both detachment restricting pieces 56-B are arranged at positions of a vertical wall 41a-B of the main body 41-B at the outer sides of both press-fitting portions 42-B. The spacing between the both detachment restricting pieces 56-B is substantially equal to the width of a bolt holding portion 22-B. The both detachment restricting pieces 56-B preferably include locking portions 57-B substantially projecting inwardly (directions toward each other) at the leading ends thereof. Receiving portions 58-B are respectively formed to penetrate parts of the both detachment restricting pieces 56-B near the leading ends in a thickness direction. The both detachment restricting pieces 56-B preferably are substantially symmetrically shaped with respect to a line passing the center of the bolt holding portion 22-B in the Y-axis direction and extending in the X-axis direction as an axis of symmetry.

Figure 26:
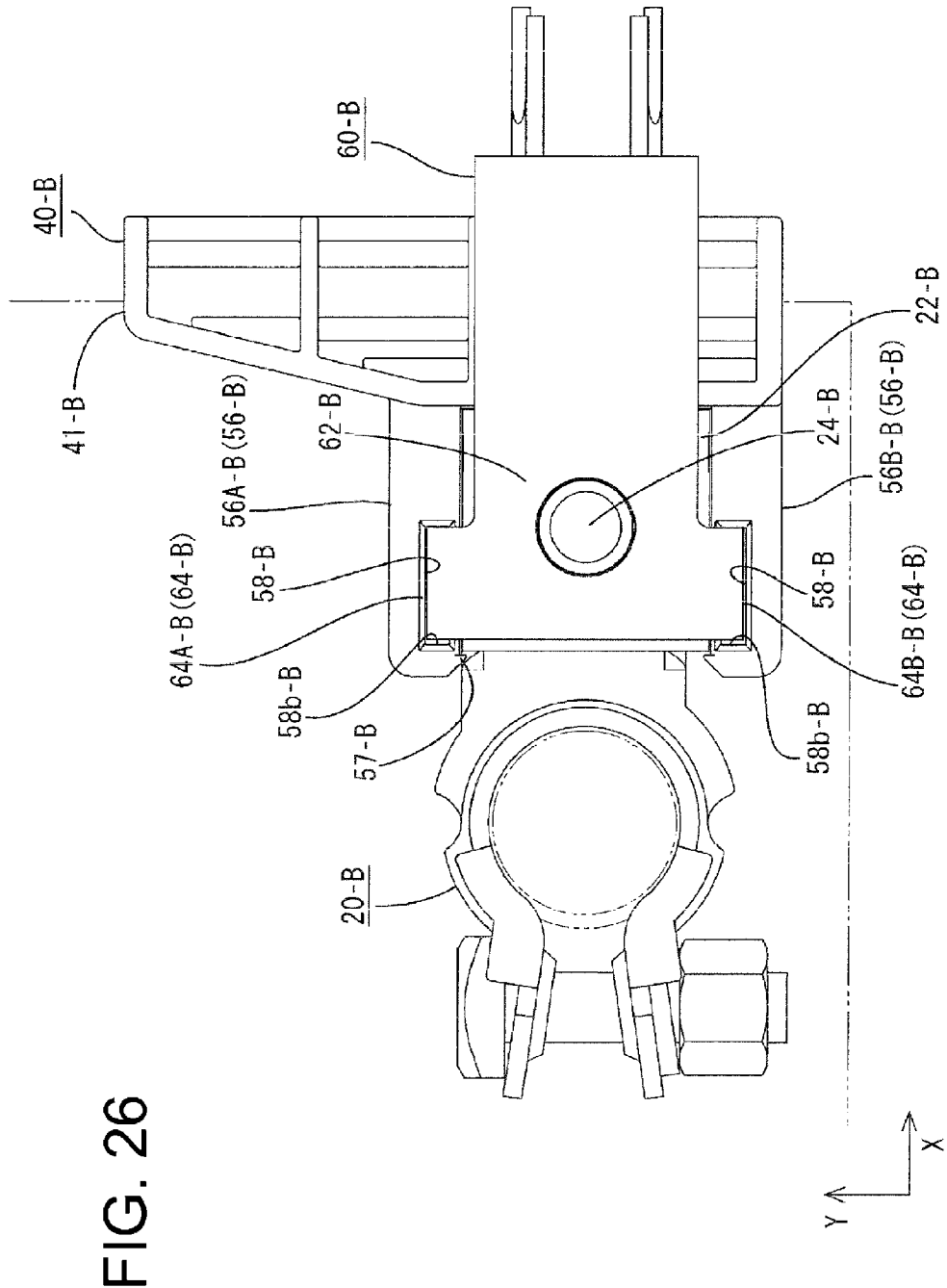
FIG. 26 is a plan view showing a state where the terminal fitting is assembled with the battery terminal.
Figure 27:
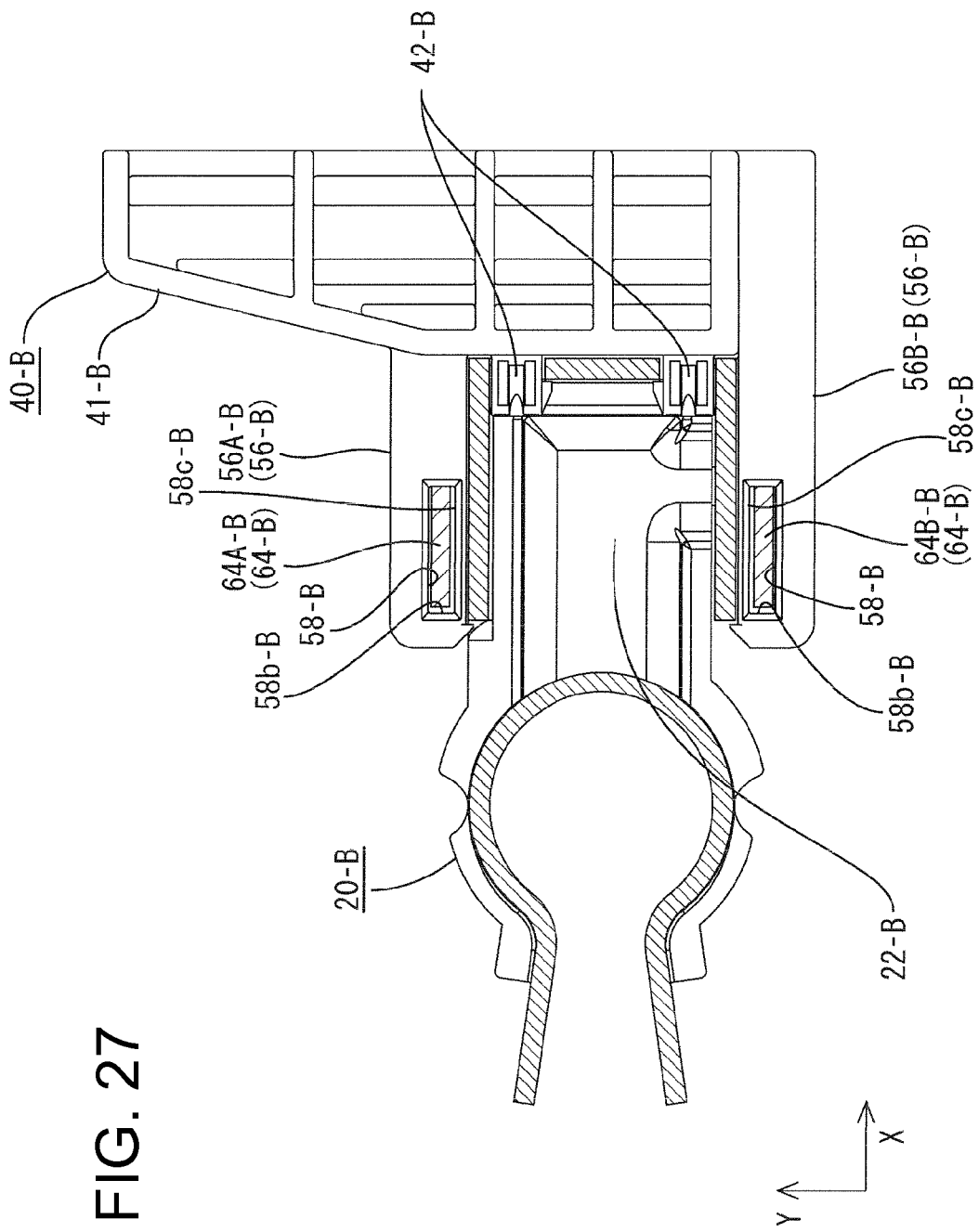
FIG. 27 is a plan view partly in section showing the state where the terminal fitting is assembled with the battery terminal.

As shown in FIGS. 26 and 27, two anti-rotation pieces 64-B of a terminal fitting 60-B are at least partly inserted in the corresponding receiving portions 58-B of the both detachment restricting pieces 56-B with the terminal fitting 60B mounted on the bolt holding portion 22-B. Specifically, with a battery mounting portion 62-B of the terminal fitting 60-B placed on the bolt holding portion 22-B, the first anti-rotation piece 64A-B can be engaged with (can come into contact with) a detachment restricting engaging surface 58b-B and an anti-rotation contact surface 58c-B of the receiving portion 58-B of the first detachment restricting piece 56A-B and/or the second anti-rotation piece 64B-B can be engaged with (can come into contact with) a detachment restricting engaging surface 58b-B and an anti-rotation contact surface 58c-B of the receiving portion 58-B of the second detachment restricting piece 56B-B. Accordingly, even if a force acts to pull the main body 41-B in a detaching direction opposite to the pressing direction, the detachment restricting engaging surfaces 58b-B of the both detachment restricting pieces 56-B are respectively engaged with the corresponding anti-rotation pieces 64-B, thereby more reliably restricting a movement of the main body 41-B in the detaching direction. Further, the inner surfaces of the both anti-rotation pieces 64-B preferably are held in contact with the anti-rotation contact surfaces 58c-B of the corresponding detachment restricting pieces 56-B arranged adjacent to the bolt holding portion 22-B, whereby a function of preventing the rotation of the terminal fitting 60-B with respect to the stud bolt 24 can be sufficiently displayed. In this way, the both anti-rotation pieces 64-B preferably possess both a function of preventing the rotation of the terminal fitting 60-B and a function of preventing the detachment of the detachment restricting pieces 56-B.

As described above, since the pair of detachment restricting pieces 56-B to be engaged with the bolt holding portion 22-B preferably are provided according to this embodiment, a force for holding the rotation restricting member 40-B onto the battery terminal 20-B can be increased and better balanced. As a result, a high rotation restricting function can be stably displayed.

A fourth preferred embodiment of the present invention is described with reference to FIG. 28 or 29. In this fourth embodiment, a member to be mounted on a bolt holding portion 22-C of a battery terminal 20-C is changed. A construction of the fourth embodiment similar to the above first embodiment is identified by the same reference numerals with a suffix "-C" and the structure, functions and effects thereof are not repeatedly described.

Figure 28:
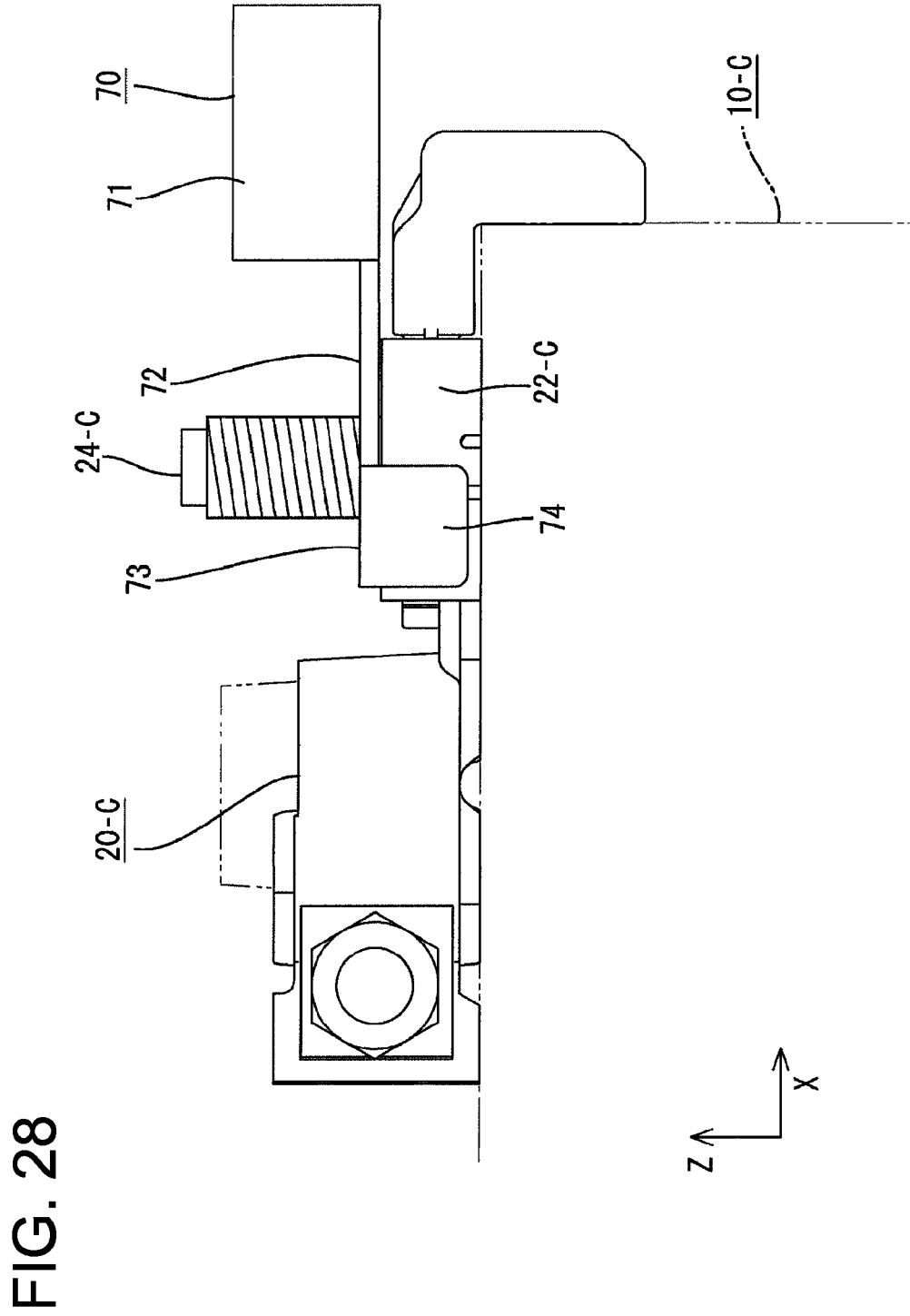
FIG. 28 is a side view of a battery terminal unit mounted with a bracket of a current sensor according to a fourth embodiment of the invention.
Figure 29:
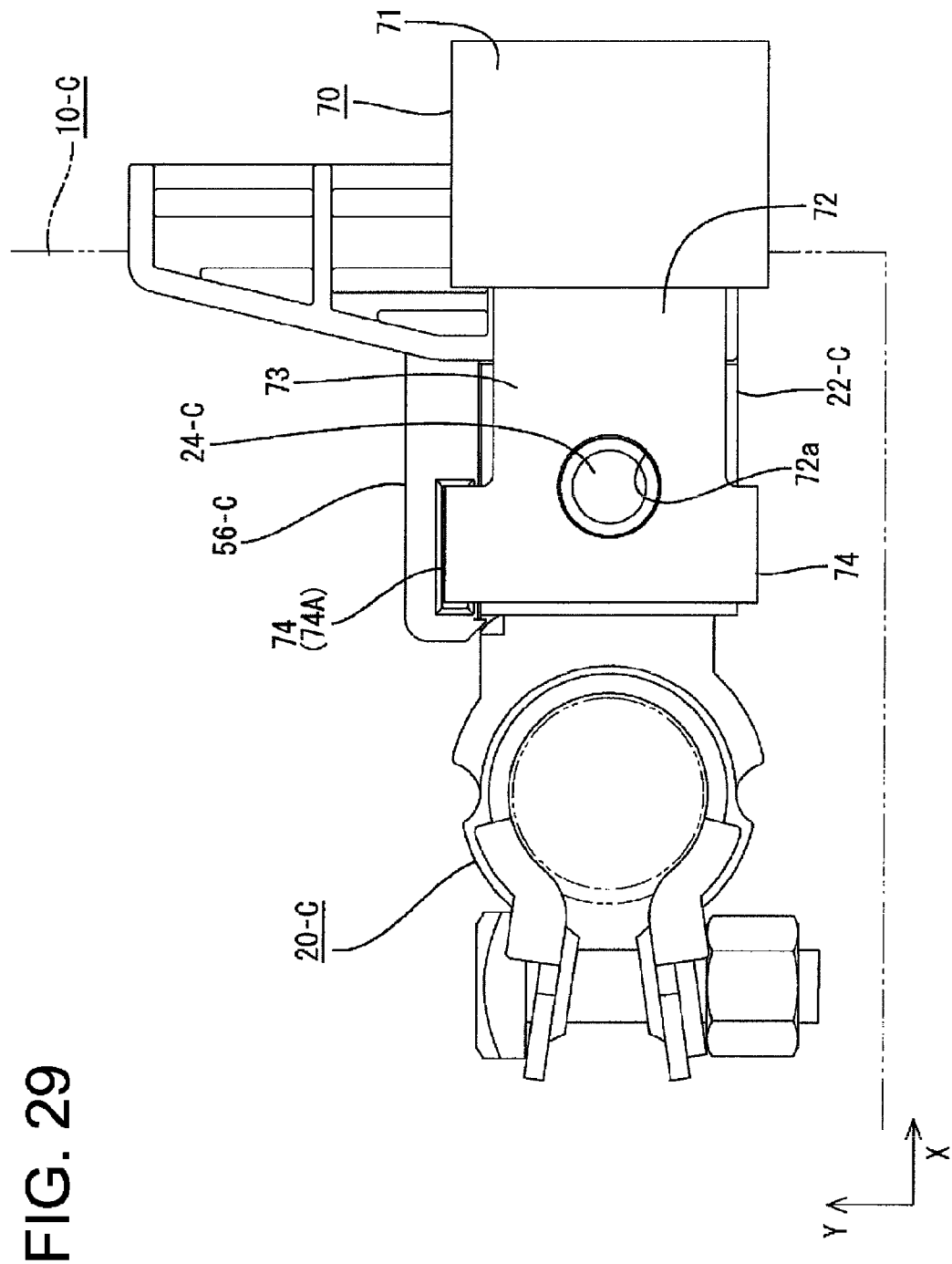
FIG. 29 is a plan view of the battery terminal unit mounted with the bracket of the current sensor.

As shown in FIGS. 28 and 29, a current sensor 70 is to be mounted on the bolt holding portion 22-C of the battery terminal 20-C according to this embodiment. The current sensor 70 is to be electrically connected to a specified electrical circuit using a battery 10-C as a power source via a connector or the like and adapted to detect a current flowing in this electrical circuit. This current sensor 70 is such that a bracket 72 is integrally or unitarily provided on a (preferably substantially block-shaped) main body 71, and this bracket 72 is mounted on the bolt holding portion 22-C with a stud bolt 24-C inserted through the bracket 72. The bracket 72 includes a battery mounting portion 73 to be placed on the upper surface of the bolt holding portion 22-C and formed with a bolt insertion hole 72a and one or more, preferably a pair of anti-rotation pieces 74 projecting downward from the (preferably substantially opposite) lateral edge(s) of the battery mounting portion 73. The structures, functions and effects of these battery mounting portion 73 and anti-rotation pieces 74 are similar to those of the battery mounting portion 62 and anti-rotation pieces 64 of the terminal fitting 60 in the first embodiment, wherein the first anti-rotation piece 74A preferably is engageable with a detachment restricting piece 56-C. This bracket 72 is made of metal not for electrical connection, but for merely mechanically holding the current sensor 70 onto the bolt holding portion 22-C.

As described above, according to this embodiment, the mounting member to be mounted on the bolt holding portion 22-C is the bracket 72 fixed to the current sensor 70 as an electrical component. In this way, the bracket 72 fixed to the current sensor 70 can possess a detachment preventing function.

The present invention is not limited to the above described and illustrated embodiments. For example, the following embodiments or modifications are also included in the technical scope of the present invention.

Although the receiving portion is in the form of a hole penetrating the detachment restricting piece in the thickness direction in the above respective embodiments, it needs not be always a through hole and may be a recess formed, for example, by recessing (indenting) the upper surface (outer surface) of the detachment restricting piece according to the present invention.

In the above respective embodiments, the terminal fitting or bracket is provided with the anti-rotation piece as a projection and the detachment restricting piece is formed with the receiving portion in the form of a hole or recess into which the projection to be inserted. Conversely, the detachment restricting piece may be provided with a projection and the terminal fitting or bracket may be provided with a receiving portion in the form of a hole or recess according to the present invention.

Although the detachment restricting piece is formed integral to the main body of the rotation restricting member in the above respective embodiments, it may be formed separately from the main body and integrally assembled with the main body according to the present invention.

Besides the above respective embodiments, the number of the detachment restricting pieces may be changed to three or more. The shape, the size and the like of the detachment restricting piece can also be suitably changed.

Although the detachment restricting piece is arranged adjacent to the bolt holding portion in the direction orthogonal to the longitudinal direction of the stud bolt in the above respective embodiments, it may be arranged adjacent to the bolt holding portion in the longitudinal direction of the stud bolt according to the present invention.

Although the locking portion of the detachment restricting piece is engaged with the end surface of the side wall of the bolt holding portion in the above respective embodiments, a hole which is open laterally outward may be, for example, formed in the side wall and the detachment restricting piece may be engaged with an edge of this hole according to the present invention. Further, the locking portion may be omitted according to the present invention.

Although the terminal fitting is mounted on the bolt holding portion in the above first to third embodiments and the bracket of the current sensor is mounted on the bolt holding portion in the above fourth embodiment, both the terminal fitting and the bracket of the current sensor may be mounted on the bolt holding portion according to the present invention. In this case, at least either one of the terminal fitting and the bracket may be engaged with the detachment restricting piece.

Although the anti-rotation pieces of the terminal fitting or the bracket of the current sensor also possess the function of retaining the detachment restricting piece in the above respective embodiments, the terminal fitting or the bracket may be separately provided with an engaging portion exclusively used to retain the detachment restricting piece. In this case, it is also possible to omit the anti-rotation pieces.

Although the bracket of the current sensor is made of metal in the above fourth embodiment, it may be, for example, made of synthetic resin.

Although the terminal fitting or the bracket of the current sensor is illustrated as the "mounting member" to be mounted on the bolt holding portion in the above respective embodiments, something other than these may be used as the "mounting member". Particularly, the electrical component to which the bracket is fixed can be changed, for example, to a pressure sensor or the like.

The press-fitting portions shown in the above respective embodiments can be suitably changed in the number, shape, size, arrangement and the like. The numbers, shapes, sizes, arrangements and the like of the respective ribs, retaining projection, bored portions of each press-fitting portion can be suitably changed.

It is also possible to omit the press-fitting portions.

A fifth preferred embodiment of the present invention is described with reference to FIGS. 30 to 52. In this embodiment is illustrated a battery terminal unit U including a battery terminal 20 to be connected with a battery 10 installed in an automotive vehicle and a rotation restricting member 40 to be attached to the battery terminal 20. In this embodiment, the rotation restricting member 40 according to this embodiment includes one or more joint pieces 156 and an engaging part 157 as a preferred attachment structure to the battery terminal 20. A construction of the fifth embodiment similar or substantially same to the above first embodiment is identified by the same reference numerals and the structure, functions and effects thereof are not repeatedly described. In the following description, reference is made to FIGS. 32 to 34, 36 to 39, 41, 43, 45, 48, 50 and 52 concerning a vertical direction. X-axis, Y-axis and Z-axis are shown in some of the drawings and graphical representations are so made that the respective axis directions are those shown in the respective drawings. An engaging part 157 is not shown in FIG. 44.

Figure 30:
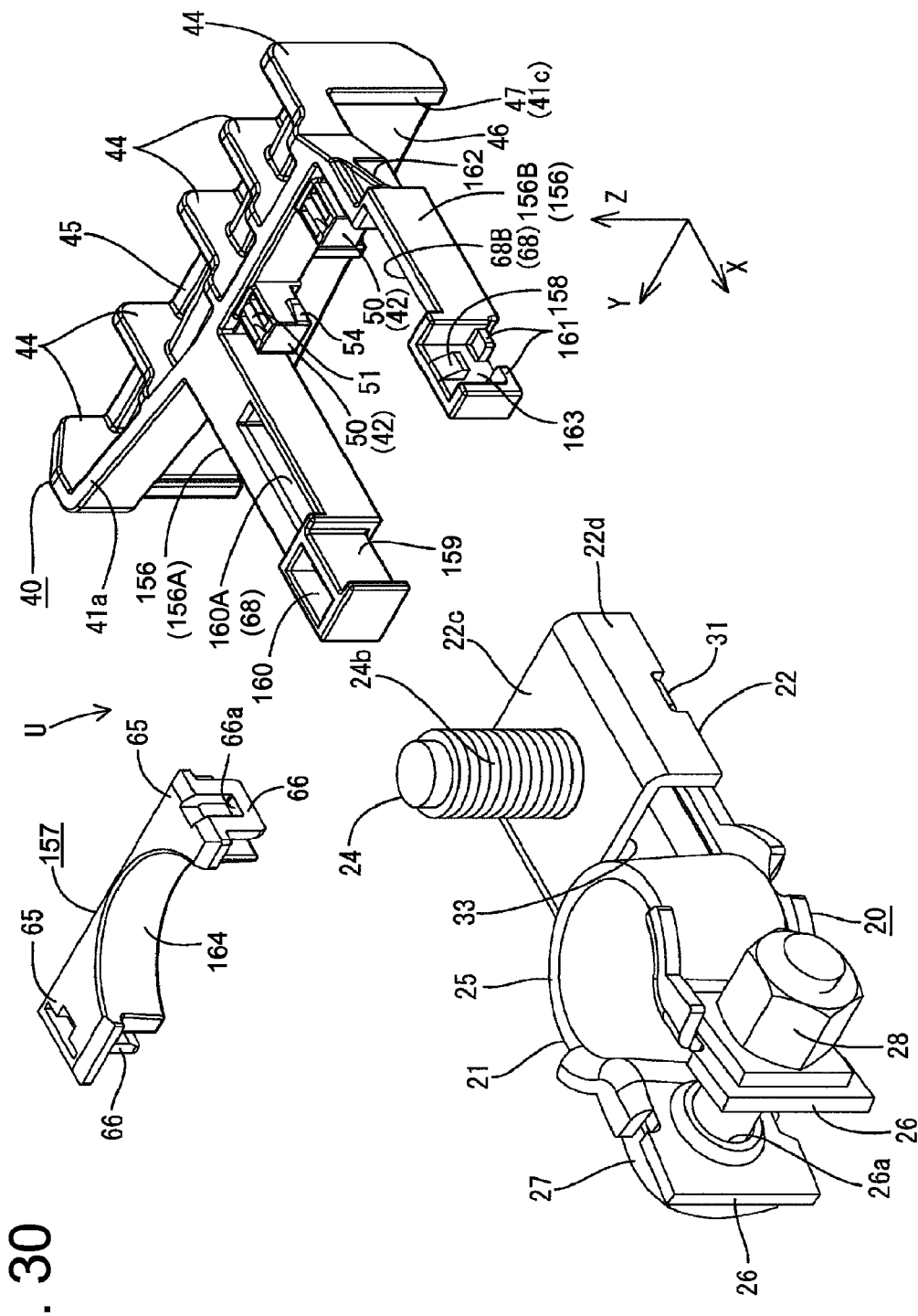
FIG. 30 is an exploded perspective view of a battery terminal and a rotation restricting member according to a fifth embodiment of the invention.
Figure 31:
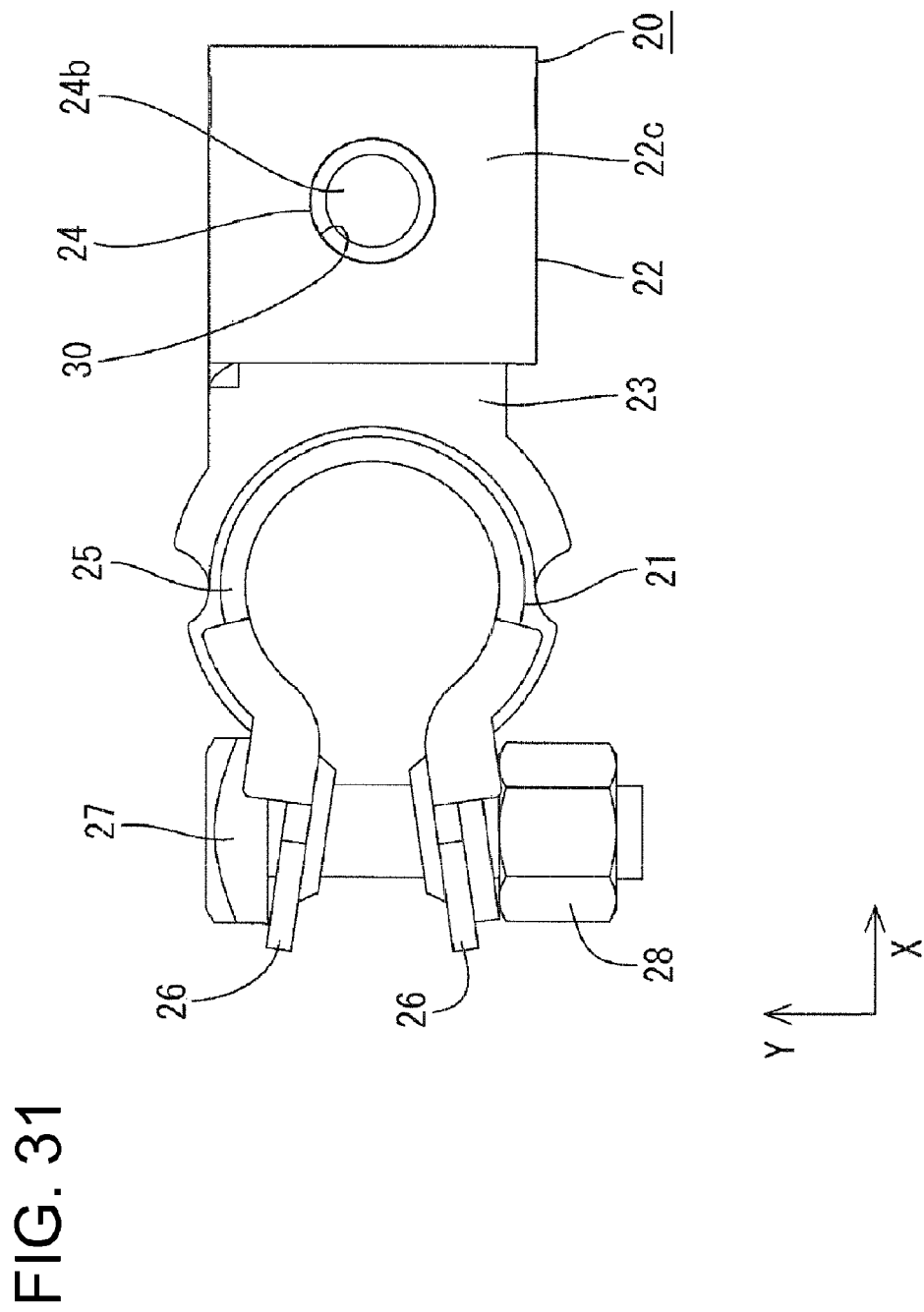
FIG. 31 is a plan view of the battery terminal.
Figure 32:
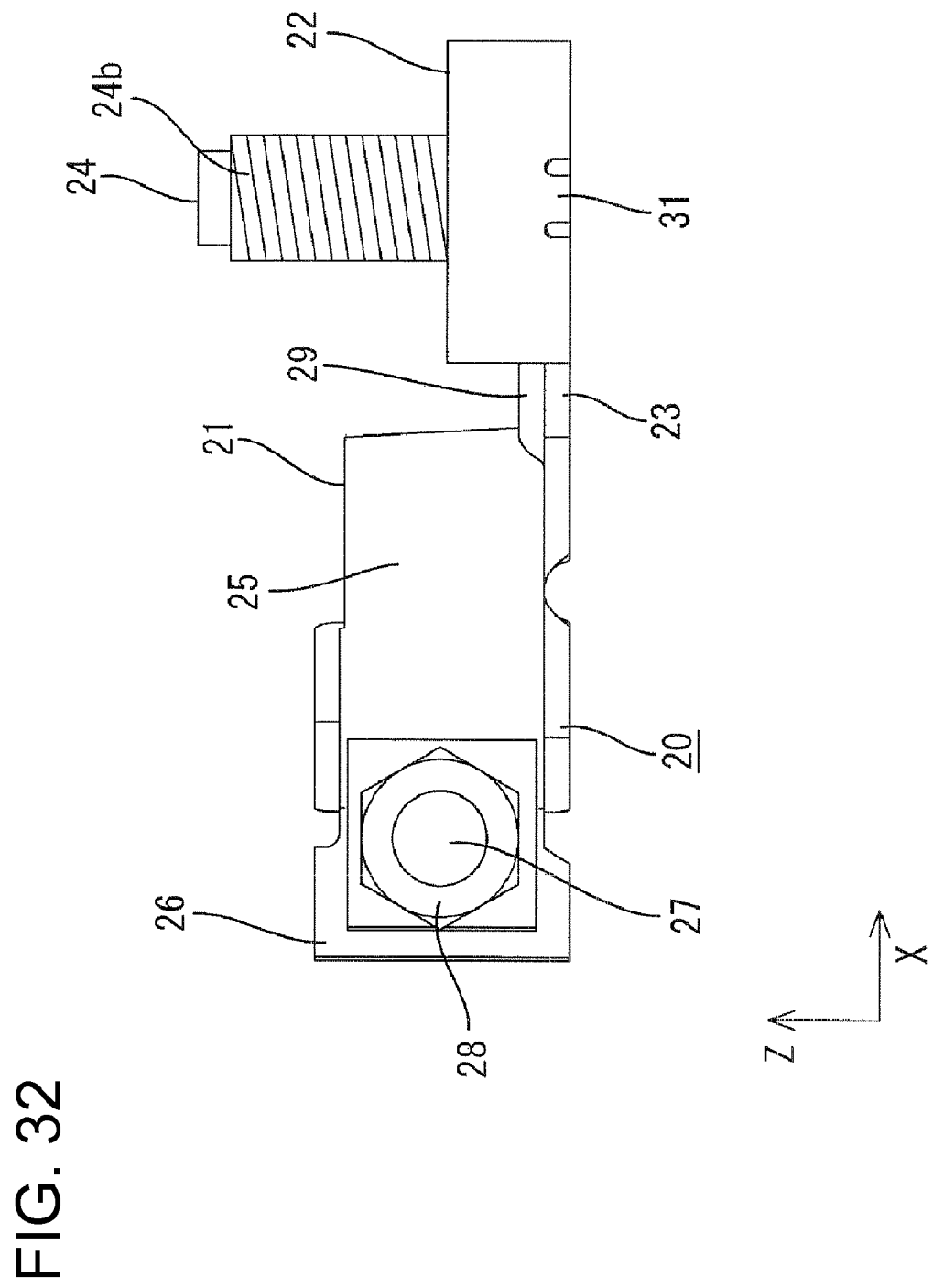
FIG. 32 is a side view of the battery terminal.
Figure 33:
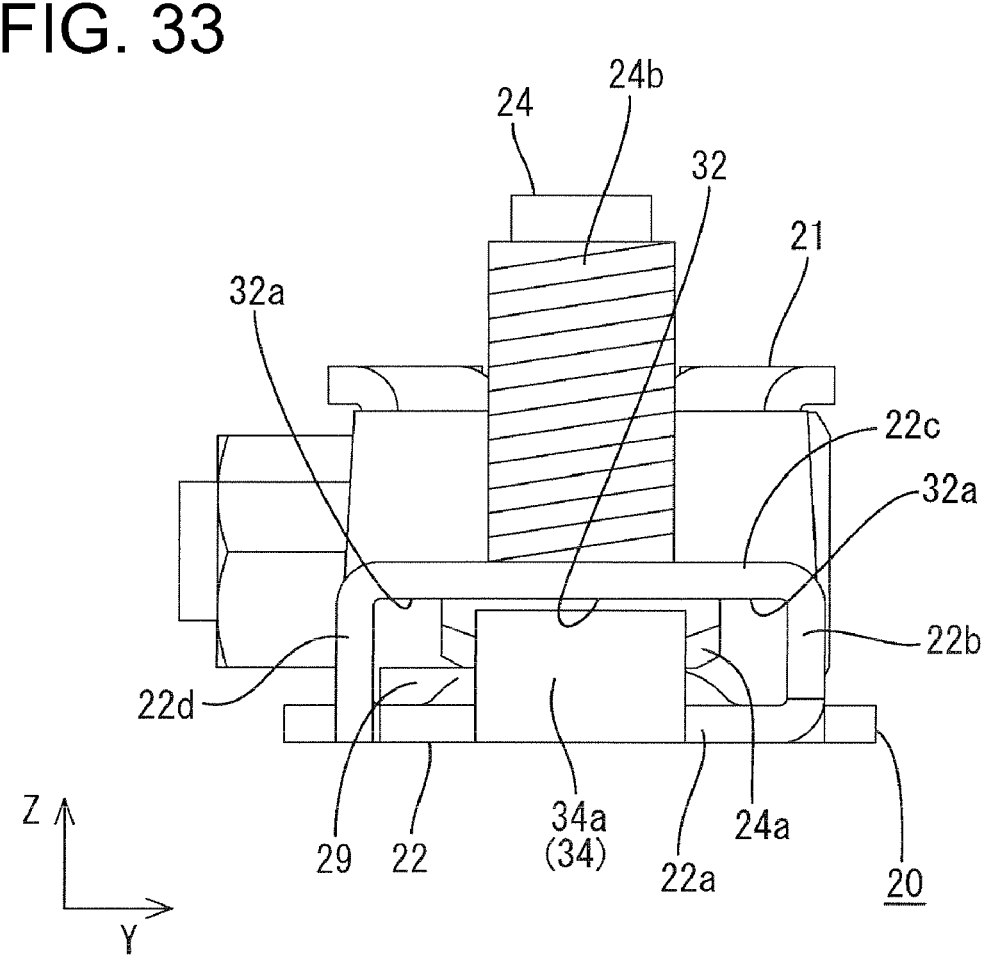
FIG. 33 is a rear view of the battery terminal.
Figure 34:
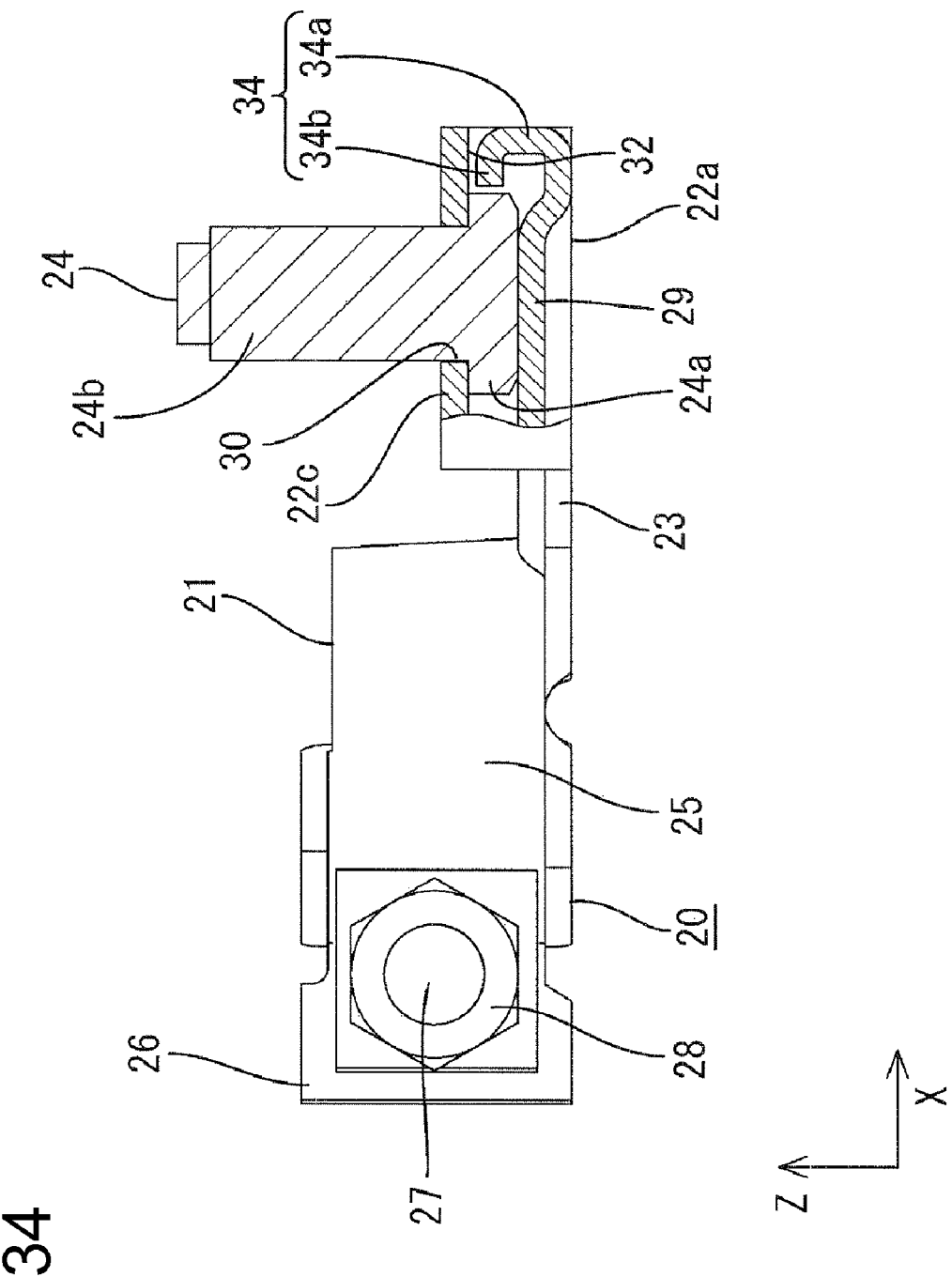
FIG. 34 is a side view partly in section of the battery terminal.

In addition to the one or more press-fitting portions 42, the rotation restricting member 40 according to this embodiment includes one or more joint pieces 1 and the at least one engaging part 157 as an attachment structure to the battery terminal 20. As shown in FIG. 30, the engaging part 157 is engageable with the bolt holding portion 22 while at least partly sandwiching the bolt holding portion 22 together with the main body 41 (or while arranging the bolt holding portion 22 between the engaging part 157 and the main body 41), whereas the joint pieces 156 have a function of mechanically connecting both the engaging part 157 and the main body 41. The joint pieces 156 preferably are formed integral or unitary to the main body 41 similar to the press-fitting portions 42, whereas the engaging part 157 preferably is separated (or separately provided) from the main body 41, the press-fitting portions 42 and the joint pieces 156 and united therewith by being assembled with the both joint pieces 156.

Figure 35:
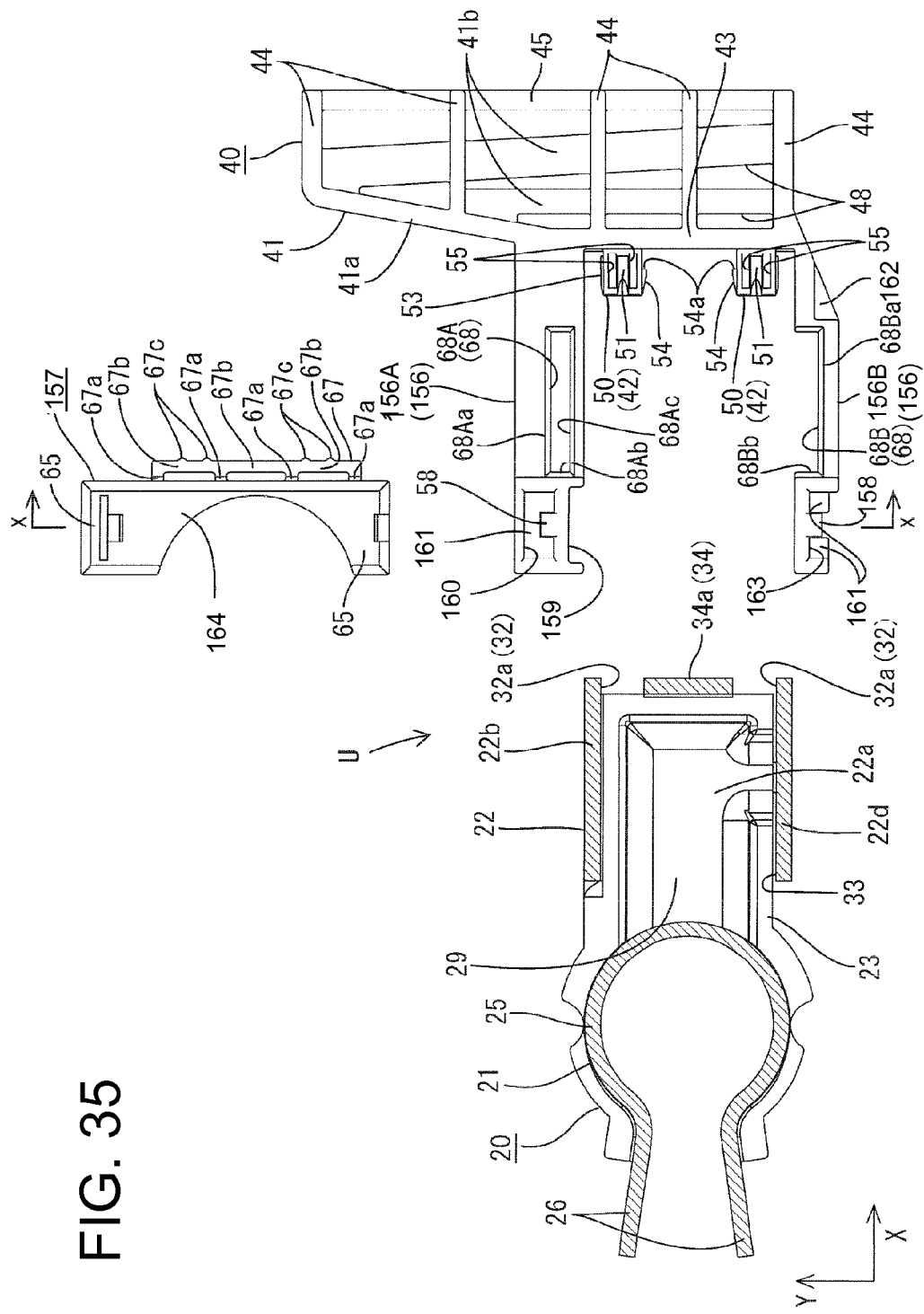
FIG. 35 is a plan view with the battery terminal shown in section in a state before the battery terminal, an engaging part and the rotation restricting member are assembled.
Figure 42:
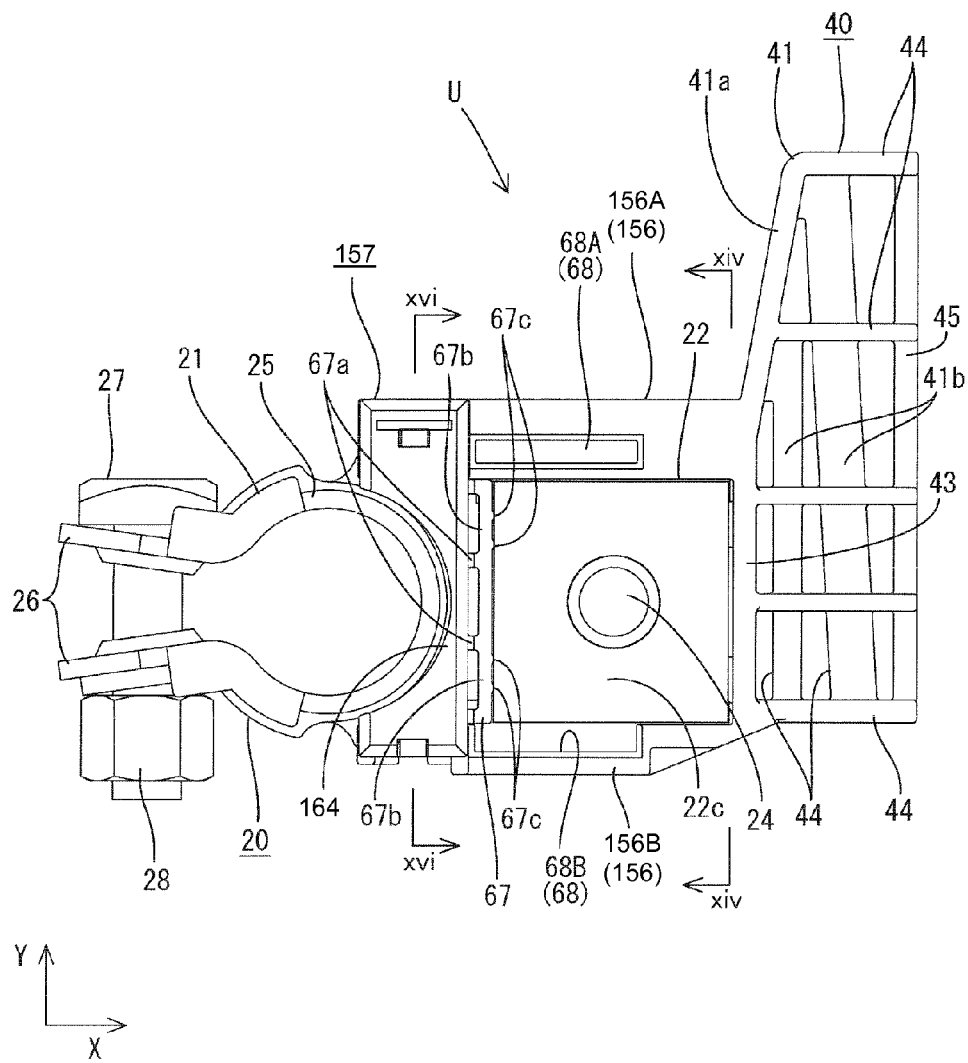
FIG. 42 is a plan view showing the state where the rotation restricting member is assembled with the battery terminal.

The joint pieces 156 are first described in detail. As shown in FIGS. 30 and 35, the joint pieces 156 project substantially in the X-axis direction and/or substantially in the same direction as the press-fitting portions 42, i.e. in an attaching direction of the rotation restricting member 40 to the battery terminal 20 (particularly pressing direction of the main body 41) from positions of the vertical wall 41a of the main body 41 lateral to the terminal receiving portion 43 and are formed integral or unitary to the main body 41. The joint pieces 156 preferably are in the form of cantilevers and/or the length (dimension in the X-axis direction) thereof preferably is set to be longer than that of the bolt holding portion 22. Accordingly, with the main body 41 attached to the battery terminal 20, the leading ends of the joint pieces 156 are located more forward than the bolt holding portion 22, i.e. project toward a side of the bolt holding portion 22 opposite to the main body 41 in the X-axis direction (FIG. 42). At least one holding projection 158 with a holding structure for holding the engaging part 157 in a mounted state is provided at or near the leading end of each joint piece 156. A pair of joint pieces 156 preferably are arranged at positions of the vertical wall 41a of the main body 41 at or near the outer sides of the both press-fitting portions 42, and the spacing between the both joint pieces 156 preferably is substantially equal to the width (dimension in Y-axis direction) of the bolt holding portion 22. In the following description, out of the two joint pieces 156, the one shown at the upper side of FIG. 35 is called a first joint piece and the other shown at the lower side of FIG. 35 is called a second joint piece. A suffix "A" is attached to the reference numeral of the first joint piece and a suffix "B" is attached to the reference numeral of the second joint piece in the case of distinguishing the two joint pieces, whereas no suffixes are attached in the case of collectively terming them without distinguishing them.

The first joint piece 156A extends substantially forward from the front surface (surface facing the battery terminal 20) of the vertical wall 41a of the main body 41. The first joint piece 156A preferably has the same width substantially over the entire length and/or the width thereof preferably is set to be larger than that of the second joint piece 156B. The inner surface (surface facing the second joint piece 156B) of a leading end portion of the first joint piece 156A preferably is recessed to form an engaging part receiving recess 159 which substantially is open inwardly and into which the engaging part 157 is received. Out of the peripheral edges of this engaging part receiving recess 159, the front edge at the leading end interferes with the engaging part 157 if an attempt is made to mount the engaging part 157 in an inverted posture, thereby being able to prevent the mounting of the engaging part 157. Further, a holding piece insertion hole 160, into which a holding force 66 of the engaging part 157 to be described later is insertable, is formed to penetrate the leading end portion of the first joint piece 156A in the Z-axis direction, i.e. thickness direction (vertical direction). The holding piece insertion hole 160 has a rectangular shape narrow and long in the X-axis direction when viewed from above. A holding projection 158 engageable with the holding piece 66 projects outward from the inner (close to the battery terminal 20) wall surface of the inner circumferential surfaces of the holding piece insertion hole 160. Further, a receiving wall 161 for receiving the leading end of the holding piece 66 is provided at or near the bottom end of the holding piece insertion hole 160.

On the other hand, the second joint piece 156B preferably extends substantially forward from an outer side surface of the main body 41, and a base end portion thereof extends somewhat obliquely outward with respect to the X-axis direction. At least one reinforcing rib 162 is provided on the outer surface of the base end portion of the second joint piece 156B. The outer surface of a leading end portion of the second joint piece 156B is recessed to form a holding piece insertion recess 63 which substantially is open outwardly and into which at least one holding piece 66 of the engaging part 157 is at least partly insertable. A holding projection 158 engageable with the holding piece 66 projects outward from the outer surface of the holding piece insertion recess 163. Further, a receiving wall 161 for receiving the leading end of the holding piece 66 is provided at or near the bottom end of the holding piece insertion recess 163.

With the main body 41 attached to the bolt holding piece 22, the main body preferably is arranged substantially side by side with the bolt holding piece 22 in the X-axis direction, whereas the both joint pieces 156 at least partly sandwich the bolt holding piece 22 and/or are arranged substantially side by side with the bolt holding portion 22 in the Y-axis direction, i.e. in a direction at an angle different from 0° or 180°, preferably substantially orthogonal to longitudinal directions (Z-axis direction) of the stud bolt 24 and the battery post 12. In other words, the both joint pieces 156 are arranged at such positions as to at least partly overlap with the bolt holding piece 22 in the Y-axis direction, but not to overlap in the Z-axis direction. The inner side surfaces of the both joint pieces 156 are proximate to or substantially in contact with the outer side surfaces of the bolt holding piece 22 (FIG. 42). The inner side surface of the first joint piece 156A is proximate to or substantially in contact with the outer side surface of the bolt holding piece 22 (preferably substantially over the entire region), whereas (preferably only a part of) the inner side surface of the second joint piece 156B at the base end side is proximate to or substantially in contact with the outer side surface of the bolt holding piece 22 for the sake of forming a second receiving portion 68B to be described later.

Next, the engaging part 157 is described in detail. The engaging part 157 is made e.g. of synthetic resin (preferably similar to the main body 41) and includes a base portion 164 to be arranged between the leading end portions of the both joint pieces 156, one or more, preferably a pair of side plate portions 65 projecting sideways from the (preferably substantially opposite) lateral end(s) of the base portion 164, one or more, preferably a pair of holding pieces 66 hanging down or projecting from the (preferably both) side plate portion(s) 65 and an engaging portion 67 projecting from the base portion 164 toward the bolt holding piece 22 and engageable with the bolt holding piece 22 as shown in FIGS. 30 and 35 to 39.

Figure 37:
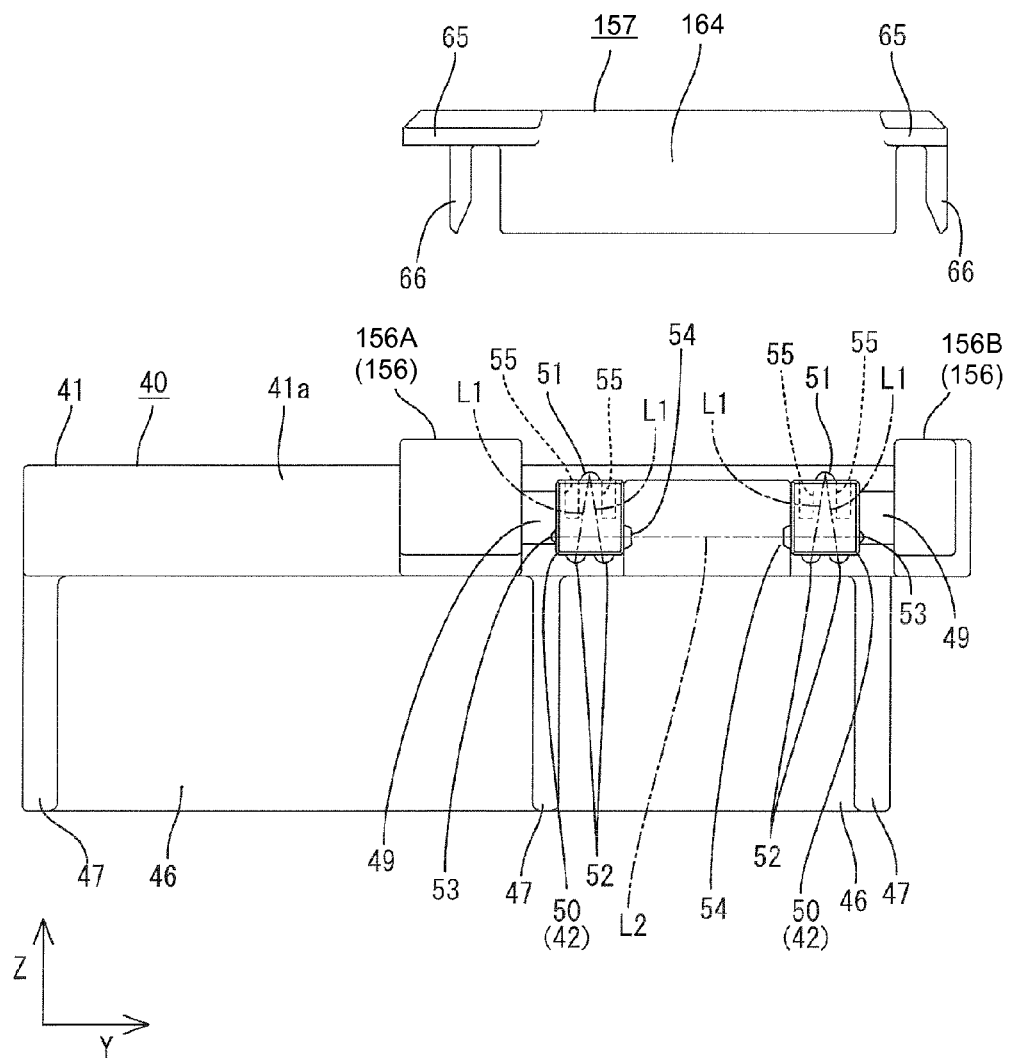
FIG. 37 is a front view of the rotation restricting member before the engaging part is assembled.

As shown in FIG. 35, the base portion 164 is substantially in the form of a block narrow and long in the Y-axis direction, and the length thereof is longer than the spacing between the leading end portions of the both joint pieces 156 by a specified dimension (recessed dimension of the engaging part receiving recess 159). A surface of the base portion facing a side substantially opposite to the main body 41 (surface substantially facing the post fitting portion 21) preferably is substantially arcuately cut substantially in conformity with the outer shape of the tightening portion 25 of the post fitting portion 21. The base portion 164 is at least partly fitted or inserted in a space between the bolt holding piece 22 and the post fitting portion 21 while being mounted between the leading end portions of the both joint pieces 156 and mounted on the battery terminal 20 (FIG. 42). A bored portion preferably is formed in the lower surface of the base portion 164. As shown in FIGS. 35 and 37, the both side plate portions 65 project outwardly in the Y-axis direction from upper end positions of the opposite outer side surfaces of the base portion 164 and both front and rear end surfaces thereof are flush with those of the base portion 164.

Figure 36:
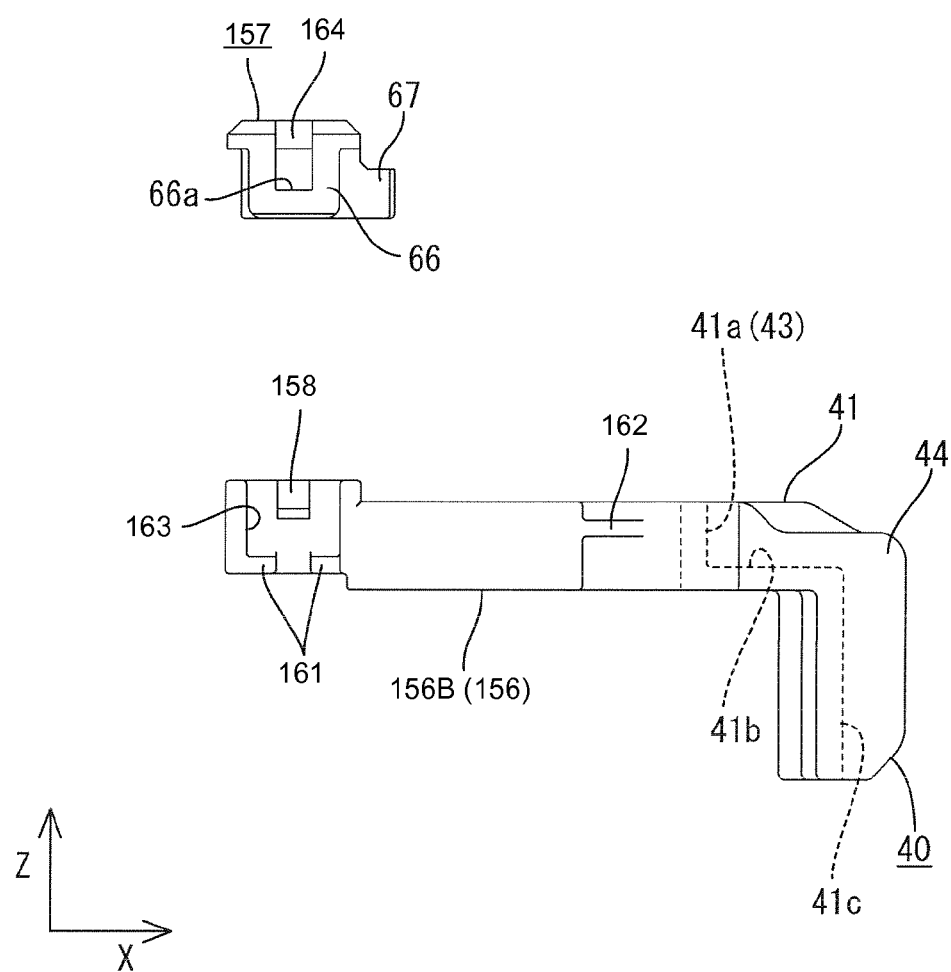
FIG. 36 is a side view of the rotation restricting member before the engaging part is assembled.
Figure 41:
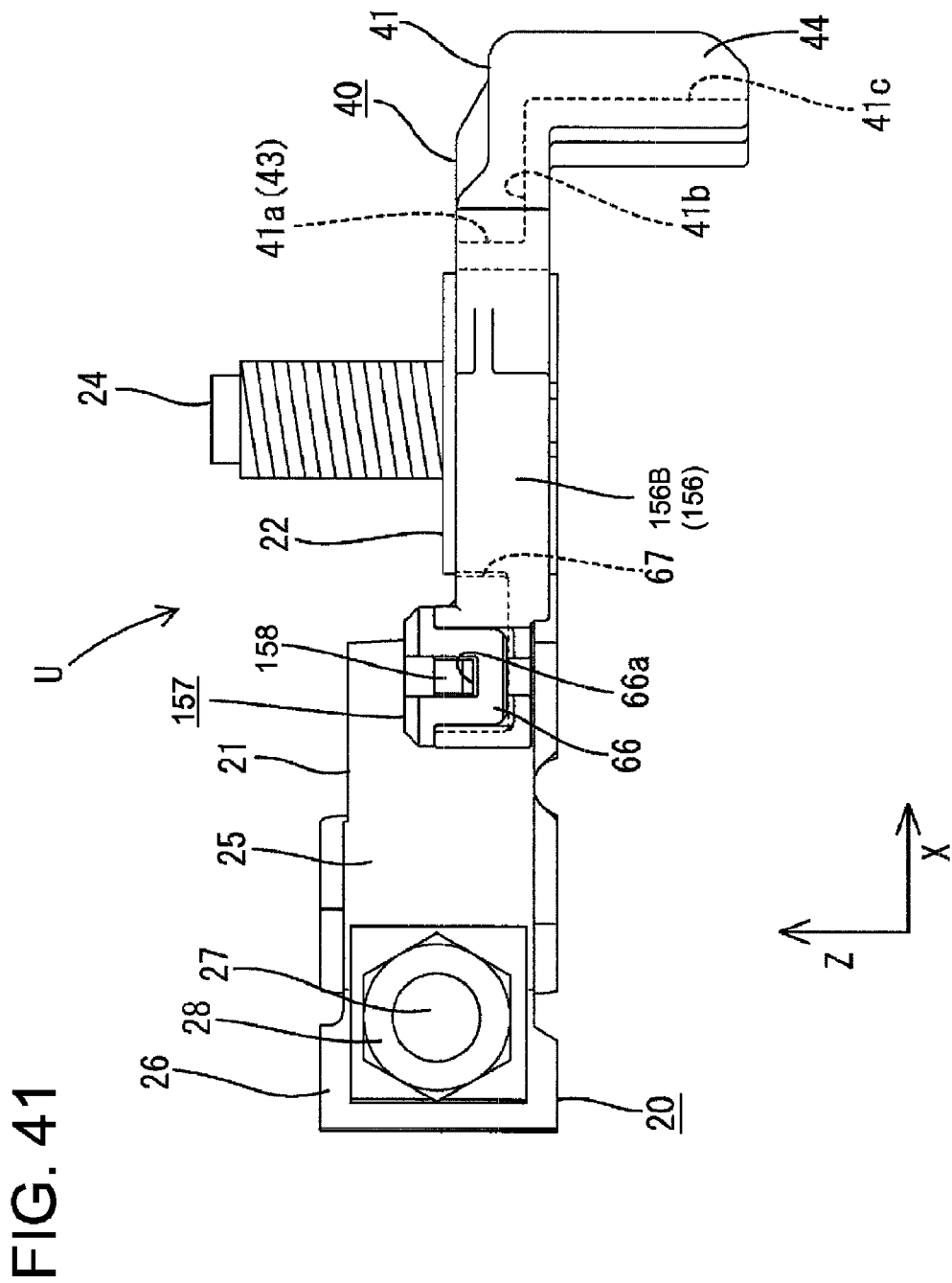
FIG. 41 is a side view showing a state where the rotation restricting member is assembled with the battery terminal.
Figure 45:
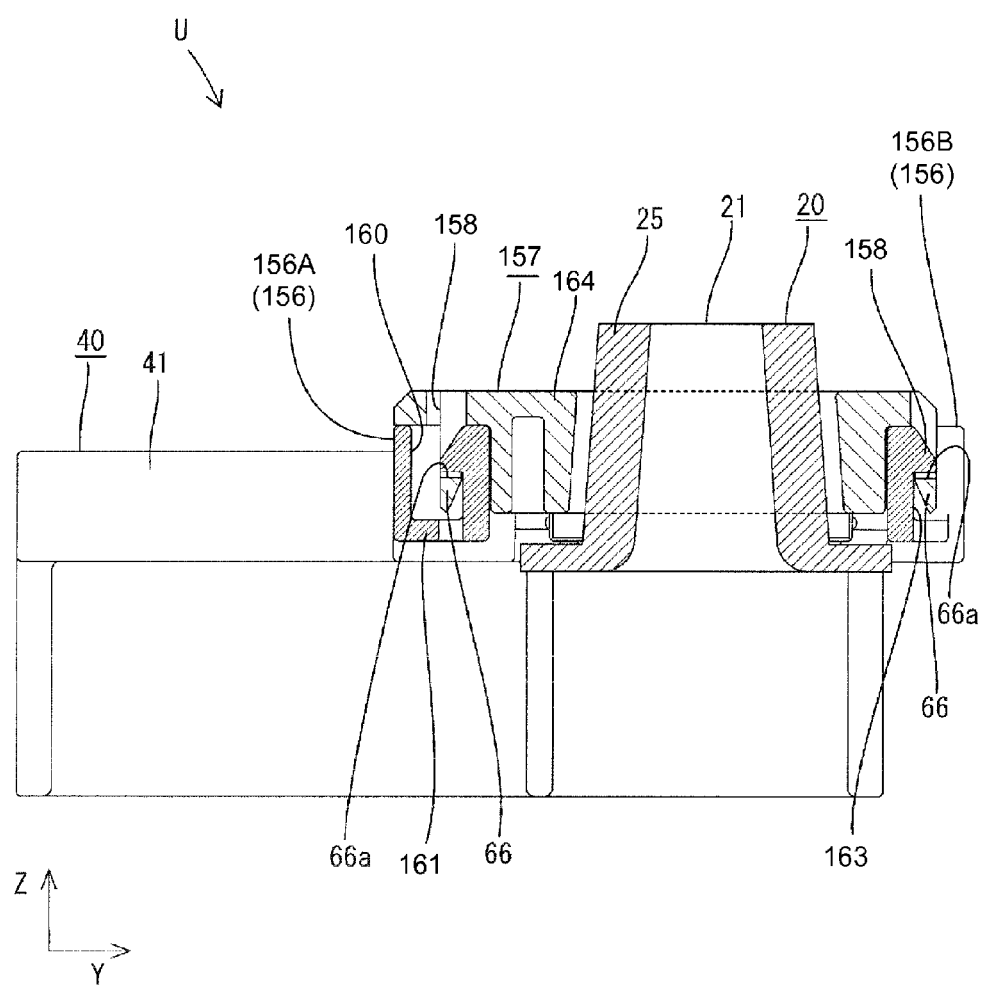
FIG. 45 is a section along xvi-xvi of FIG. 42.

As shown in FIGS. 36 and 37, the both holding pieces 66 preferably are substantially in the form of cantilevers substantially projecting (downwardly) in the Z-axis direction, i.e. in a mounting direction of the engaging part 157 toward the both joint pieces 156, from the (lower) surfaces of the both side plate portions 65. The both holding pieces 66 are resiliently deformable with the base ends thereof as supporting points and/or are displaced outwardly in the Y-axis direction, i.e. in directions at an angle different from 0° or 180°, preferably substantially orthogonal to the above mounting direction as being resiliently deformed. A groove 66a with an open upper side is formed in the widthwise intermediate portion (preferably substantially in the widthwise center) of the (each) holding piece 66. When the engaging part 157 is mounted on the both joint pieces 156, the one or more holding projections 158 are at least partly insertable into the one or more respective above grooves 66a to be engaged with the bottom sides of the respective groove edges (FIG. 45). In other words, the both holding pieces 66 have preferably a substantially channel shape when viewed sideways, and the leading ends thereof preferably are engaged with the holding projections 158 (FIG. 41).

Figure 38:
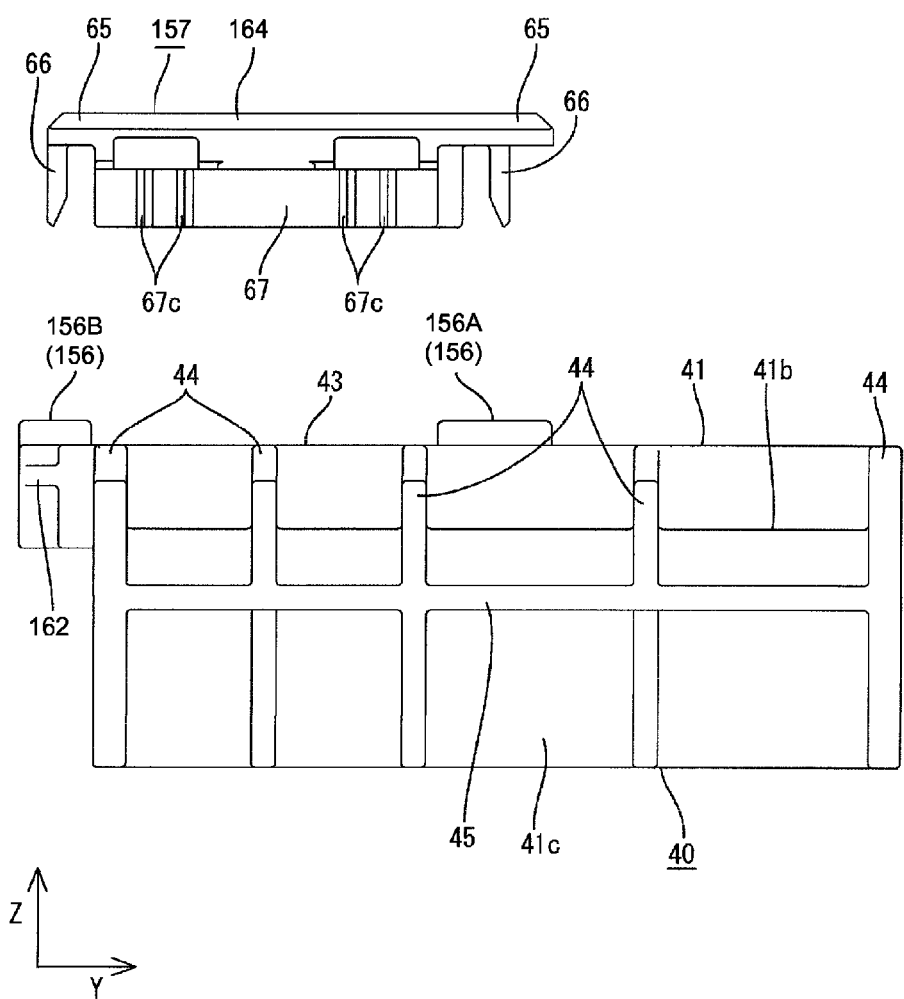
FIG. 38 is a rear view of the rotation restricting member before the engaging part is assembled.
Figure 39:
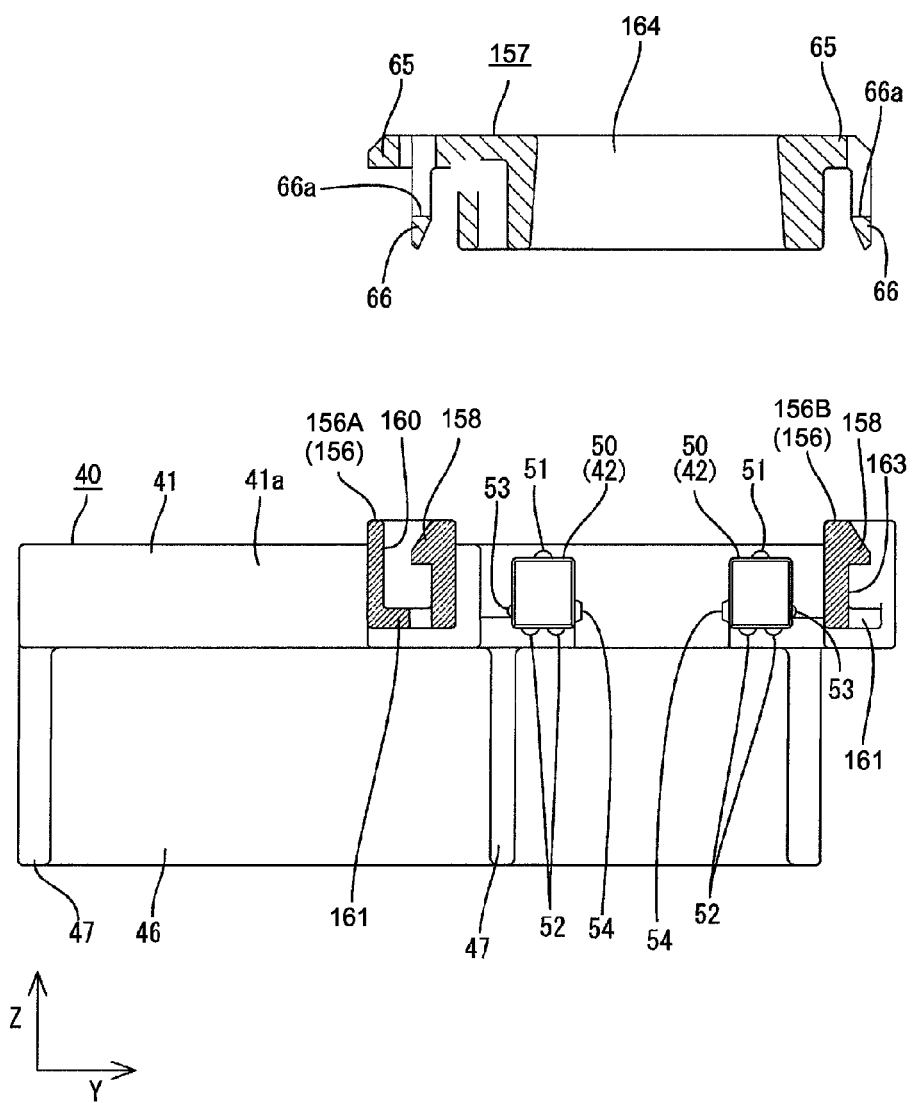
FIG. 39 is a section along x-x of FIG. 35.

As shown in FIGS. 35 and 38, the engaging portion 67 projects substantially toward the main body 41 from a surface of the base portion 164 substantially facing the main body 41 (surface facing the bolt holding portion 22) (FIG. 35). The engaging portion 67 preferably is in the form of a plate narrow and long substantially in the Y-axis direction and/or the length thereof preferably is substantially equal to the spacing between the both joint pieces 156, i.e. the width of the bolt holding portion 22. The engaging portion 67 preferably is partly connected to the base portion 164, specifically at a total of four positions: at the opposite end positions in the length direction of the engaging portion 67 and two positions distanced inwardly from the opposite end positions by a specified (predetermined or predeterminable) distance, via one or more connecting portions 67a. Accordingly, parts of the engaging portion 67 arranged between the respective connecting portions 67a preferably serve as bridge portions 67b which are bridge-shaped (supported at both ends), and the respective bridge portions 67b are resiliently deformable, though only to a small degree, in the X-axis direction, i.e. in a direction substantially away from the base portion 164. In other words, bores are present between the respective bridge portions 67b and the base portion 164, whereby the dimensional accuracy of the thickness of the respective bridge portions 67b at the time of molding is increased. A pair of engaging projections 67c to be engaged with the end surface of the ceiling wall 22c of the bolt holding portion 22 are provided on the outer surface (surface facing the bolt holding portion 22) of each of the pair of bridge portions 67b located at the opposite ends of the engaging portion 67. With the engaging part 157 assembled with the leading end portions of the both joint pieces 156, the main body 41 and the engaging portion 67 preferably are at a specified (predetermined or predeterminable) distance from each other, and/or this distance preferably is substantially equal to the length (dimension in the X-axis direction) of the bolt holding portion 22 (FIG. 42).

The aforementioned terminal fitting 60 to be mounted on the aforementioned bolt holding portion 22 is engageable with the above joint pieces 156. Specifically, each of the both joint pieces 156 is formed with a receiving portion 68 for receiving the anti-rotation piece 64 substantially projecting downwardly, i.e. toward the joint piece 156 from the battery mounting portion 62 of the terminal fitting 62. With the battery mounting portion 62 of the terminal fitting 60 placed on or at the bolt holding portion 22, the anti-rotation pieces 64 are at least partly inserted in the receiving portions 68 and engaged with wall surfaces of the receiving portions 68, whereby the main body 41 integral or unitary to the joint pieces 156 is restricted from moving in a detaching direction from the bolt holding portion 22 united with the terminal fitting 60, i.e. in a direction substantially opposite to the attaching direction (pressing direction) of the main body 41. In the following description, the receiving portion formed in the first joint piece 156A is called a first receiving portion, the one formed in the second joint piece 156B is called a second receiving portion, a suffix "A" is attached to the reference numeral of the first receiving portion and a suffix "B" is attached to the reference numeral of the second receiving portion in the case of distinguishing the two receiving portions 68, whereas no suffixes are attached in the case of collectively terming them without distinguishing them.

Figure 50:
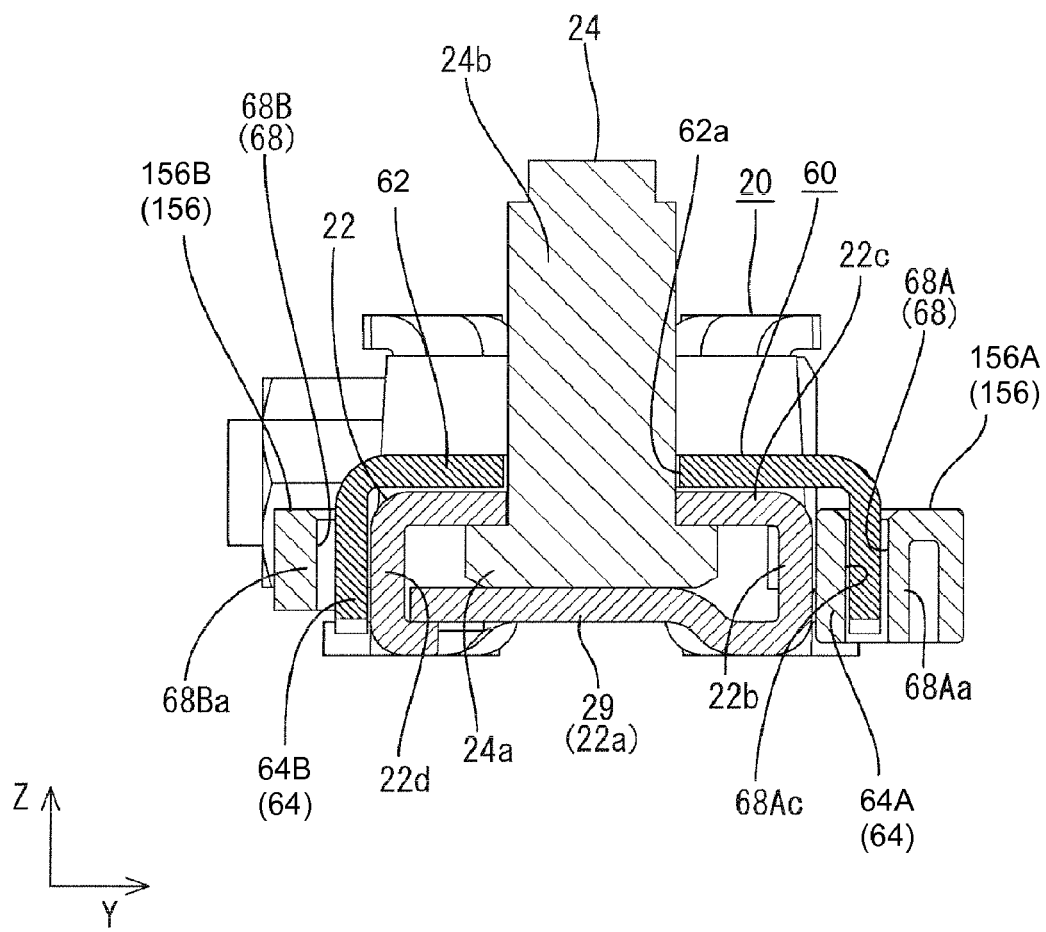
FIG. 50 is a section along xxi-xxi of FIG. 49.
Figure 51:
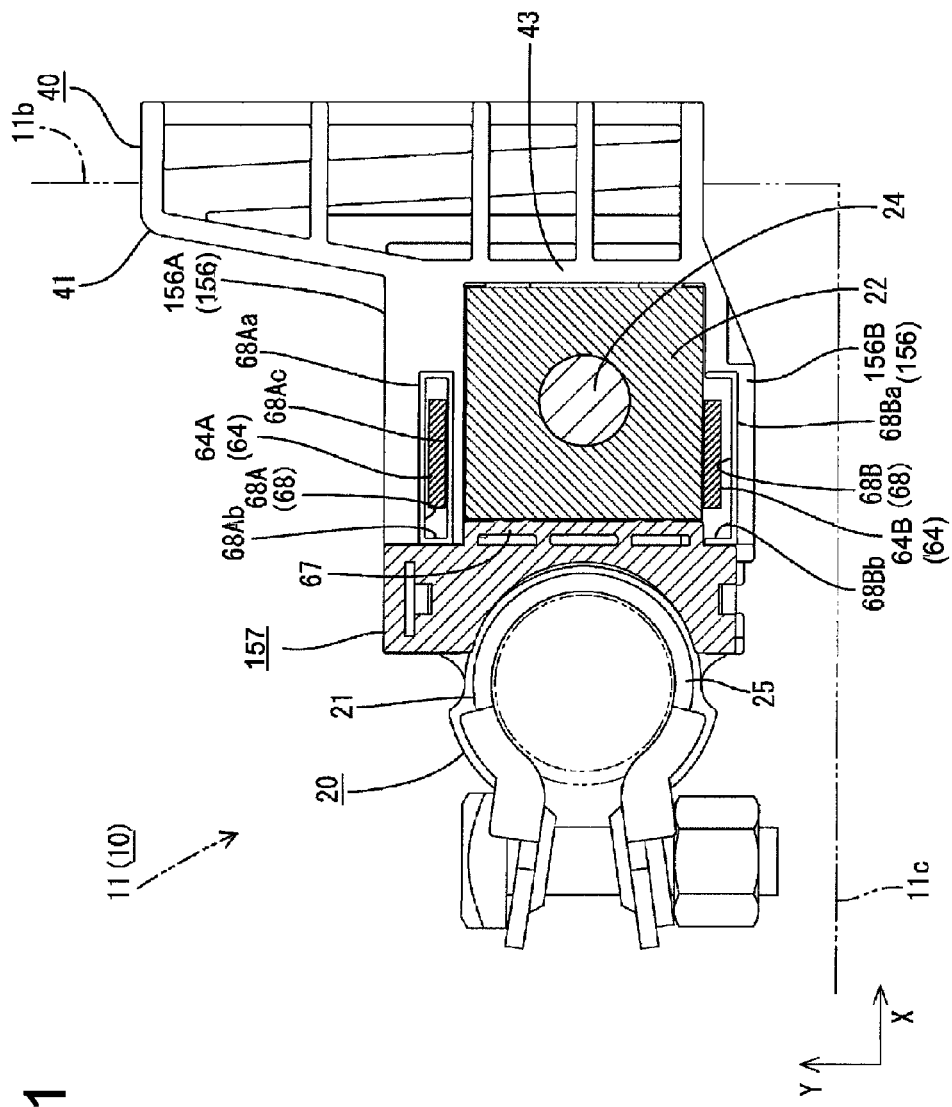
FIG. 51 is a plan view with a terminal fitting, the engaging part and the bolt holding portion shown in section in a state where the terminal fitting is assembled.
Figure 52:
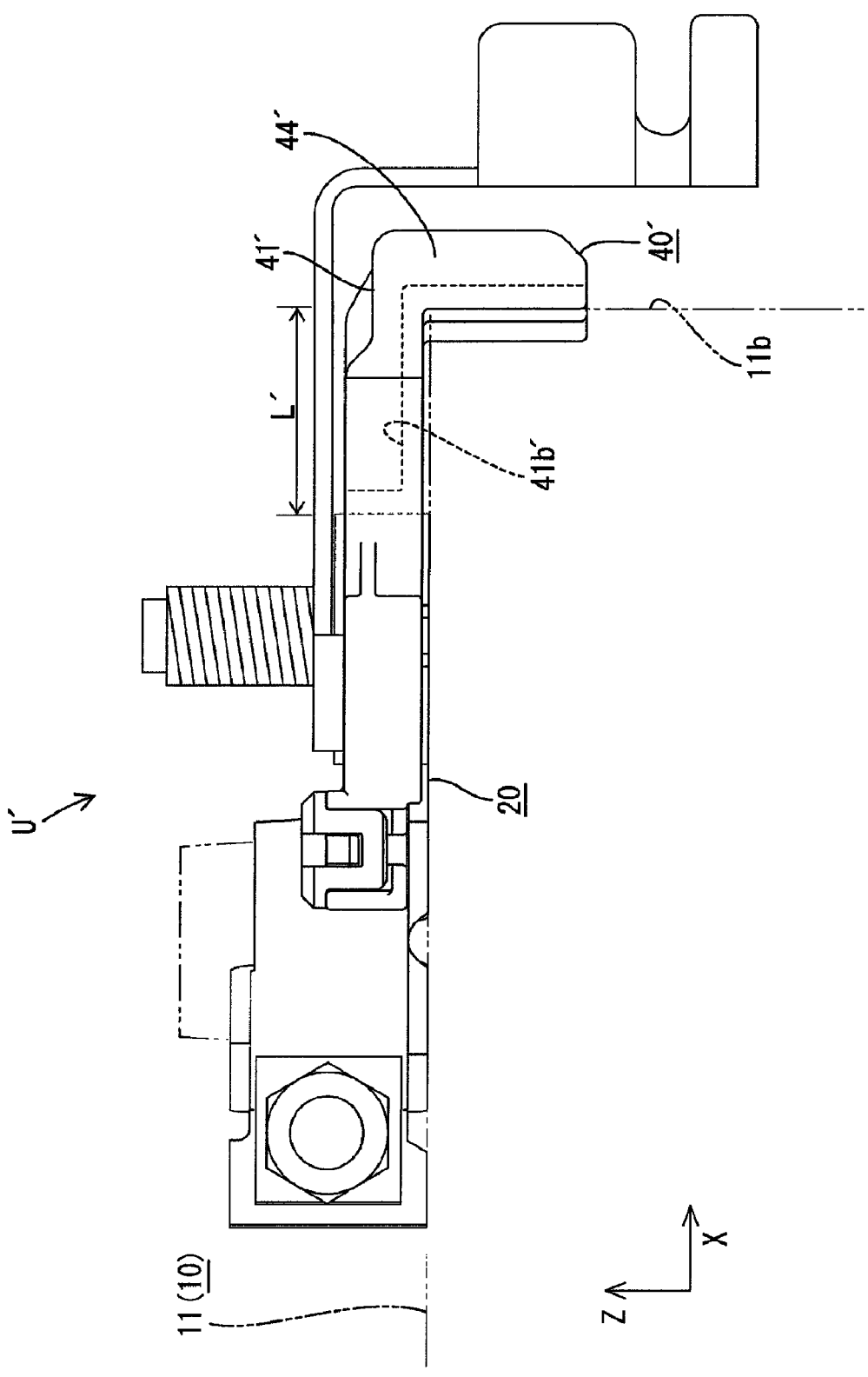
FIG. 52 is a side view of a battery terminal unit including a rotation restricting member whose shape is changed in conformity with a battery.

The first receiving portion 68A preferably is in the form of a hole penetrating an intermediate part (part corresponding to the bolt holding portion 22) between the leading end and the base end of the first joint piece 156A in its thickness direction (Z-axis direction) (FIG. 50). The first receiving portion 68A preferably is shaped substantially in conformity with the cross-sectional shape of the first anti-rotation piece 64A and/or has a substantially rectangular shape narrow and long in the X-axis direction (length direction of the first joint piece 156A) when viewed from above (FIG. 51). Accordingly, a hole edge 68Aa of this first receiving portion 68A has a laterally long frame shape, i.e. an endless ring shape. Out of the inner circumferential wall surfaces of the first receiving portion 68A, a wall surface located at a side opposite to the main body 41 in the X-axis direction and extending in the Y-axis direction (direction at an angle different from 0° or 180°, preferably substantially orthogonal to the pressing direction of the main body 41) is engaged with an end surface of the first anti-rotation piece 64A substantially facing toward a side opposite to the main body 41, whereby the main body 41 and the rotation restricting member 40 are retained (FIG. 51). This wall surface preferably serves as a detachment restricting engaging surface 68Ab with the first anti-rotation piece 64A. In other words, an intermediate part of the first joint piece 156A in the length direction is divided into a pair of inner and outer arm portions by the first receiving portion 68A.

The inner surface of the first anti-rotation piece 64A at least partly inserted into the first receiving portion 68A can come substantially into contact with a wall surface located close to (at an inner side) the bolt holding portion 22 in the Y-axis direction and substantially extending in the X-axis direction (pressing direction of the main body 41) out of inner peripheral wall surfaces of the first receiving portion 68A (FIG. 50). This wall surface preferably serves as an anti-rotation contact surface 68Ac with the first anti-rotation piece 64A. In the mounted state, an inner edge portion of the hole edge 68Aa of the first receiving portion 68A in the Y-axis direction is held between the bolt holding portion 22 and the first anti-rotation piece 64A.

On the other hand, the second receiving portion 68B preferably penetrates an intermediate part (part corresponding to the bolt holding portion 22) between the leading end and the base end of the second joint piece 156B in its thickness direction (Z-axis direction) and is open inwardly (toward the press-fitting portions 42 and the bolt holding portion 22) in the Y-axis direction. In other words, the inner side surface (surface facing the press-fitting portions 42 and bolt holding portion 22) of the second joint piece 156B is partly recessed. Accordingly, a hole edge 68Ba of the second receiving portion 68B preferably is substantially in the form of a laterally long channel when viewed from above and/or preferably has an incomplete ring shape. Out of the inner peripheral wall surfaces of the second receiving portion 68B, a wall surface located at a side opposite to the main body 41 in the X-axis direction and extending in the Y-axis direction (direction orthogonal to the pressing direction of the main body 41) is engaged with an end surface of the second anti-rotation piece 64B substantially facing a side opposite to the main body 41, whereby the main body 41 and the rotation restricting member 40 are retained (FIG. 51). This wall surface serves as a detachment restricting engaging surface 68Bb with the second anti-rotation piece 64B.

With the rotation restricting member 40 attached to the battery terminal 20, an opening part in the Y-axis direction in the hole edge 68Ba of the receiving portion 68B preferably is closed substantially over the entire length by the first side wall 22b forming a bolt holding portion 22 (FIG. 42). With the terminal fitting 60 mounted on or to a stud bolt 24, the first anti-rotation piece 64A is at least partly inserted in the second receiving portion 68B and can come into direct contact with the outer side surface of the second side wall 22d of the bolt holding portion 22. Accordingly, in this mounted state, the function of preventing the rotation of the terminal fitting 60 relative to the bolt holding portion 22 (stud bolt 24) can be sufficiently displayed by this second anti-rotation piece 64A and the aforementioned first anti-rotation piece 64B. The spacing between the inner surfaces of the both anti-rotation pieces 64 preferably is substantially equal to the sum of the width of the bolt holding portion 22 and the width of the inner edge portion of the hole edge 68Aa of the first receiving portion 68A in the Y-axis direction. The both anti-rotation pieces 64 can be said to possess the function of preventing the rotation of the terminal fitting 60 and the function of preventing the detachment of the first joint piece 156A.

Next, functions of this embodiment constructed as above are described. First of all, the rotation restricting member 40 is attached to the battery terminal 20 with the stud bolt 24 accommodated in the bolt holding portion 22.

Upon attaching the rotation restricting member 40, the main body 41 is relatively brought closer to the battery terminal 20 substantially in the X-axis direction while the bolt holding portion 22 of the battery terminal 20 is positioned with the bolt holding portion 22 between the both joint pieces 156 of the main body 41. When the main body 41 is pushed to a specified (predetermined or predeterminable) depth, the bolt holding portion 22 is held between the both joint pieces 156 and, subsequently, the both press-fitting portions 42 are at least partly inserted into the corresponding divided openings 32a forming the opening 32 of the bolt holding portion 22. As the inserting projections 50 of the respective press-fitting portions 42 are at least partly inserted into the corresponding divided openings 32a, the first, second and/or third ribs 51, 52, 53 respectively interfere with the upper, lower and/or outer sides of the opening edges of the divided operations 32a, thereby preferably being squeezed. At this time, the retaining projections 54 interfere with the standing portion 34a of the bolt rotation restricting piece 34 forming the inner sides of the opening edges of the divided openings 32a, thereby being forcibly inserted toward the side behind the standing portion 34a when viewed from the main body 41 while being abraded to a certain degree.

Figure 40:
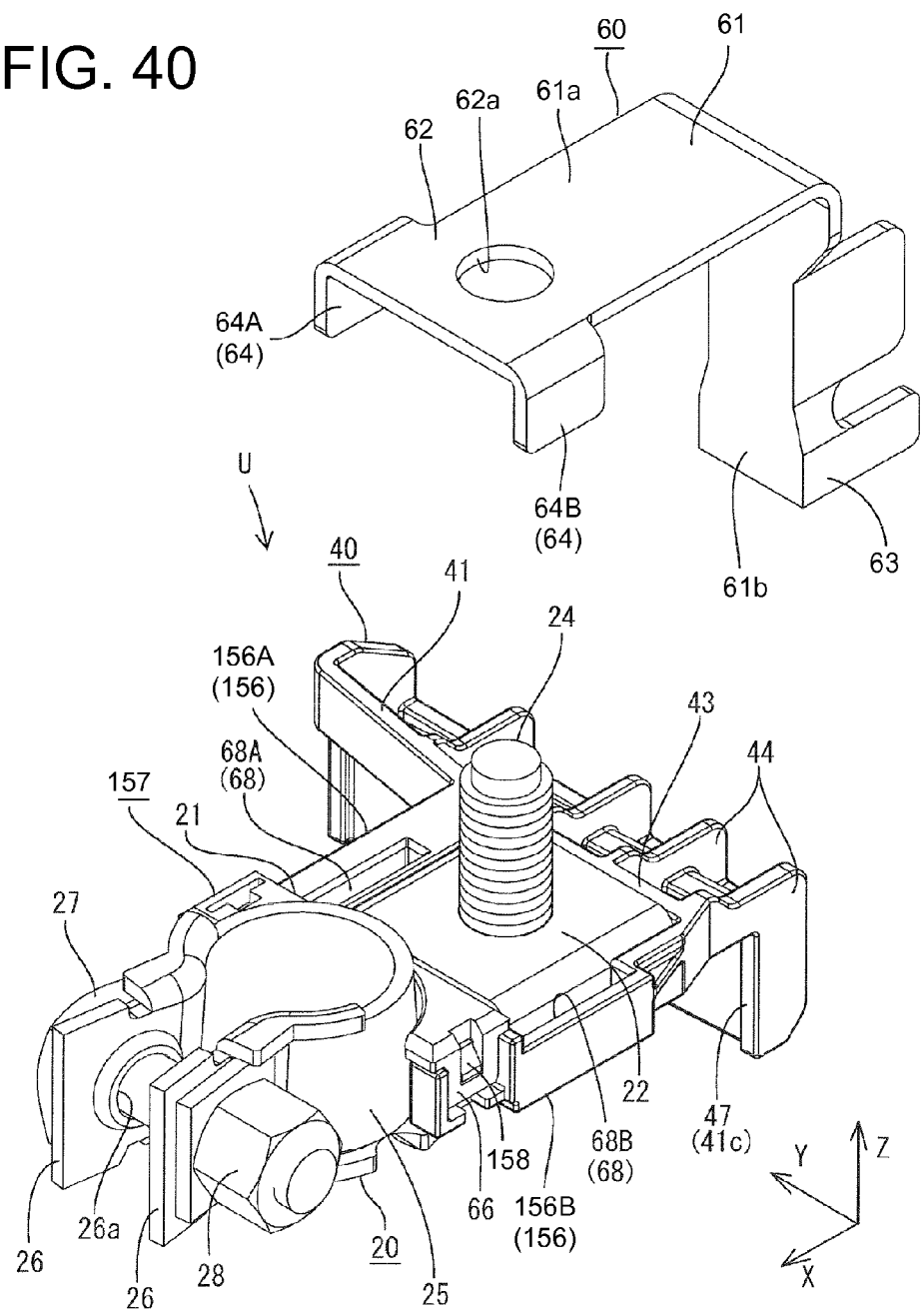
FIG. 40 is a perspective view of a battery terminal unit before a terminal fitting is mounted.
Figure 43:
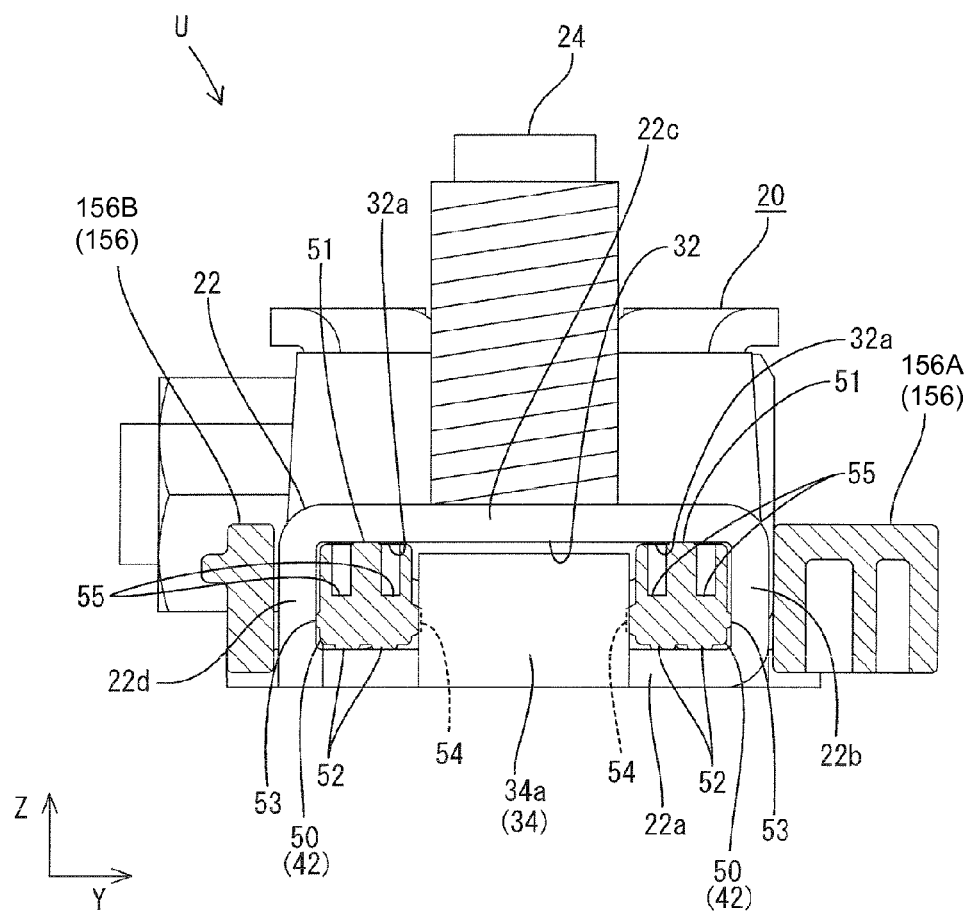
FIG. 43 is a section along xiv-xiv of FIG. 42.
Figure 44:
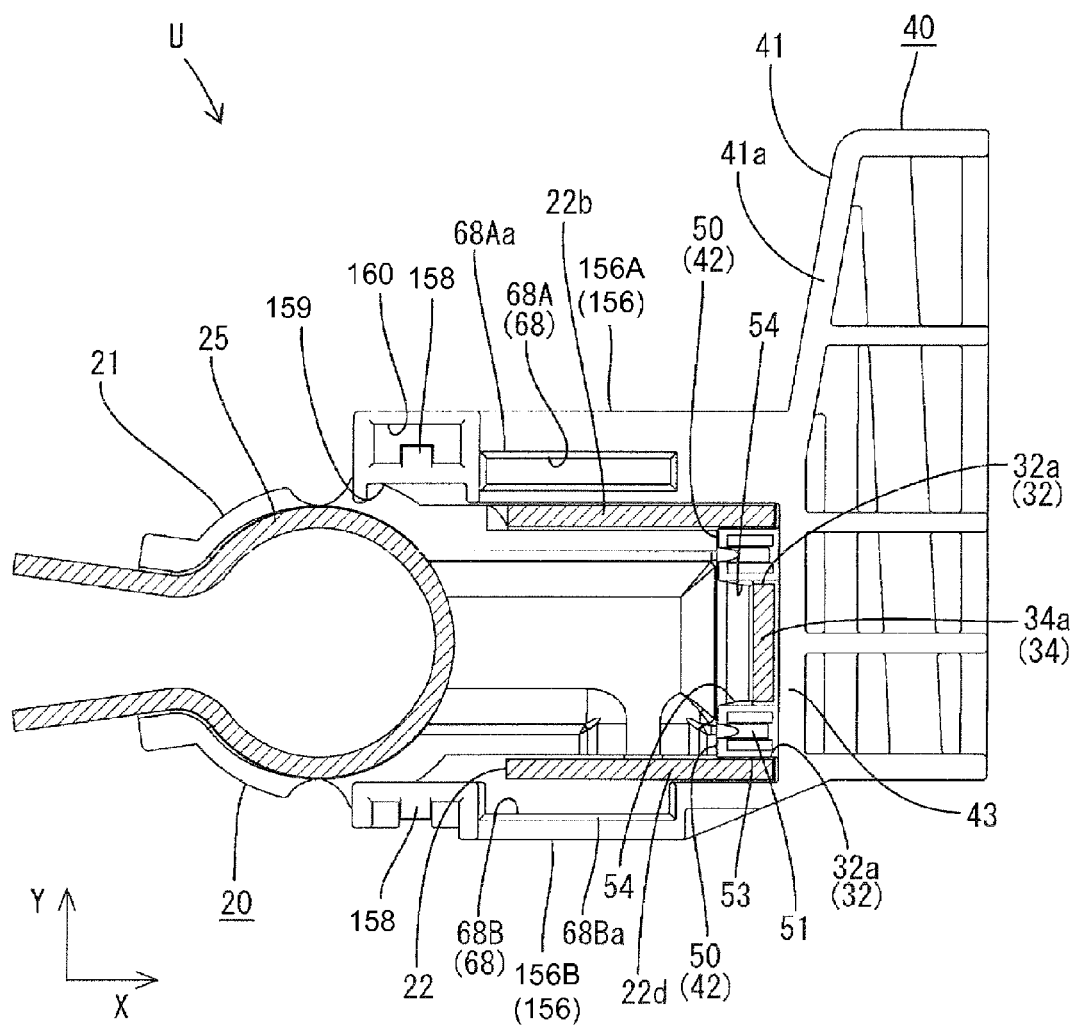
FIG. 44 is a plan view with the battery terminal shown in section in a state where the rotation restricting member is assembled with the battery terminal.

Similar to the first embodiment, when the respective press-fitting portions 42 are at least partly press-fitted or inserted into the corresponding divided openings 32a to a substantially proper depth, the both receiving projections 49 of the terminal receiving portion 43 come into contact with the side end surfaces of the bolt holding portion 22, thereby preventing the rotation restricting member 40 from being pushed any further (FIGS. 40 to 42). In this attached state, the main body 41 is undetachably held onto the battery terminal 20 by a frictional resistance force obtained by squeezing the respective ribs 51 to 53 and a locking force obtained by engaging the locking surfaces 54a of the retaining projections 54 with the standing portion 34a of the bolt rotation restricting piece 34 as shown in FIGS. 43 and 44. Specifically, the main body 41 preferably is so held as not to be displaced relative to the battery terminal 20 in the Z-axis direction by the first and/or second ribs 51, 52 and/or in the Y-axis direction by the third ribs 53 and is so held as not to be relatively displaceable (retained) in the detaching direction in the X-axis direction by the retaining projections 54. Further, since the bolt holding portion 22 preferably is held between the both joint pieces 156 in this state, the main body 41 cannot be displaced relative to the battery terminal 20 in the Y-axis direction. As a result, the main body 41 is prevented from shaking relative to the battery terminal 20 in any one of the X-axis direction, Y-axis direction and Z-axis direction. Further, since the pair of second ribs 52 preferably are arranged at a specified (predetermined or predeterminable) distance from each other in each inserting projection 50, such a situation where the inserting projections 50 are inclined about their axial lines (X-axis) in the divided openings 32a is unlikely to occur. Furthermore, since the pair of press-fitting portions 20 preferably are arranged substantially side by side in the Y-axis direction in the main body 41, such a situation where the main body 41 is inclined about the Z-axis or about the X-axis relative to the battery terminal 20 is extremely unlikely to occur. In this attached state, the leading ends of the both joint pieces 156 are arranged to project in the X-axis direction from the bolt holding portion 22 toward a side opposite to the main body 41, i.e. toward the post fitting portion 21.

After the main body 41 is held onto the battery terminal 20 preferably by press-fitting as described above, the engaging part 157 is successively assembled with the both joint pieces 156. The engaging part 157 oriented such that the engaging portion 67 substantially faces the bolt holding portion 22 preferably is at least partly pushed or inserted into a space between the bolt holding portion 22 and the post fitting portion 21 in the battery terminal 21 from above and/or attached to the leading end portions of the both joint pieces 156. Then, the engaging part 157 is at least partly fitted or inserted between the bolt holding portion 22 and the post fitting portion 21, the base portion 164 is at least partly fitted or inserted between the leading end portions of the both joint pieces 156 and/or the both holding pieces 66 are at least partly inserted into the corresponding holding piece insertion hole 156 or the holding piece insertion recess 163. In this process, the respective engaging projections 67c of the engaging portion 67 preferably come substantially into sliding contact with the end surface of the ceiling wall 22c of the bolt holding portion 22. At this time, since the respective bridge portions 67b of the engaging portion 67 are resiliently deformable in the direction substantially away from the bolt holding portion 22, although only to a small degree, an assembling error with the battery terminal 20 can be absorbed, with the result that the engaging portion 67 can be substantially held in close contact with the bolt holding portion 22. Further, in the assembling process, the respective holding pieces 66 are resiliently deformed outwardly upon moving onto the corresponding holding projections 158.

Figure 46:
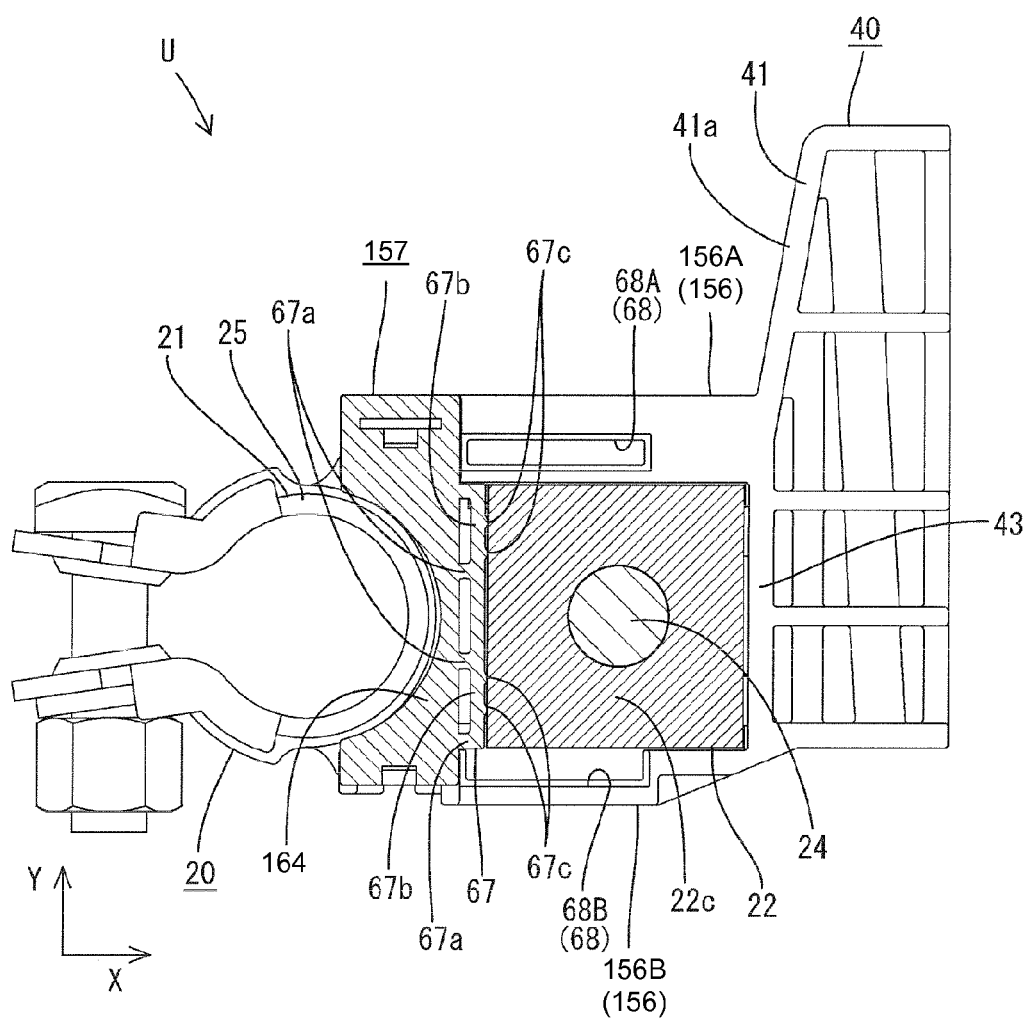
FIG. 46 is a plan view with the engaging part and a bolt holding portion shown in section in the state where the rotation restricting member is assembled with the battery terminal.

When the engaging part 157 is pushed onto the leading end portions of the both joint pieces 156 to a proper depth, the respective holding pieces 66 move over the corresponding holding projections 158 and are resiliently at least partly restored and the groove edges of the respective grooves 66a are engaged with the corresponding holding projections 158 as shown in FIG. 45, whereby the engaging part 157 is held assembled with the (preferably both) joint pieces 156. At this time, since the respective engaging projections 67c of the engaging portion 67 of the engaging part 157 are engaged with the end surface of the ceiling wall 22c of the bolt holding portion 22 as shown in FIG. 46, the main body 41 integrally or unitarily connected to the engaging part 157 via the both joint pieces 156 is restricted from moving from the battery terminal 20 in the detaching direction substantially opposite to the pressing direction even if such a force should act to pull the main body 41 from the battery terminal 20. In this assembled state, since the bolt holding portion 22 is held at least partly between the engaging part 157 and the main body 41 in the X-axis direction and between the aforementioned both joint pieces 156 in the Y-axis direction, the bolt holding portion 22 is at least partly surrounded over the entire circumference. Thus, the bolt holding portion 22 is restricted from being displaced relative to the main body 41 in all directions at an angle different from 0° or 180°, preferably substantially orthogonal to the longitudinal direction (Z-axis direction) of the stud bolt 24.

Next, the terminal fitting 60 connected with the wire is mounted on the bolt holding portion 22 of the battery terminal 20 united with the rotation restricting member 40 as described above. The shaft part 24b of the stud bolt 24 is positioned with and passed through the bolt insertion hole 62a of the terminal fitting 60, and the main plate portion 61a of the base portion 61 is brought into contact with the upper surface of the bolt holding portion 22. In this process, the first anti-rotation piece 64A is at least partly inserted into the hole-shaped first receiving portion 68A of the first joint piece 156A and/or the second anti-rotation piece 64B is at least partly inserted into the second receiving portion 68B in the form of the inwardly open hole of the second joint piece 156B.

With the terminal fitting 60 mounted on the bolt holding portion 22, the main plate portion 61*a* of the terminal fitting 60 is held substantially in contact with the upper surface of the bolt holding portion 22 and the both anti-rotation pieces 64 are at least partly inserted in the receiving portions 68 of the corresponding joint pieces 156 and arranged in contact with or in proximity to the inner peripheral wall surfaces of the receiving portions 68 as shown in FIGS. 47 to 51. In this state, since the end surfaces of the anti-rotation pieces 64 at the side substantially opposite to the main body 41 in the X-axis direction and the detachment restricting engaging surfaces 68*b* of the (preferably both) receiving portions 68 are arranged to substantially face each other, even if a force should act to pull the main body 41 in the direction opposite to the pressing direction, the main body 41 substantially is restricted from being displaced in the detaching direction relative to the terminal fitting 60 and the bolt holding portion 22 by the engagement of the detachment restricting engaging surfaces 68*b* with the both anti-rotation pieces 64 as well as the aforementioned press-fitting action by the press-fitting portions 42 and locking action by the engaging part 157 (FIG. 51). As a result, the rotation restricting member 40 can be held onto the battery terminal 20 via the terminal fitting 60 with a larger holding force. Further, the first anti-rotation piece 64A preferably is held in contact with the anti-rotation contact surface 68Ac of the receiving portion 68A of the first joint piece 156A and/or the second anti-rotation piece 64B preferably is held in direct contact with the outer side surface of the second side wall 22*d* of the bolt holding portion 22, whereby the rotation of the terminal fitting 60 relative to the stud bolt 24 can be prevented (FIG. 50).

Figure 47:
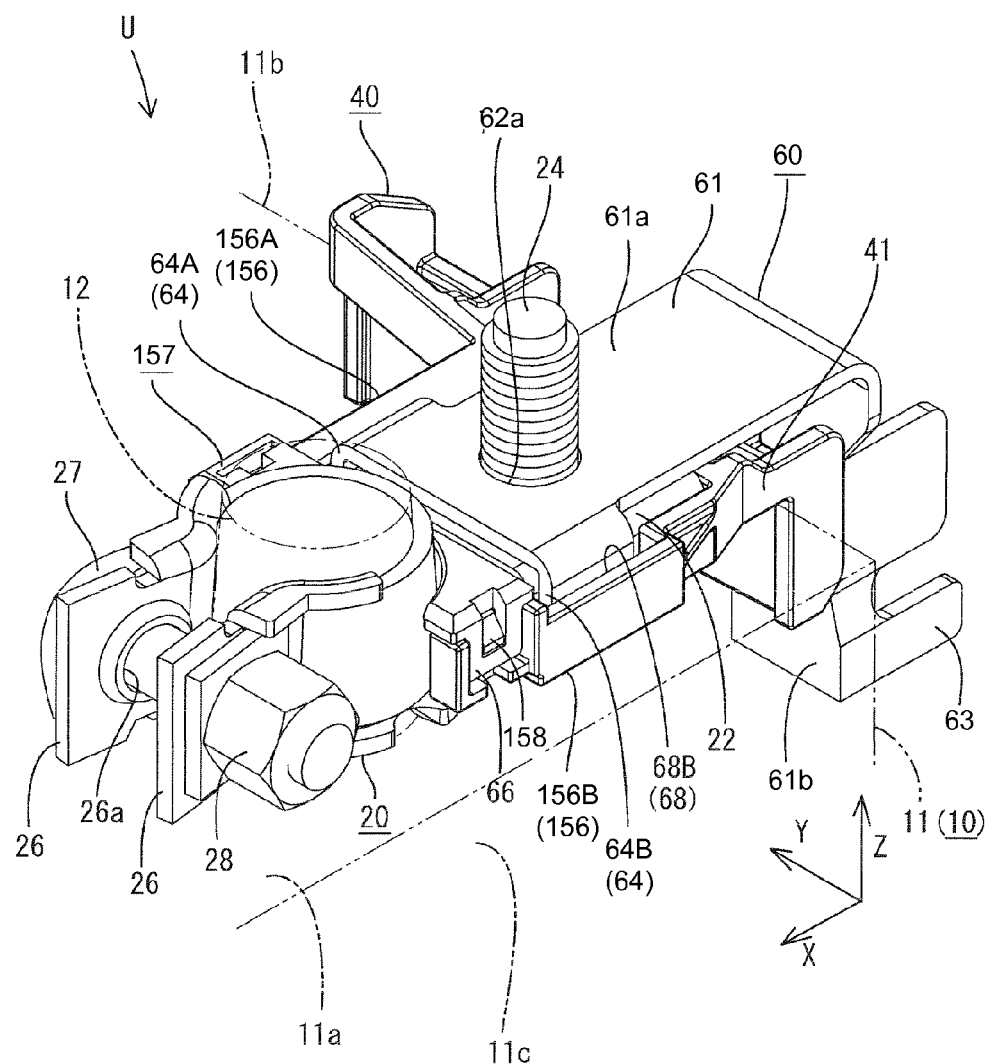
FIG. 47 is a perspective view of the battery terminal unit mounted on a battery.
Figure 48:
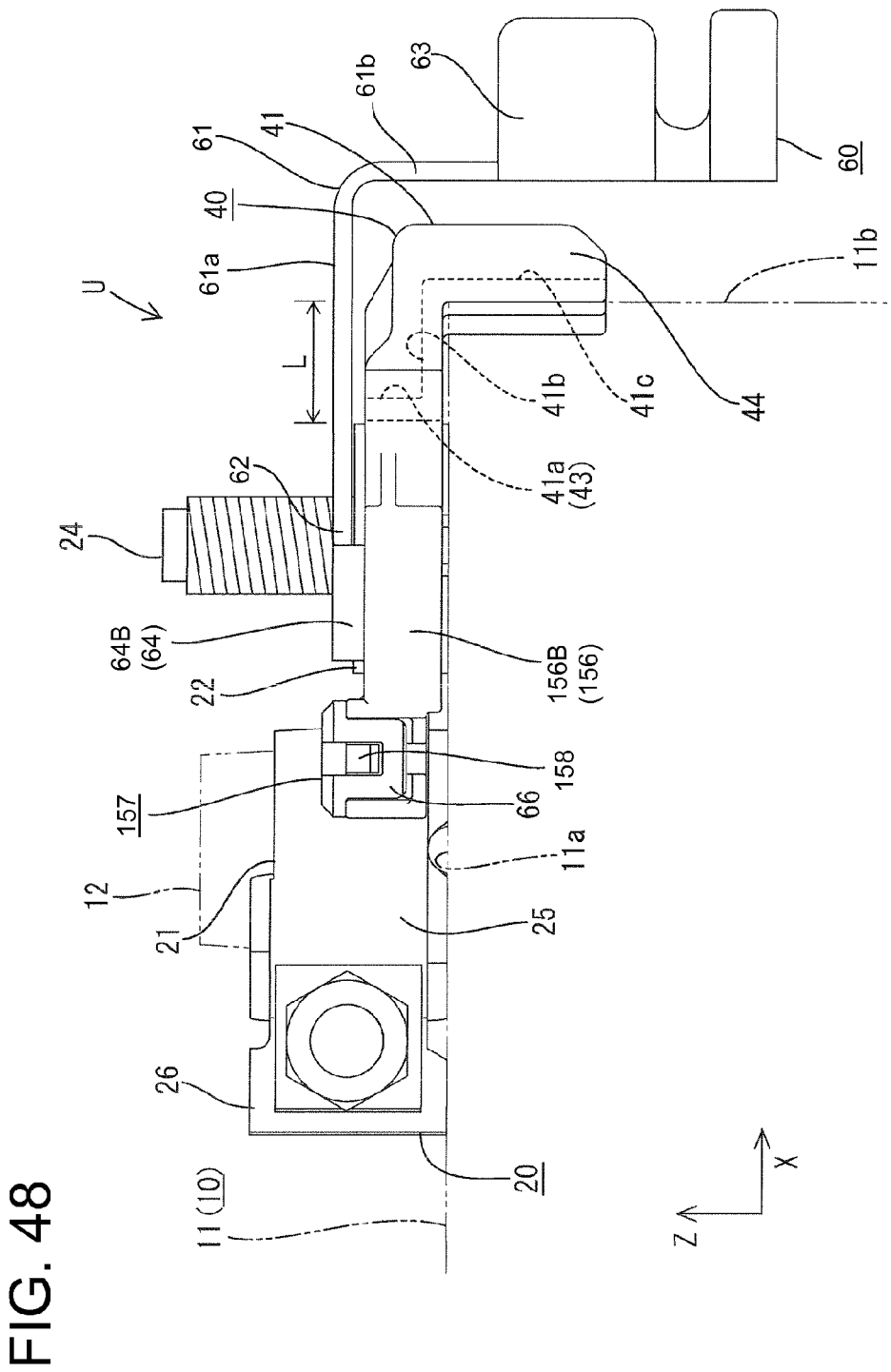
FIG. 48 is a side view of the battery terminal unit mounted on the battery.
Figure 49:
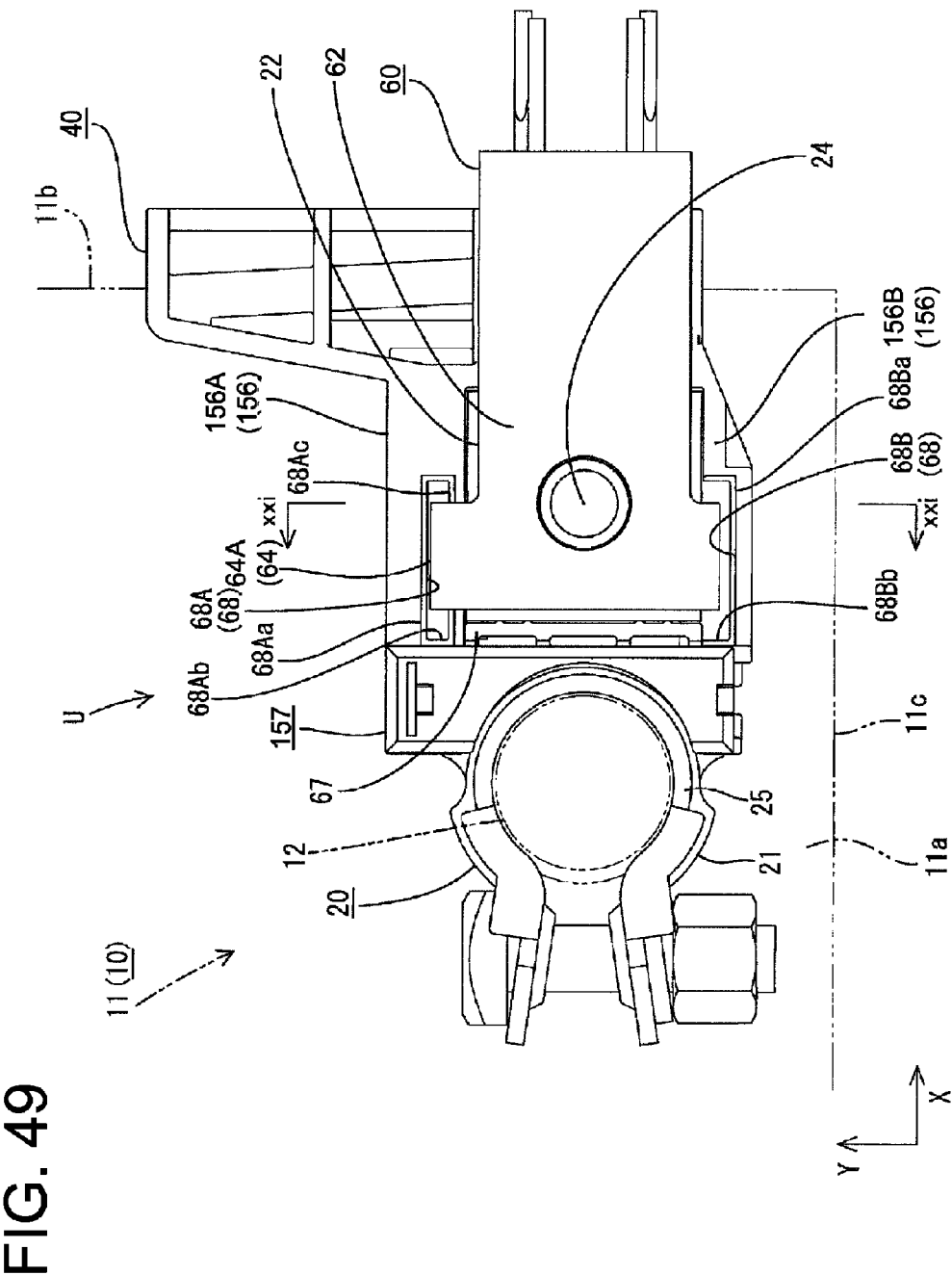
FIG. 49 is a plan view of the battery terminal unit mounted on the battery.

Subsequently, the battery terminal unit U obtained as described above is mounted on the battery 10. First of all, the post fitting portion 21 of the battery terminal 20 is fitted on the battery post 12 of the battery 10. At this time, as shown in FIGS. 47 to 49, similar to the first embodiment the rotation restricting wall 41*c* forming the main body 41 of the rotation restricting member 40 is brought into contact with the side surface 11*b* of the battery main body 11. When the battery terminal 20 is placed on the upper surface 11*a* of the battery main body 11, the bolt 27 and the nut 28 of the post fitting portion 21 are or can be appropriately tightened using a tool. Then, the tightening portion 25 of the post fitting portion 21 is resiliently deformed to reduce the inner diameter thereof and the inner circumferential surface thereof is pressed into contact with the outer circumferential surface of the battery post 12, with the result that the battery post 20 is held mounted on the battery post 12, wherein the rotation restricting member 40 may prevent the battery terminal 20 to be rotationally displaced about the axial line (Z-axis) of the battery post 12 by a torque generated as the bolt 27 is tightened.

As described above and similar to the first embodiment, the battery terminal unit U of this embodiment is provided with the battery terminal 20 including the post fitting portion 21 to be connected with the battery post 12 standing on the battery 10 and the bolt holding portion 22 formed integral or unitary to the post fitting portion 21 and adapted to at least partly accommodate the head part 24*a* of the stud bolt 24 and hold the stud bolt 24 in a standing state, and the rotation restricting member 40 made e.g. of synthetic resin and attached to the battery terminal 20, wherein the rotation restricting member 40 includes the main body 41 capable of restricting the mounting angle of the battery terminal 20 on the battery post 12 by coming substantially into contact with the battery 10 with the battery terminal 20 connected with the battery post 12, the one or more press-fitting portions 42 formed integral or unitary to the main body 41 and adapted to fix the rotation restricting member 40 to the battery terminal 20 preferably by being press-fitted into the opening 32 formed in the side surface of the bolt holding portion 22, the engaging part 157 arranged at such a position as to position the bolt holding portion 22, preferably to at least partly sandwich the bolt holding portion 22 together with the main body 41 and engaged with the bolt holding portion 22, and the joint pieces 156 arranged lateral to the bolt holding portion 22 and connected with both the main body 41 and the engaging part 157.

With this construction, even in the case where a condition such as the positional relationship between the contact part of the battery 10 with the main body 41 and the battery post 12 differs, the battery terminal 20 that is relatively high in production cost can be used as a common part to cope with a cost reduction as a whole if the rotation restricting member 40 that is relatively lower in production cost as compared with the battery terminal 20 is prepared to substantially conform to the above condition. Further, since the rotation restricting member 40 preferably is fixed to the battery terminal 20 by the one or more press-fitting portions 42 at least partly press-fitted or inserted into the opening 32 formed in the side surface of the bolt holding portion 22 of the battery terminal 20, the rotation restricting member 40 and the battery terminal 20 are unlikely to shake relative to each other, with the result that a high rotation restricting function can be displayed. Furthermore, since the movement of the main body 41 in the direction substantially opposite to the pressing direction preferably is restricted by the engagement of the engaging part 157 connected to the main body 41 by the joint pieces 156 with the bolt holding portion 22 at such a position as to sandwich the bolt holding portion 22 between the engaging part 157 and the main body 41, the rotation restricting member 40 attached to the battery terminal 20 can be firmly held. Thus, an even higher rotation preventing function can be displayed.

If a lid should be connected with a main body of a rotation restricting member via a hinge and the battery terminal 20 is held between this lid and the main body, a clearance is unlikely to be formed between the battery terminal 20 and the rotation restricting member, the rotation restricting member and the battery terminal 20 shake relative to each other and the accuracy of the angle at which the rotation can be restricted tends to decrease. As compared with this, the angle of the battery terminal 20 can be restricted with relatively high accuracy since the rotation restricting member 40 is firmly fixed to the battery terminal 20 so as not to make any shaking movement by press-fitting in this embodiment.

The joint pieces 156 preferably are formed integral or unitary to the main body 41. With this construction, the joint pieces 156 do not shake relative to the main body 41 as compared with the case where the joint pieces are parts separated from the main body and assembled with the main body and can shake relative to the main body. Therefore, a high rotation preventing function can be displayed.

Further, movements of the joint pieces 156 in the direction substantially opposite to the pressing direction of the main body 41 can be restricted preferably by being engaged with the terminal fitting 60 as a mounting member to be tightened to the stud bolt 24. With this construction, movements in the direction substantially opposite to the pressing direction of the main body 41 are doubly restricted by the engagement of the terminal fitting 60 as the mounting member to be tightened to the stud bolt 24 with the joint pieces 156 as well as the action by the engaging part 157. Further, since the joint pieces 156 preferably are formed integral or unitary to the main body 41, a function of suppressing shaking movements of the rotation restricting member 40 relative to the battery terminal 20 is particularly good. By the above, an even higher rotation preventing function can be displayed.

The joint pieces 156 preferably are formed with the one or more receiving portions 68 for receiving the anti-rotation pieces 64 of the terminal fitting 60, and the movement of the main body 41 in the direction opposite to the pressing direction preferably is restricted by the engagement of the anti-rotation pieces 64 with the wall surfaces of the receiving portions 68. With this construction, the detachment of the rotation restricting member 40 from the battery terminal 20 can be prevented by the engagement of the anti-rotation pieces 64 of the terminal fitting 60 received by the receiving portions 68 of the joint pieces 156 with the wall surfaces of the receiving portions 68.

The first receiving portion 68A preferably is in the form of a hole penetrating the first joint piece 156A and/or the hole edge 68Aa thereof preferably has an endless ring shape. With this construction, the strength of the first joint piece 156A can be increased as compared with the case where the hole edge has an incomplete ring shape since the hole edge 68Aa of the first receiving portion 68A preferably is formed to have the endless ring shape upon forming a hole penetrating the first joint piece 156A as the first receiving portion 68A. Thus, a large retaining force can be displayed.

The mounting angle of the terminal fitting 60 with respect to the stud bolt 24 preferably is restricted by the contact of the first anti-rotation piece 64A with the wall surface of the first receiving portion 68A extending substantially in the pressing direction. With this construction, the mounting angle of the terminal fitting 60 with respect to the stud bolt 24 can be restricted. Further, since the first anti-rotation piece 64A possesses both the function of preventing the detachment of the rotation restricting member 40 from the battery terminal 20 and the function of preventing the rotation of the terminal fitting 60, it is preferable in simplifying the construction.

The second receiving portion 68B is in the form of a hole penetrating the second joint piece 156B and the hole edge 68Ba thereof has an incomplete ring shape, whereas the mounting angle of the terminal fitting 60 with respect to the stud bolt 24 is restricted by the contact of the second anti-rotation piece 64B at least partly inserted into the second receiving portion 68B with the bolt holding portion 22. With this construction, the mounting angle of the terminal fitting 60 with respect to the stud bolt 24 can be restricted. Further, since the second anti-rotation piece 64B preferably is held in direct contact with the bolt holding portion 22, the terminal fitting 60 is more unlikely to shake relative to the bolt holding portion 22, with the result that a high anti-rotation function can be displayed. Furthermore, since the second anti-rotation piece 64B preferably possesses both the function of preventing the detachment of the rotation restricting member 40 from the battery terminal 20 and the function of preventing the rotation of the terminal fitting 60, it is preferable in simplifying the construction.

The above mounting member preferably is or comprises the terminal fitting 60 to be connected with the external circuit. With this construction, the terminal fitting 60 to be connected with the external circuit can possess the detachment preventing function.

The joint pieces 156 extend in the pressing directing of the main body 41 toward the bolt holding portion 22 and are arranged side by side with the bolt holding portion 22 in the direction at an angle different from 0° or 180°, preferably substantially orthogonal to the longitudinal direction of the stud bolt 24. With this construction, a space for placing the joint pieces 156 can be easily ensured at the positions adjacent to the bolt holding portion 22 in the direction at an angle different from 0° or 180°, preferably substantially orthogonal to the longitudinal direction of the stud bolt 24 as compared with positions adjacent to the bolt holding portion 22 in the longitudinal direction of the stud bolt 24 where a part to be attached to the stud bolt or a wall surface of the battery 10 can be present.

A pair of joint pieces 156 preferably are arranged at the substantially opposite sides of the bolt holding portion 22 and the engaging part 157 is connected with the both joint pieces 156. With this construction, since the bolt holding portion 22 is at least partly, preferably substantially fully enclosed by the main body 41, the pair of joint pieces 156 and the engaging part 157, the rotation restricting member 40 can be restricted from shaking relative to the battery terminal 20 preferably in all directions at an angle different from 0° or 180°, preferably substantially orthogonal to the longitudinal direction of the stud bolt 24. Further, since the engaging part 157 is connected with the both joint pieces 156, strength can be increased and a higher detachment preventing function can be displayed.

The engaging part 157 is separated from the both joint pieces 156 and connected therewith by being assembled. With this construction, assembling operability with the battery terminal 20 is better as compared with the case where the engaging part is provided integral or unitary to one joint piece via a hinge. This is particularly effective when the spacing between the post fitting portion 21 and the bolt holding portion 22 is small.

Accordingly, to realize a cost reduction, a rotation restricting member 40 of a battery terminal unit U is provided with a main body 41 capable of restricting a mounting angle of a battery terminal 20 with respect to a battery post 12 by coming into contact with a battery 10 with the battery terminal 20 connected with the battery post 12, press-fitting portions 42 formed integral to the main body 41 and adapted to fix the rotation restricting member 40 to the battery terminal 20 by being press-fitted into an opening 32 formed in a side surface of a bolt holding portion 22, an engaging part 157 arranged at such a position as to at least partly sandwich the bolt holding portion 22 together with the main body 41 and engaged with the bolt holding portion 22, and one or more joint pieces 156 arranged lateral to the bolt holding portion 22 and/or connected with both the main body 41 and the engaging part 157.

A sixth preferred embodiment of the present invention is described. In this sixth embodiment, the shapes of joint pieces 156-A are changed. A construction of the sixth embodiment similar to the above first or fifth embodiment is identified by the same reference numerals with a suffix "-A" and the structure, functions and effects thereof are not repeatedly described.

Figure 53:
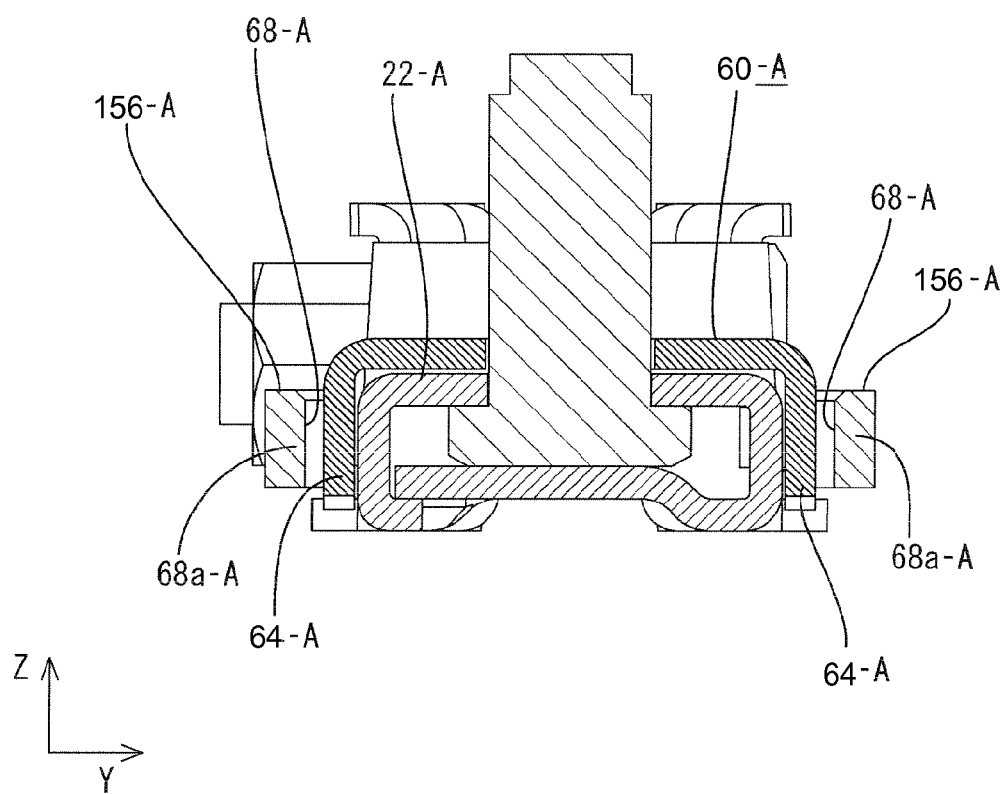
FIG. 53 is a section of a battery terminal, a rotation restricting member and a terminal fitting according to a sixth embodiment of the invention.

As shown in FIG. 53, the both joint pieces 156-A are formed with one or more receiving portions 68-A penetrating the respective joint pieces 156-A in a thickness direction and open inwardly, and preferably substantially are symmetrically shaped. Hole edges 68a-A of the both receiving portions 68-A preferably are substantially in the form of channels when viewed from above and have incomplete ring shapes. In other words, the both joint pieces 156-A according to this embodiment are structured similar to the second joint piece 156B described in the above fifth embodiment (see FIG. 35). Accordingly, both anti-rotation pieces 64-A of a terminal fitting 60-A are held substantially in direct contact with outer side surfaces of a bolt holding portion 22-A without via the joint pieces 156-A. Thus, clearances that can be formed between the bolt holding portion 22-A and the both anti-rotation pieces 64-A do not include dimensional tolerances of the joint pieces 156-A and these clearances can be made very small. Therefore, the terminal fitting 60-A is more unlikely to shake relative to the bolt holding portion 22-A, with the result that a high rotation preventing function can be obtained. Further, since the width of the both joint pieces 156-A is smaller than that of the first joint piece 156A described in the above fifth embodiment, the rotation restricting member can be made smaller. Furthermore, the spacing between the inner surfaces of the both anti-rotation pieces 64-A preferably is substantially equal to the width of the bolt holding portion 22-A.

A seventh preferred embodiment of the present invention is described with reference to FIG. 54. In this seventh embodiment, the shapes of joint pieces 156-B are further changed. A construction of the seventh embodiment similar to the above first or fifth embodiment is identified by the same reference numerals with a suffix "-B" and the structure, functions and effects thereof are not repeatedly described.

Figure 54:
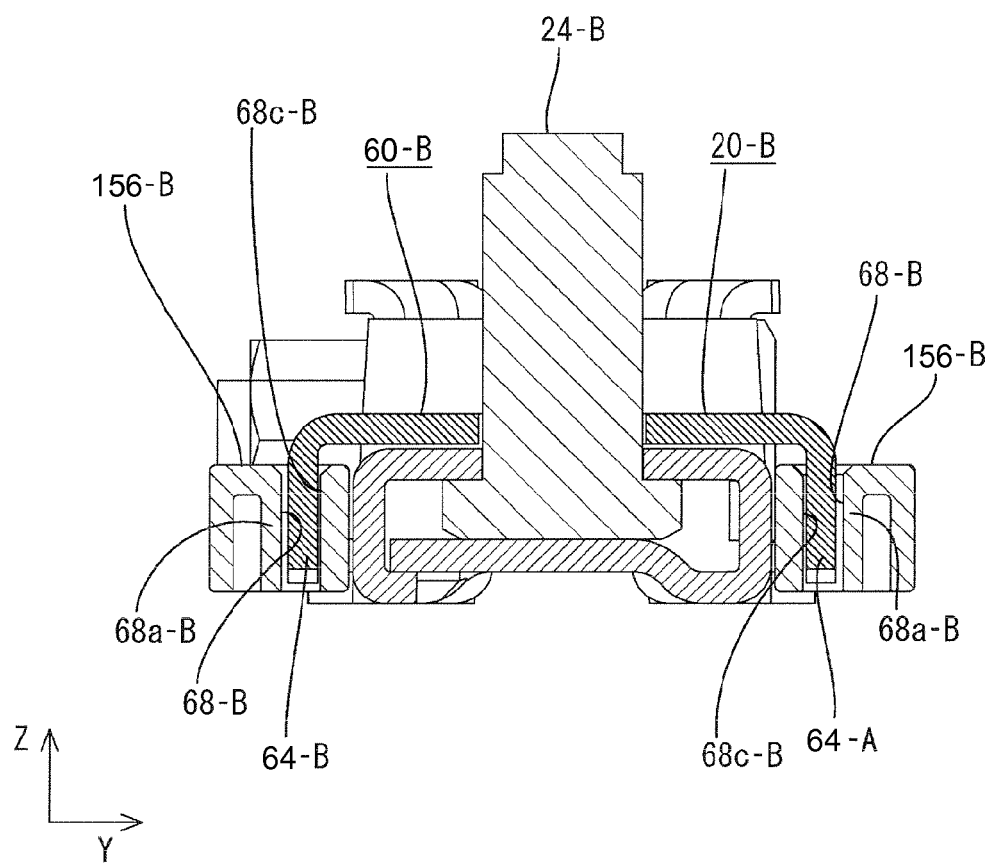
FIG. 54 is a section of a battery terminal, a rotation restricting member and a terminal fitting according to a seventh embodiment of the invention.

As shown in FIG. 54, the both joint pieces 156-B are formed with one or more receiving portions 68-B penetrating the joint pieces 156-B in a thickness direction and preferably substantially are symmetrically shaped. In other words, the both joint pieces 156-B according to this embodiment are structured similar to the first joint piece 156A described in the above fifth embodiment (see FIG. 35). Since hole edges 68a-B of the both receiving portions 68-B preferably have an endless ring shape, sufficient and equal strengths can be ensured for the both joint pieces 156-B. Thus, a movement of a main body in a detaching direction can be more reliably restricted even if a force acts to pull the main body in the detaching direction opposite to a pressing direction. By the above, a force for holding the rotation restricting member onto a battery terminal 20-B can be increased and better balanced, with the result that a high rotation preventing function can be stably displayed. Inner wall surfaces of the both receiving portions 68-B extending in the X-axis direction serve as anti-rotation contact surfaces 68c-B to be brought into contact with both anti-rotation pieces 64-B of a terminal fitting 60-B, whereby the rotation of the terminal fitting 60-B with respect to a stud bolt 24-B can be prevented.

An eighth preferred embodiment of the present invention is described with reference to FIG. 55 or 56. In this eighth embodiment, a member to be mounted on a bolt holding portion 22-C of a battery terminal 20-C is changed. A construction of the eighth embodiment similar to the above first or fifth embodiment is identified by the same reference numerals with a suffix "-C" and the structure, functions and effects thereof are not repeatedly described.

Figure 55:
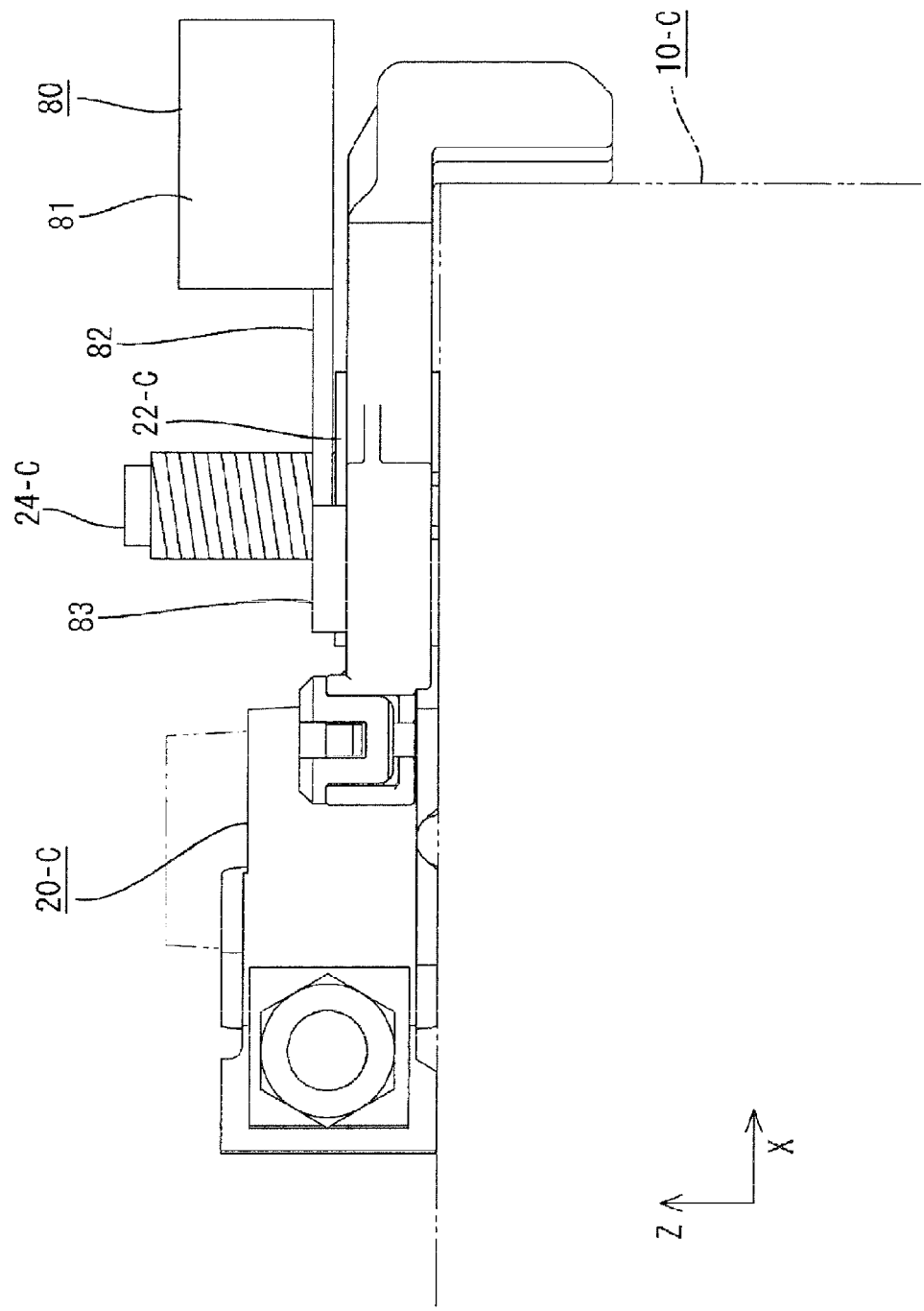
FIG. 55 is a side view of a battery terminal unit mounted with a bracket of a current sensor according to a eighth embodiment of the invention.
Figure 56:
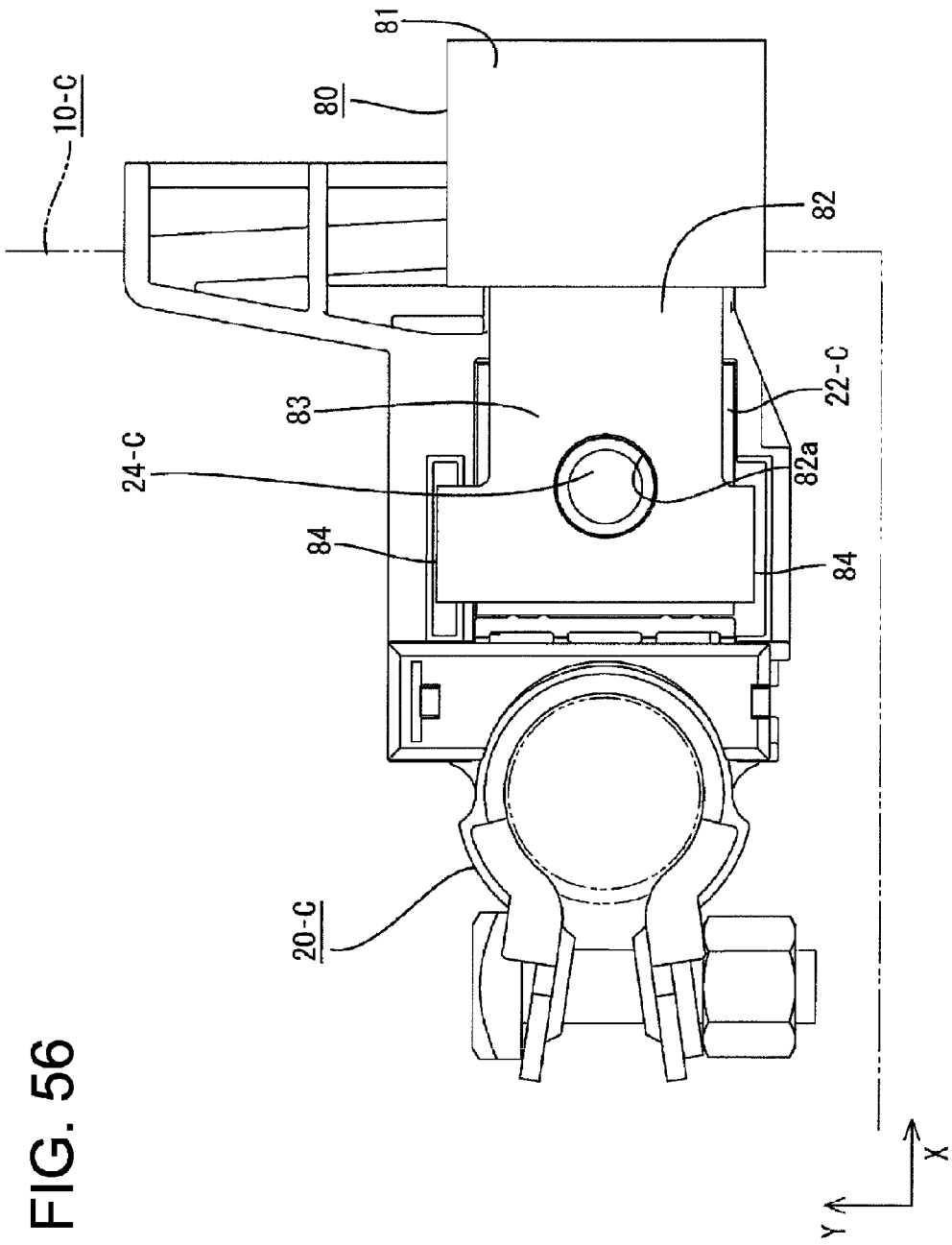
FIG. 56 is a plan view of the battery terminal unit mounted with the bracket of the current sensor.

As shown in FIGS. 55 and 56, a current sensor 80 is mounted or mountable on the bolt holding portion 22-C of the battery terminal 20-C according to this embodiment. The current sensor 80 is electrically connected to a specified (predetermined or predeterminable) electrical circuit using a battery 10-C as a power source via a connector or the like and adapted to detect a current flowing in this electrical circuit. This current sensor 80 is such that a bracket 82 is integrally or unitarily provided on a (preferably substantially block-shaped) main body 81, and this bracket 82 is to be mounted on the bolt holding portion 22-C with a stud bolt 24-C inserted through the bracket 82. The bracket 82 includes a battery mounting portion 83 to be at least partly placed on the upper surface of the bolt holding portion 22-C and formed with a bolt insertion hole 82a and a pair of anti-rotation pieces 84 projecting substantially downward from the opposite lateral edges of the battery mounting portion 83. The structures, functions and effects of these battery mounting portion 83 and anti-rotation pieces 84 are similar to those of the battery mounting portion 62 and anti-rotation pieces 64 of the terminal fitting 60 in the first or fifth embodiment. This bracket 82 preferably is made of metal not for electrical connection, but for merely mechanically holding the current sensor 80 onto the bolt holding portion 22-C.

As described above, according to this embodiment, the mounting member to be mounted on the bolt holding portion 22-C is or comprises the bracket 82 fixed to the current sensor 80 as an electrical component. In this way, the bracket 82 fixed to the current sensor 80 can possess a detachment preventing function.

The present invention is not limited to the above described and illustrated embodiments. For example, the following embodiments or modifications are also included in the technical scope of the present invention.

Although the pair of joints are formed integral to the main body in the above respective embodiments, either one of the pair of joints may be formed integral to the engaging part and united with the main body by being assembled. Even in such a case, the main body can be doubly retained by the engagement of the engaging part with the bolt holding portion and the engagement of the anti-rotation pieces of the terminal fitting or the current sensor with the wall surfaces of the receiving portions of the respective joint pieces. The structure for holding the engaging part onto the respective joints may be applied as a structure for holding the joints onto the main body.

The joint pieces may be both integral to the engaging part and united with the main body by being assembled according to the present invention.

Although the joint is in the form of one arm extending between the main body and the engaging part in the above respective embodiments, it may be, for example, divided into a first divided joint formed integral to the engaging part and a second divided joint formed integral to the main body and the first and second joint pieces may be integrally assembled by a holding structure at a position lateral to the bolt holding portion. In this case, only either one of the pair of joints may have the above divided structure or the both joints may have the divided structure.

In the case of forming at least a part of the joint pieces integral to the engaging part as in the above (1) to (3), it is also possible to form the joint piece of the engaging part with a receiving portion for receiving the anti-rotation piece of the terminal fitting or the bracket. Of course, the receiving portion can be formed in the joint piece of the main body, which is preferable since a function of preventing shaking movements of the main body can be further improved.

Although the pair of joints are provided in the above respective embodiments, only one joint may be provided according to the present invention. Alternatively, three or more joints may be provided.

Although the pair of joints are formed integral to the main body in the above respective embodiments, at least either one of the joint pieces may be separated from the main body and the engaging part and united with the main body and the engaging part by being assembled. Even in such a case, the main body can be retained doubly by the engagement of the engaging part with the bolt holding portion and the engagement of the anti-rotation pieces of the terminal fitting or the current sensor with the wall surfaces of the receiving portions of the respective joints. The structure for holding the engaging part onto the respective joints shown in the above respective embodiments may be applied as the structure for holding the joint piece onto the main body.

The engaging part is provided with the holding pieces and the joints are provided with the holding projections in the above respective embodiments. Conversely, the joints may be provided with the holding pieces and the engaging part may be provided with the holding projections according to the present invention. Besides the holding structure by the holding pieces and the holding projections, it is, in short, sufficient to provide the engaging part and the joints with mutually engageable parts and the shapes of such parts can be suitably changed.

Although the engaging part as a separate member is assembled with the pair of joint pieces in the above respective embodiments, it may be formed integral to the joint pieces. Specifically, the engaging part may be so integrally connected to either one of the joint pieces via a hinge as to be openable and closeable and, when the engaging part is closed by bending the hinge, the engaging part is integrally held onto the other joint piece by a locking structure.

Although the receiving portion is in the form of a hole penetrating the joint portion in the thickness direction in the above respective embodiments, it needs not be always a through hole and may be a recess formed, for example, by recessing (indenting) the upper surface (outer surface) of the joint portion according to the present invention.

In the above respective embodiments, the terminal fitting or bracket is provided with the anti-rotation piece as a projection and the joint portion is formed with the receiving portion in the form of a hole or recess into which the projection to be inserted. Conversely, the joint portion may be provided with a projection and the terminal fitting or bracket may be provided with a receiving portion in the form of a hole or recess according to the present invention.

Although the joint is arranged adjacent to the bolt holding portion in the direction orthogonal to the longitudinal direction of the stud bolt in the above respective embodiments, it may be arranged adjacent to the bolt holding portion in the longitudinal direction of the stud bolt according to the present invention.

Although the terminal fitting is mounted on the bolt holding portion in the above fifth to seventh embodiments and the bracket of the current sensor is mounted on the bolt holding portion in the above eighth embodiment, both the terminal fitting and the bracket of the current sensor may be mounted on the bolt holding portion according to the present invention. In this case, at least either one of the terminal fitting and the bracket may be engaged with the joint portion.

Although the anti-rotation pieces of the terminal fitting or the bracket of the current sensor also possess the function of retaining the joint portion in the above respective embodiments, the terminal fitting or the bracket may be separately provided with an engaging portion exclusively used to retain the joint portion. In this case, it is also possible to omit the anti-rotation pieces.

Although the bracket of the current sensor is made of metal in the above eighth embodiment, it may be, for example, made of synthetic resin.

Although the terminal fitting or the bracket of the current sensor is illustrated as the "mounting member" to be mounted on the bolt holding portion in the above respective embodiments, something other than these may be used as the "mounting member". Particularly, the electrical component to which the bracket is fixed can be changed, for example, to a pressure sensor or the like.

The press-fitting portions shown in the above respective embodiments can be suitably changed in the number, shape, size, arrangement and the like. The numbers, shapes, sizes, arrangements and the like of the respective ribs, retaining projection, bored portions of each press-fitting portion can be suitably changed.

It is also possible to omit the press-fitting portions.

What is claimed is:

1. A battery terminal unit, comprising:
   a battery terminal including a post fitting portion to be connected with a battery post standing on a battery and a bolt holding portion formed integral to the post fitting portion and adapted to accommodate a head part of a stud bolt and hold the stud bolt in a standing state, and
   a rotation restricting member made of synthetic resin and attached to the battery terminal,
   wherein the rotation restricting member includes:
   a main body capable of restricting a mounting angle of the battery terminal with respect to the battery post by coming into contact with the battery with the battery terminal connected with the battery post, and
   at least one press-fitting portion formed integral to the main body and adapted to fix the rotation restricting member to the battery terminal by being press-fitted into an opening formed in the bolt holding portion.

2. The battery terminal unit of claim 1, wherein at least one detachment restricting portion formed integral to the main body and adapted to restrict a movement of the main body in a direction substantially opposite to a pressing direction of the main body by being engaged with a mounting member tightened to the stud bolt.

3. The battery terminal unit of claim 2, wherein:
   the detachment restricting portion includes a receiving portion for receiving a projection provided on the mounting member, and
   the projection is engaged with a wall surface of the receiving portion to restrict the movement of the main body in the direction opposite to the pressing direction, the receiving portion being a hole penetrating the detachment restricting portion and having a hole edge with an endless ring shape.

4. The battery terminal unit of claim 3, wherein the mounting angle of the mounting member with respect to the stud bolt is restricted by the contact of the projection with a wall surface of the receiving portion extending in the pressing direction.

5. The battery terminal unit of claim 3, wherein:
   the receiving portion is in the form of a hole penetrating the detachment restricting portion and having a hole edge with an incomplete ring shape, and
   the mounting angle of the mounting member with respect to the stud bolt is restricted by the contact of the projection at least partly inserted into the receiving portion with the bolt holding portion.

6. The battery terminal unit of claim 1, wherein the detachment restricting portion includes at least one locking portion extending from the main body substantially along a side lateral to the bolt holding portion and engageable with the bolt holding portion at a position of a side of the bolt holding portion substantially opposite to the main body.

7. The battery terminal unit of claim 1, wherein the mounting member comprises a terminal fitting to be connected with an external circuit, and/or a bracket to be fixed to an electrical component.

8. The battery terminal unit of claim 1, wherein the detachment restricting portion extends substantially in the pressing direction and is arranged at a position adjacent to the bolt holding portion in a direction substantially orthogonal to a longitudinal direction of the stud bolt.

9. The battery terminal unit of claim 1, further comprising:
   an engaging portion arranged at such a position as to at least partly sandwich the bolt holding portion together with the main body and engaged with the bolt holding portion, and a joint arranged lateral to the bolt holding portion and connected with both the main body and the engaging portion.

10. The battery terminal unit of claim 9, wherein the joint is formed integral to the main body.

11. The battery terminal unit of claim 10, wherein the joint can restrict a movement of the main body in a direction substantially opposite to a pressing direction of the main body by being engaged with a mounting member to be tightened to a stud bolt, wherein the joint portion preferably is formed with a receiving portion for at least partly receiving a projection of the mounting member, and the movement of the main body in the direction substantially opposite to the pressing direction preferably is restricted by the engagement of the projection with a wall surface of the receiving portion.

12. The battery terminal unit of claim 11, wherein the receiving portion is in the form of a hole penetrating the joint and having a hole edge with an endless ring shape, or wherein:

the receiving portion is in the form of a hole penetrating the joint portion and having a hole edge with an incomplete ring shape, and the mounting angle of the mounting member with respect to the stud bolt preferably is restricted by the contact of the projection at least partly inserted into the receiving portion with the bolt holding portion.

13. The battery terminal unit of claim 9, wherein the joint extends substantially in the pressing direction of the main body toward the bolt holding portion and is arranged at a position adjacent to the bolt holding portion in a direction at an angle different from 0° or 180°, preferably substantially orthogonal to a longitudinal direction of the stud bolt.

14. The battery terminal unit of claim 13, wherein:

a pair of joints are arranged at the substantially opposite sides of the bolt holding portion, and the engaging portion is connected with the both joints, wherein the engaging portion preferably is provided separately from the both joints and connected with the both joints by being assembled.

* * * * *